United States Patent [19]

Kluger et al.

[11] Patent Number: 5,135,972
[45] Date of Patent: Aug. 4, 1992

[54] POLY(OXYALKYLENE) MODIFIED PHTHALOCYANINE COLORANTS

[75] Inventors: Edward W. Kluger, Pauline; John W. Rekers, Spartanburg, both of S.C.; Max A. Weaver, Kingsport, Tenn.

[73] Assignee: Milliken Research Corporation, Spartanburg, S.C.

[21] Appl. No.: 732,421

[22] Filed: Jul. 15, 1991

Related U.S. Application Data

[63] Continuation of Ser. No. 408,357, Sep. 18, 1989, abandoned.

[51] Int. Cl.$^5$ .................. C08K 5/06; C08L 23/02
[52] U.S. Cl. .................. 524/88; 540/132; 540/135
[58] Field of Search .......... 524/88; 540/132, 135; 106/287.2, 287.3, 288 Q, 308 M

[56] References Cited

U.S. PATENT DOCUMENTS

| | | | |
|---|---|---|---|
| 3,004,944 | 10/1961 | Kempermann et al. | 524/88 |
| 3,291,746 | 12/1966 | Donoian et al. | 524/88 |
| 3,558,551 | 1/1971 | Gilbert et al. | 524/88 |
| 3,708,457 | 1/1973 | Needham et al. | 524/88 |
| 4,016,118 | 1/1977 | Hamada et al. | 260/17.4 |
| 4,284,729 | 8/1981 | Cross et al. | 521/158 |
| 4,347,173 | 8/1982 | Merian et al. | 524/88 |
| 4,371,645 | 2/1983 | Mahaffey et al. | 524/108 |
| 4,522,654 | 6/1985 | Chisvette et al. | 524/88 |
| 4,634,555 | 1/1987 | Baxter | 540/126 |
| 4,640,690 | 2/1987 | Baungartner et al. | 8/506 |
| 4,801,634 | 1/1989 | Langley et al. | 524/88 |
| 4,801,638 | 1/1989 | Langley et al. | 524/88 |

FOREIGN PATENT DOCUMENTS 1537375 12/1978 United Kingdom.

OTHER PUBLICATIONS

Arthur W. Snow and James R. Griffith, Macromolecules 1984, 17 (1614–1624) "Syntheses and Characterization of Heteroatom-Bridged Metal-Free Phthalocyanine Network Polymers and Model Compounds".

Primary Examiner—Kriellion S. Morgan
Attorney, Agent, or Firm—Timothy J. Monahan; H. William Petry

[57] ABSTRACT

Colorants and compositions containing the same, including polymeric substrates, especially polyurethane foams which are tinted or deeper colored with the colorants which have the general formula:

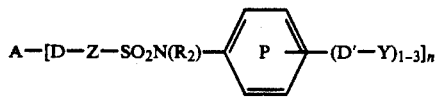

wherein $R_2$ is selected from hydrogen or unsubstituted or substituted alkyl, cycloalkyl, aryl or Y; A is a nonionic metallophthalocyanine chromophore which can be substituted or unsubstituted; Z is an arylene moiety; each D or D' is selected from a covalent bond or a linking group consisting of or containing at least one of —O—, —S—, —N(R$_3$)—, or —N(SO$_2$R$_4$)— as the linking moiety, wherein $R_4$ is unsubstituted or substituted alkyl, cycloaliphatic or aryl, and $R_3$ is $R_4$ or hydrogen; D in combination with Z can also be a covalent bond; Y is a poly(oxyalkylene) moiety containing at least about 50 mole percent of monomeric units or mixture thereof of the formula (—RO—) wherein each R is substituted or unsubstituted straight or branched alkylene of 1–4 carbons or mixtures thereof; wherein ring P can be unsubstituted or substituted in addition to the —(D'—Y) moieties; and wherein each aliphatic hydrocarbon portion or moiety of the groups, moieties or substituents recited above contain from 1–20 carbons and wherein n is 1–16, except when —D—Z— is a covalent bond then n is equal to 1–4.

10 Claims, No Drawings

POLY(OXYALKYLENE) MODIFIED PHTHALOCYANINE COLORANTS

This application is a continuation of Ser. No. 07/408,357 filed Sep. 18, 1989, now abandoned.

This invention concerns new colorant compositions, their manufacture and their uses, and particularly concerns such compositions for the tinting or deeper coloring of natural and synthetic polymeric or resinous materials or substrates, especially polyurethanes and other thermosetting resins and polyolefins, wherein the chemical structures of the colorants are readily tailored to meet, in exceptional manner, the physical and chemical requirements of the specific industrial application.

Some of the desired physical and chemical characteristics of such colorants in addition to having at least substantial tinctorial power, include one or more of excellent clarity and light fastness, high heat stability, crystal structure and shade immutability, availability as liquids or at least good resin compatibility at processing temperatures for easy blending with the substrate, easy clean-up from processing, homogeneity of dispersal in the substrate, non-nucleating propensity of the colorant, and resistance to migration, settling, streaking, plating, subliming, blooming and the like of the colorant from the substrate.

Other desirable colorant properties and also other problems often encountered with the use of pigment material are discussed in U.S. Pat. No. 4,284,729 the disclosure of which is incorporated herein by reference. In that patent which is principally concerned with coloring thermosetting or cross linkable resins, it is disclosed that conventional organic dyes can be modified with poly(oxyalkylene) constituents which carry reactive groups for entering the colorant into the polymer chain, e.g., by condensation. This technique is indicated as providing a mechanism whereby highly efficient (high tinctorial power) conventional organic dyes can readily be incorporated, chemically, into the resin molecule such that the dyes become essentially non migratory. Similarly, in U.S. Pat. No. 4,640,690 the disclosure of which is incorporated herein by reference, it is taught to color thermoplastic resins with compounds which contain conventional types of organic dyes such as azo, anthraquinone, triarylmethane and methine, linked directly to a poly(oxyalkylene) moiety through a nitrogen, oxygen or sulfur atom or a carboxyl group.

It is noted that in these patents the methods for associating the poly(oxyalkylene) moieties with the chromophore are specific to the reactants. For example, in the preparation of azo containing colorants an aromatic amine is reacted with an alkylene oxide under basic conditions. Similarly, where the poly(oxyalkylene) is attached directly to an anthraquinone nucleus the method comprises reacting a hydroxy substituted anthraquinone with an amino group on a poly(oxyalkylene). Neither of these nor similar methods are useful in the present invention.

It has been found moreover, that the use of such conventional organic dye moieties in thermosetting substrates limits the utility of the product in, e.g., high temperature applications for which the substrate material may actually have been designed. This results from the inherent instability of the conventional organic dye moiety at the higher use or processing temperatures of the product substrate.

Also noted here are the copper phthalocyanine (CuPc) compounds of U.S. Pat. No. 4,634,555 which are solids in contrast to the great majority of the compounds of the present invention. The liquid colorants are quite easily blended uniformly with a variety of thermoplastic or thermosetting resins. In contrast, the solid prior art CuPc compositions would need to be converted into fine particles and then blended in conventional equipment which necessarily is time consuming and operator intensive, and incurs homogeneity problems, substantial power requirements, and great difficulty in handling and equipment clean-up.

Objects, therefore, of the present invention are to provide colorants, the physical and chemical properties of which are readily modifiable to adapt them for blending or incorporation into various polymeric substrates, especially in thermosetting resin materials, wherein the colorants exhibit one or more of the aforementioned characteristics of substantial tinctorial power, light fastness, excellent clarity, high heat stability, crystal structure and shade immutability, availability as liquids for easy blending with the substrate; to give essentially complete homogeneity of colorant, easy clean-up from processing, non-nucleating propensity, and resistance to migration, settling, streaking, plating, subliming, blooming and the like of the colorant from the substrate; to provide compositions comprising polymeric substrates, especially polyurethane foams, tinted or deeper colored with the present colorants; and to provide a highly efficient and non-complex process for the manufacture of the present colorants.

These and other objects hereinafter becoming evident have been attained in accordance with the present invention in which the colorant has the formula:

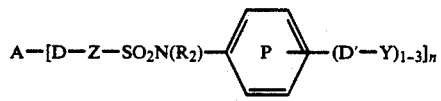

wherein $R_2$ is selected from hydrogen or unsubstituted or substituted alkyl, cycloalkyl, aryl or Y; A is a nonionic metallophthalocyanine chromophore which can be substituted or unsubstituted; Z is a cyclic, conjugated, unsaturated moiety hereinafter termed "arylene"; each D or D' is selected from a covalent bond or a linking group consisting of or containing at least one of —O—, —S—, —SO$_2$—, SO$_2$N(R$_3$)—, —N(R$_3$)—, or —N(SO$_2$R$_4$)— as the linking moiety, wherein R$_4$ is unsubstituted or substituted alkyl, cycloaliphatic or aryl, and R$_3$ is R$_4$ or hydrogen; D in a combination with Z can also be a covalent bond; Y is a poly(oxyalkylene) moiety comprised of at least about 50 mole percent of monomeric units or mixture thereof of the formula (—RO—) wherein each R is substituted or unsubstituted straight or branched alkylene of 2–4 carbons or mixtures thereof; ring P can be unsubstituted or substituted in addition to the —(D'—Y) moieties; and wherein each aliphatic hydrocarbon portion or moiety of the groups, moieties or substituents recited above contains from 1–20 carbons. In certain preferred embodiments:

(a) A is a nonionic metallophthalocyanine chromophore which can be substituted with 1–12 substituents selected from halogen, alkyl, alkoxy, alkylthio, or aryloxy; Y is a poly(oxyalkylene) moiety comprised of at least three monomeric units or mixture thereof of the formula (—RO—) wherein, each R is straight or branched alkylene of 2-4 carbons or mixtures thereof, up to about 20 mole percent of said monomeric units may be connected by one or more linking groups selected from alkyleneoxy, aryleneoxy, alkylenedioxy, alkylenetrioxy, —N(R$_5$)—, or —N(R$_2$)CON(R$_2$)—, wherein each R$_5$ is selected from R$_2$ or SO$_2$—A, and wherein Y can be terminated by hydrogen, or by or contain as branch substituents, 1-3 groups or moieties selected from alkyl, cycloalkyl, acyl, or aryl; wherein any of the above recited hydrocarbon groups, moieties or substituents may themselves be substituted, for example, may contain up to four substituents selected from alkyl, aryl, aryloxy, alkoxyalkyl, aryloxyalkyl, halogen, alkoxycarbonyl, hydroxy, alkoxy, alkylenedioxy, —CON(R$_2$)(R$_2$), —N(R$_2$)CON(R$_2$)(R$_2$)—, —N(R$_2$)(R$_2$), —N(R$_2$)SO$_2$—A, —N(R$_2$) acyl, acyloxy or the like substituents which are known in the art; and wherein each aliphatic hydrocarbon portion or moiety of the groups, moieties or substituents recited above contains from 1-12 carbons.

(b) Y has an average molecular weight of from about 200 to about 1500;

(c) the chromophore A nucleus is unsubstituted;

(d) Y is terminated with a selected from alkyl, aryl, acyl, alkoxyalkyl, mono- or dihydroxyalkyl, acyloxyalkyl, or a group of the formula:

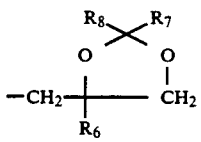

wherein each of R$_6$, R$_7$ and R$_8$ is selected from hydrogen, alkyl, or aryl:

(e) the total mole percentage of all —(RO)— unit linking groups relative to all said units in Y is from zero to about 20 percent;

(f) R$_2$ is hydrogen or Y;

(g) R is —CH$_2$CH$_2$—, —CH(CH$_3$)CH$_2$—, —CH(C$_2$H$_5$)CH$_2$— or mixtures thereof;

(h) the chromophore is an unsubstituted phthalocyanine of Cu, Ni, or Al;

(i) the polymeric or resinous material composition contains from about 0.001 to about 10.0 weight of one or a mixture of any of the colorants as defined above;

(j) the material is thermoplastic;

(k) the material is polyurethane;

(l) —D—Z— is selected from —O—arylene—, —S—arylene, —SO$_2$-arylene-, —N(R$_3$)-arylene-, —N(SO$_2$R$_4$)-arylene-, or —O-alkylene-O-arylene- or covalent bonds;

(m) and the process for preparing the colorant comprises reacting at a temperature of e.g., from about 0° C. to about 100° C., a metallophthalocyanine of the formula: A—(D—Z—SO$_2$X)$_n$ with at least a stoichiometric quantity of an amine of the formula:

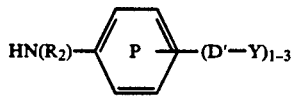

wherein X is selected from Cl, F, Br, I, or alkoxy, and A, D, D', Z, R$_2$ and Y are as defined above. Preferred reaction media include water, alcohols or ethers containing acid acceptors such as alkali metal carbonates, hydroxide or tertiary amines. Other more specific and preferred process embodiments will hereinafter become evident.

With reference to the above general formula for the colorant, the phthalocyanine chromophore can be provided with one to sixteen —D—Z—SO$_2$X groups, each of which can be reacted with the reactive amine group HN(R$_2$)— which can be chemically associated with the same or different ones of poly(oxyalkylene) moieties Y. In this regard it is noted that where the Y moiety is large, steric hinderance is less likely to interfere with the reaction of multiple HN(R$_2$)— groups spaced thereon with multiple —SO$_2$X groups on the same phthalocyanine chromophore. The arylene moiety Z includes mono- and multi-cyclic hydrocarbon nuclei, unsubstituted or substituted, such as that of benzene, naphthalene, anthracene, and biphenyl, of various heterocyclic nuclei, unsubstituted or substituted, such as that of thiophene, benzothiazole, benzoxazole, thiadiazole, or quinoline, and various combinations of such carbocyclic and heterocyclic nuclei. Specific ones of such Z moieties are given in the tables below. The linking group D preferably is selected from O,S,-O-alkylene-Q-, or -O-cycloalkylene-Q-, -O- alkylene-cycloalkylenealkylene-Q-, or —O-alkylene-arylene-alkylene-O-, wherein Q is selected from —O—, —S—, —SO$_2$, N(R$_3$)—, or —N(SO$_2$R$_4$)—.

Thermoplastic resins which may be used according to the present invention include a wide range of synthetic resins and synthetic resin compositions which are known in the art as being essentially thermoplastic in nature. The term "thermoplastic" is used herein in its conventional sense to mean a resin "having the property of softening or fusing when heated and of hardening again when cooled" (see Webster's Seventh Collegiate Dictionary, G & C Merriam Co., 1965). Thermoplastic resins are to be clearly distinguished both in terms of their essential physical and chemical characteristics from thermosetting resins. The term "thermosetting" used herein is also used in its conventional sense to means a resin "having the property of becoming permanently rigid when heated or cured".

Examples of thermoplastic resin systems which may be employed include a wide range of polyolefin polymers, e.g., polyethylene, linear low density polyethylene, polyproplene, polybutylene and copolymers made from ethylene, propylene and/or butylene. Other thermoplastic polymers which may be employed according to the present invention include polyvinyl chloride, polyvinylidene chloride, cellulosic resins such as cellulose acetate, cellulose acetate butyrate and cellulose acetate proptonate, acrylic resins such as polymethyl methacrylate, styrene arcylonitrile, polystyrene, polycarbonate and acrylonitrile butadiene-styrene (therein ABS), polyamides such as nylon 6 and nylon 66 and polyesters such as polyethylene terephthalate, especially glycol modified polyethylene terephthalate and polybutylene terephthalate.

As mentioned above, the colorants may be employed in the thermoplastic resins in a minor amount sufficient to provide the desired degree of coloration in the resin. The actual amount used will, in addition to the desired depth of shade, depend upon the tinctorial strength of the chromophore used and the overall molecular weight of the colorant, e.g., chromophore plus poly(oxyalkylene) chain length. Typically the amount of colorant employed may be from about 0.0001 percent to about 10 percent, preferably from about 0.001 percent to about 3 percent, and most preferably from about 0.1 to about 1.0 percent by weight based upon the overall weight of the resin composition.

Other conventional additives may also be present in the resin compositions of the present invention. For instance, such additives may include plasticizers, antioxidants, stabilizers, lubricants, flame retardants, nucleating agents and other additives which will be readily identified by those skilled in the art. In general, the colorants have been observed to have little or no adverse interactions with these conventional additives.

Because the colorants if used properly ordinarily do not detract from the clarity of the resin, it has been found that additives which improve the clarity of such resins may be particularly desirable for use in combination with colorants as described herein to provide resin products that are both colored and which also have excellent clarity. One particular class of additives which have been found to be useful in this regard are the benzylidene sorbitols including substituted benzylidene sorbitols such as those described in U.S. Pat. No. 4,018,118 to Hamada, et al. (E. C. Chemical); U.S. Pat. No. 4,371,645 to Mahaffey (Milliken Research Corporation); and Japanese Pat. No. SHO [1977] 53-117044 to Kobsyashi, et al. (New Japan Chemical); all of these patents being hereby incorporated herein by reference.

The particular shade of the colorant will depend primarily upon the particular chromophore group selected. A large variety of colors and shades may be obtained by blending two or more colorants. Blending the colorants of the present invention can be readily accomplished as the colorants are polymeric materials which may have substantially identical solubility characteristics, which are dictated by the nature of the polymeric chain. Therefore, the colorants are in general soluble in one another, and are also in general completely compatible with each other.

According to the process of the invention, the colorant may be incorporated into the thermoplastic resin using conventional techniques such as those employed to incorporate other additives in such resins. For instance, the colorant may be incorporated into the resin by simply adding it to the resin while the resin is in a plasticized or molten state, typically prior to formation of the polymer into its final shape, e.g., by molding, extrusion, blow-molding and the like. For instance when the thermoplastic resin to be colored is a polyolefin resin the process may be carried out by adding a colorant comprised of a poly(oxyalkylene) substituted chromophore group directly to the molten polymer, by tumbling it onto a pre-extruded pelletized resin, of by mixing it into the resin powder prior to extrusion. The polymer may then be molded or extruded in the usual manner, i.e., in the same way as for polyolefin resins which are not colored. Details about these procedures may be found in the relevant literature.

Alternatively, a concentrate of the colorant in an appropriate resin or vehicle may first be prepared. Such concentrate may contain an appropriately high percentage of colorant. The concentrates may be in the form of liquids, solids, e.g., powders, pellets, etc., as may be desired. These concentrates may then be incorporated into the thermoplastic resin as is well understood in the art.

The colorants used in the process and in the composition of the present invention are polymeric colorants which may according to one embodiment be in the liquid phase. Thus, if in the liquid phase, they may be added to the thermoplastic polymer melt in solvent-free form rather than in the form of solutions or dispersions in a suitable solvent or dispersing medium. Obviously, liquids may have certain processing advantages over solids, and moreover liquids may, if desired, be added directly to the molten polymer and therefore contain no extraneous solvent or dispersing agents. This process may, therefore, provide unusual and advantageous properties in the final thermoplastic resin product. Alternatively, however, the colorants may be premixed with minor amounts of a solvent or dispersing agent which is compatible with the resin, thus providing certain processing advantages.

According to the process of the invention, the liquid colorant may be incorporated into the thermosetting resins by simply adding it to the reaction mixture or to one of the components of the reaction mixture before or during the poly addition reaction. For instance, when the thermosetting resin to be colored is a polyurethane resin the process ay be carried out by adding the coloring agent in the form of a liquid to the polyol or even in some instances to the polyisocyanate component of the reaction mixture with before or during polyurethane formation. The subsequent reaction may be carried out in the usual manner, i.e., in the same way as for polyurethane resins which are not colored. Details about this procedure may be found in the relevant literature.

The present coloring agents of one embodiment of the present invention are polymeric, liquid, reactive coloring agents. Thus, they may be added to the reaction mixture or to one of the components thereof in solvent-free form rather than in the form of solutions or dispersions in suitable solvent or dispersing medium. Obviously liquids have significant processing advantages over solids, and moreover liquids of the present invention may, if desired, be added directly to the reaction mixture and therefore contain no extraneous nonreactive solvent or dispersing agent. This process may, therefore, provide unusual and advantageous properties in the final thermoset resin product. Alternatively, however, the coloring agent may be premixed with minor amounts of one or more of the precursors of the polymeric product, thus providing certain processing advantages.

The thermosetting resins to which the process of the present invention may be applied may be made by the reaction of a nucleophile with an electrophile. Examples of such resins include alkyds, allylics, the amines, e.g., melamine and urea, epoxies, phenolics, polyesters, silicones and urethanes. The thermosetting resin colored according to the present invention can be used in a variety of different end uses, e.g., as moldings, sealants, elastomers, films, fibers, lacquers, coating and foamed materials. It has been found in particular that the present colorants may quite advantageously be employed for the production of foams, such as polyurethane foams which may be soft, semi-rigid or rigid foams, or the so-called polyurethane integral skin and microcellular foams. Such foams are useful for producing shaped products by injection molding, extrusion or calendaring and may be obtained by adding the liquid coloring agent to the polyol or diol component of the reaction mixture, or to one of the other components, although addition to the polyol component is preferred. The polyols may be polyesters which contain hydroxyl groups, in particular reaction products of dihydric alcohols and dibasic carboxylic acids, or polyethers which contain hydroxyl groups, in particular products of the addition of ethylene oxide, propylene oxide, styrene oxide or epichlorohydrin to water, alcohols or amines, preferably dialcohols. The colorant may also be admixed with chain extending diols, e.g., ethylene glycol, diethylene glycol and butane diol. In general, it is desirable not to use more than about 20 percent by weight of colorant based on the weight of polyol. In most cases very strong colorations are produced with a small proportion of the colorant, for example, from about 0.1 to about 2 percent, preferably 0.5 to 1 percent by weight colorant based on the weight of polyol.

Because the present colorants are, in themselves, polymeric compounds, they may be soluble, for instance, in most polyols which would be used in polyurethane manufacture, in most epoxy formulations, in polyester formulations and themselves in admixtures. This property may be particularly valuable in that this solubility may permit rapid mixing and homogeneous distribution throughout the resin, thus eliminating shading differences and streaks when properly mixed, the colorant may have no tendency to settle as would be the case with pigment dispersions, and it is possible to prepare a blend of two or more colorants which provides a wide range of color availability. The present liquid reactive coloring agents may also be of considerable value in reaction injection molding (RIM) applications. The RIM process is a method of producing molded polyurethane and other polymers wherein the two reactive streams are mixed while being poured into a mold. Upon reaction, the polymer is "blown" by chemicals to produce a foam structure. This process may be hindered by the presence of solid particles, such as conventional pigments. The present invention may not cause this hindrance because there are not particles in the system and the colorant becomes part of the polymer through reaction with one of the components.

General methods for preparing the colorants include the following three routes:

Route 1

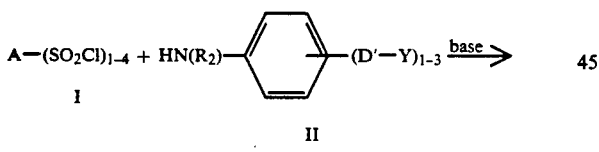

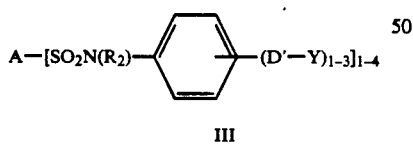

Route 2

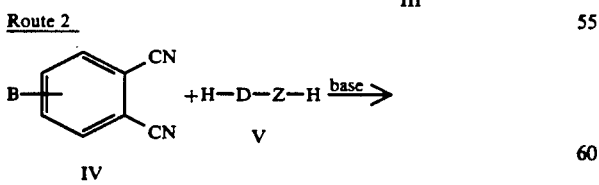

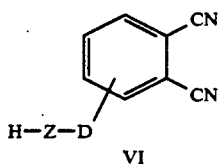

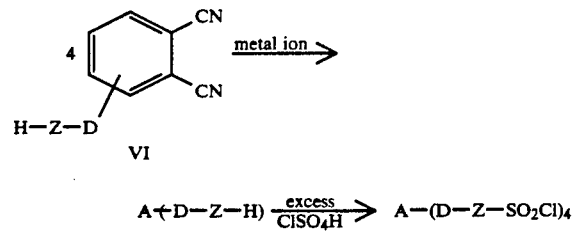

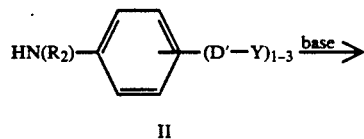

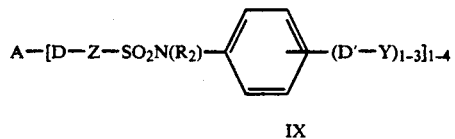

Route 3

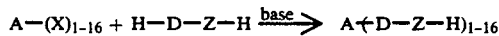

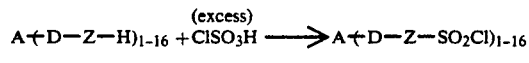

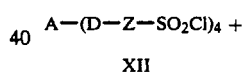

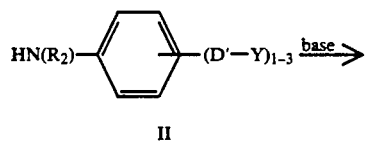

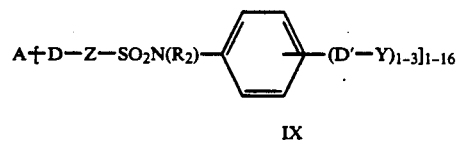

Route 1 involves the condensation of metallophthalocyanine sulfonyl chloride (I) with at least a stoichiometric quantity of a aromatic poly(oxyalkylene) amine (II) and a inorganic base at a temperature of from about 0° C. to about 100° C. to give the desired phthalocyanine containing polyalkyleneoxy moiety Y. Reaction media include water, alcohols or ethers containing acid acceptors such as alkali metal carbonates, hydroxides or tertiary amines.

Route 2 involves the reaction of a phthalonitrile moiety containing a leaving group B(IV), such as nitro or halogen, with a nucleophile (V) [A. W. Snow & J. R. Griffth, Macromolecules, 17(1614-1624)]. This reaction is preferably carried out in polar high-boiling solvents such as N,N-dimethylformamide and N-methyl-2-pyrrolidinone. Intermediates (VI) are converted into metallophthalocyanines (VII) by known techniques using metals ions. Intermediates (VII) are then chlorosulfonated using excess chlorosulfonic acid at about 0°–30° C. to introduce chlorosulfonyl groups into the Z ring of (VII). If chlorosulfonation is desired also on the phthalocyainine ring itself, higher temperatures may be employed. Compounds (VIII) are then reacted with aromatic amines (II) to give the desired phthalocyanine containing polyalkyleneoxy moiety Y.

Route 3 involves the reaction of a metallophthalocyanine containing 1–16 halogens (X) with nucleophile (V) to give (XI), a metallophthalocyanine moiety which contains 1 to 16 groups of the formula —D—Z [BASF, BP 1,537,375]. This nucleophilic displacement reaction is preferably carried out in at a high temperature in a polar high-boiling solvent such as N,N-dimethylformamide, N,N-dimethylacetamide, or N-methyl-2-pyrrolidinone. Chlorosulfonation at low temperature gives compounds (XII), which may contain a multiplicity of —D—Z—SO$_2$Cl groups. Compounds (XIII) are then reacted with aromatic amines (II) to give the sulfonamide derivatives (IX) of the invention.

Obviously, many variations of the above reactions are possible. For example, in Route 2, intermediate (VI) may be mixed with unsubstituted or substituted phthalonitriles containing a wide variety of substituents such as halogen, lower alkyl, lower alkoxy, alkylthio, arylthio, etc. and the mixture treated with metal ions to give metallophthalocyanines containing a wide variety of substituents. These intermediates may be chlorosulfonated and the corresponding sulfonyl chlorides reacted with aromatic amines (II) to give highly substituted metallophthalocyanines containing the polyalkyleneoxy moiety Y.

The preferred aromatic amines finding special utility in the manufacture of the preferred colorants of the present invention are prepared according to Routes 1–6.

The hydroxyalkylation reaction may be accomplished by the reaction of alkylene oxide at about 80°–150° C. The alkylene oxide is added in the presence of an inert gas such as nitrogen until the desired amount of alkylene oxide has been absorbed. This reaction is carried out with or without solvents. If solvents are desired, toluene, xylenes, nitrobenzenes, dioxane are just a few solvents that may be used.

Useful base catalysts are potassium hydroxide, lithium hydroxide, calcium hydroxide, and barium hydroxide, just to name a few. The amount of basic catalyst can vary but is usually in the range of from about 0.2% to about 2% by weight. In addition, certain tertiary organic amines are useful catalysts, such as dimethylaminocyclohexane, triethylamine, and benzyldimethylamine just to name a few. The poly(oxyalkylated) nitro intermediates (II) are converted into aromatic amines (III) by catalytic hydrogenation. Any suitable reduction catalyst may be used. For example, catalysts such as Raney nickel, nickel oxides, finely divided metals such as iron, cobalt, platinum, ruthenium, osmium, and rhodium may be used. Furthermore, metal catalysts supported on pumice, asbestos, Kieselguhr, alumina, silica gel or charcoal work equally as well. The amount of catalyst can vary from about 0.025 to 15 percent by weight based on the nitro intermediate (II) used.

Reduction temperatures of about 20° C. to about 90° C., although temperatures of 40° C. to 90° C. are preferred since they may provide faster reduction times and higher yields of the aromatic amines (III). During the reduction of the nitro intermediates(II), pressures ranging from about 500 to about 1800 psi of hydrogen may be used.

The reduction reaction is usually carried out in the presence of a suitable solvent. Solvents include lower alcohols such as methyl alcohol, ethyl alcohol, and isopropyl alcohol; ethers such as dioxane; hydrocarbons such as benzene, toluene, xylenes, cyclohexanes, and petroleum ether; and mixtures of lower alcohols and water such as about equal parts by weight of ethyl alcohol and water. The amount of solvent is an amount of about 30 to about 80 percent by weight.

Route 1

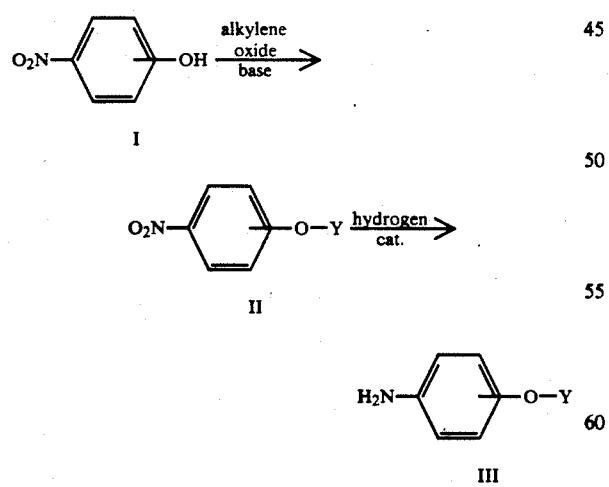

Route 2

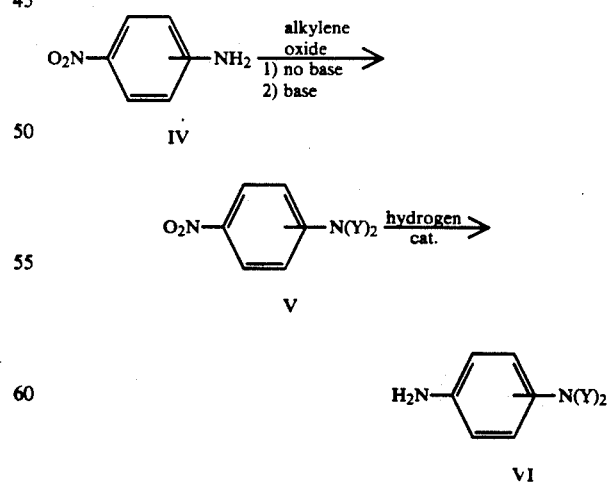

Route 1 involves the hydroxyalkylation of a nitrophenol (I) with an alkylene oxide in the presence of a base catalyst. Suitable alkylene oxides include, for example, ethylene oxide, propylene oxide, butylene oxide, and mixtures of two or more of such compounds.

Route 2 involves the hydroxyalkylation of nitroaniline (IV) with an alkylene oxide in a two-step procedure. The first step can be carried out in the presence or absence of a acid catalyst. Suitable alkylene oxides include, for example, ethylene oxide, propylene oxide, butylene oxide, cyclohexane oxide, glycidyl, and mixtures of two or more of such compounds.

In the first step, hydroxyalkylation may be accomplished by the reaction of the alkylene oxide at about 80°-150° C. The alkylene oxide is added in the presence of an inert gas such as nitrogen until two or more equivalents of the desired amount of alkylene oxide have been absorbed. This reaction is carried out with or without solvents. If solvents are desired, toluene, xylenes, nitrobenzene, dioxane are just a few solvents that may be used. Alternatively, an acid catalyst can be employed to effect the hydroxyalkylation. For example formic acid, and acetic acid are just a few of such inert acids that may be used. Generally, acid-catalyzed hydroxyalkylation is performed at a lower temperature to avoid the formation of by-products.

Temperatures from about 40° C. to about 120° C. can be employed depending on the basicity of the nitroaniline (IV) to be hydroxyalkylated. The amount of acid may vary widely. Generally from about 0.5 to 10 percent by may be employed.

In the second step, the nitropolyoxyalkylene intermediate (V) is prepared by the use of base catalysts such as potassium hydroxide, lithium hydroxide, calcium hydroxide, and barium hydroxide, just to name a few. The amount of basic catalyst can vary but is usually in the range of from about 0.2% to about 2% by weight. The reaction temperature can vary but may generally be in the range from 100° C. to about 150° C.

The corresponding aromatic amines (VI) are then prepared by conversion of the poly(oxyalkylene) nitro intermediates (V) by catalyst reduction as described in Route 1 above.

Route 3

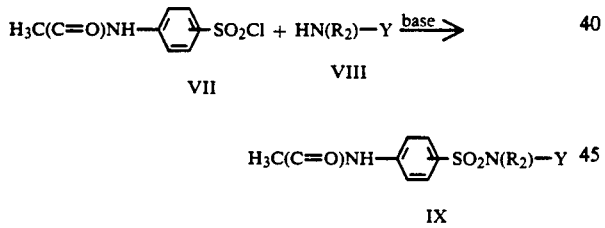

-continued

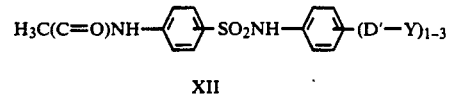
XII

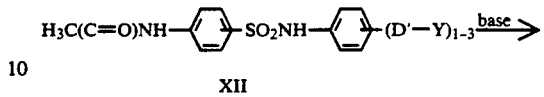
XII

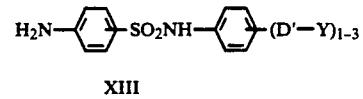
XIII

Route 3 involves the condensation of an acetamido sulfonyl chloride intermediate (VII) with at least a stoichiometric quantity of a aliphatic poly(oxyalkylene) amine (VIII) and a inorganic base at a temperature of from about 0° C. to about 100° C. to form an acetamidopoly(oxyalkylene) intermediate (IX).

Commercially available and amines from which the present preferred aromatic amines are prepared are the JEFFAMINE series described in Texaco Chemical Company, New Product Development brochures as the M, D, ED, DU, BUD, T, MNPA: and EDR series: the disclosures of which are incorporated herein by reference and copies of which are transmitted herewith.

Further heating at 80° C. to 100° C. hydrolyzes the corresponding acetamidopoly(oxyalkylene) intermediate (IX) into the aromatic poly(oxyalkylene) amine (X).

Similarly, Route 4 involves the condensation of an acetamidosulfonyl chloride intermediate (VII) with at least a stoichiometric quantity of a aromatic poly(oxyalkylene) amine (XI) and a inorganic base at a temperature of from about 0° C. to about 100° C. to form an acetamidopoly(oxyalkylene) intermediate (XII). Further heating at 80° C. to 100° C. hydrolyzes the corresponding acetamidopoly(oxyalkylene) intermediate (XII) into the aromatic poly(oxyalkylene) amine (XIII).

Route 4

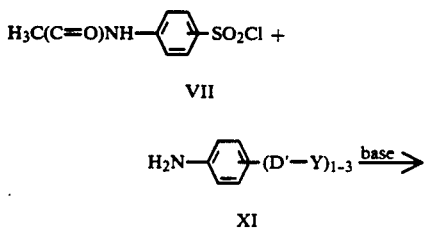

Route 5

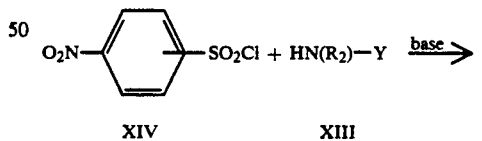
XIV    XIII

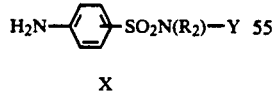
XV

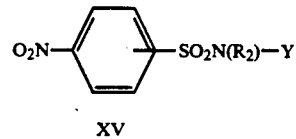
XV

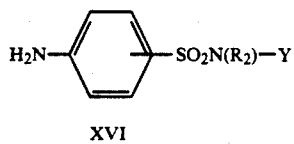

XVI

Route 6

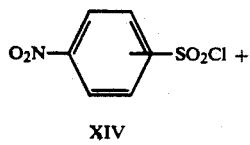

XIV

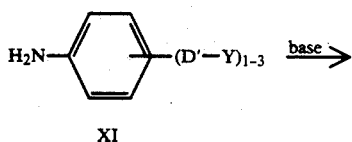

XI

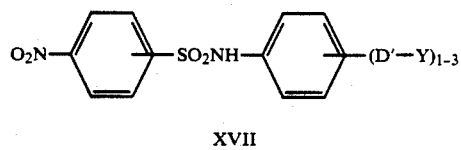

XVII

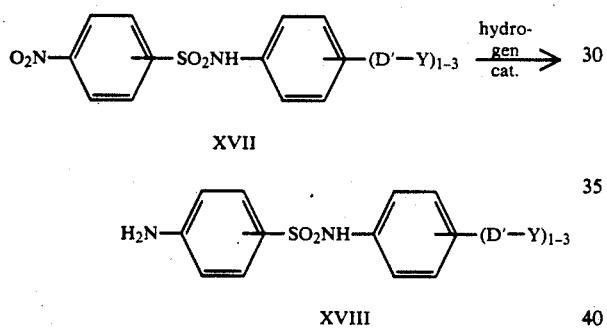

XVII

XVIII

Route 5 involves the condensation of an nitrosulfonyl chloride intermediate (XIV) with at least a stoichiometric quantity of a aliphatic poly(oxyalkylene) amine (VIII) and a inorganic base at a temperature of from about 0° C. to about 100° c. to form a nitropoly(oxyalkylene) intermediate (XV).

The corresponding aromatic amine (XVI) is then prepared by conversion of the poly(oxyalkylene) nitro intermediate (XV) by catalytic reduction as described in Route 1 above.

Route 6 involves the condensation of a nitrosulfonyl chloride intermediate (XIV) with at least a stoichiometric quantity of an aromatic poly(oxyalkylene) amine (XI) and an inorganic base at a temperature of from about 0° C. to about 100° C. to form a nitropoly(oxyalkylene) intermediate (XVII).

The corresponding aromatic amine (XVIII) is then prepared by conversion of the poly(oxyalkylene) nitro intermediate (XVII) by catalytic reduction as described in Route 1 above.

The preferred aromatic amines finding special utility in the present invention are as follows:

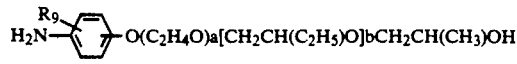

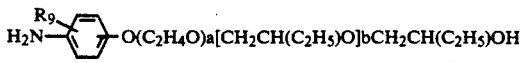

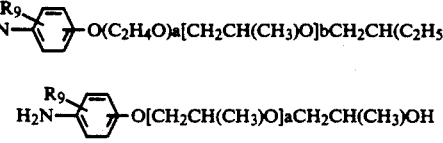

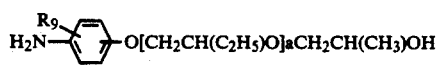

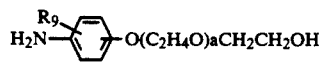

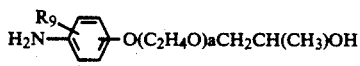

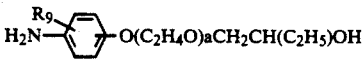

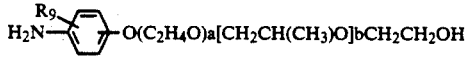

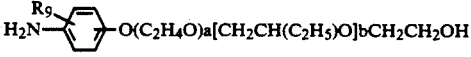

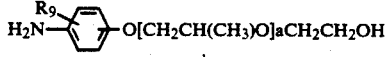

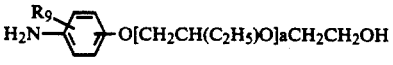

wherein $a=1-100$; $b=1-100$; and $R_9$ is selected from $CH_3$, $C_2H_5$, n-$C_3H_7$, n-$C_3H_7$, n-$C_4H_9$, $OCH_3$, or $OC_2H_5$.

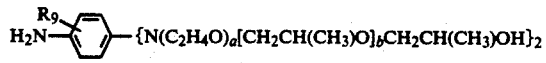

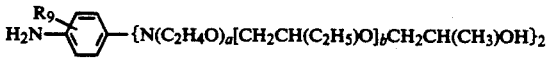

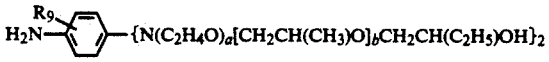

-continued
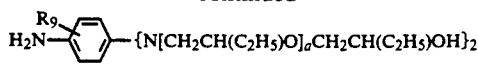
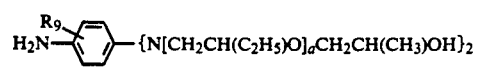
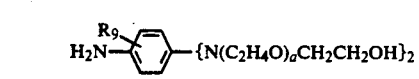
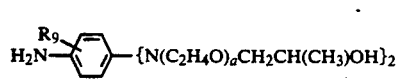
-continued
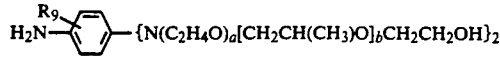
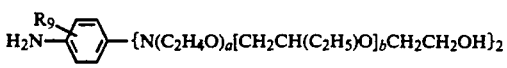
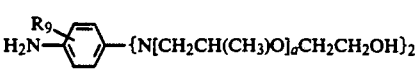
wherein a=1–100; b=1–100; and $R_9$ is selected from $CH_3$, $C_2H_5$, n-$C_3H_7$, n-$C_3H_7$, n-$C_4H_9$, $OCH_3$, or $OC_2H_5$.
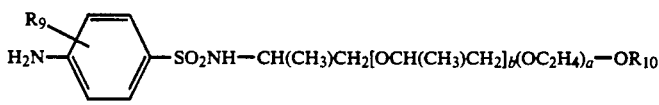
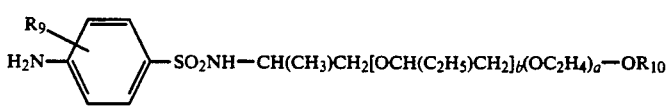
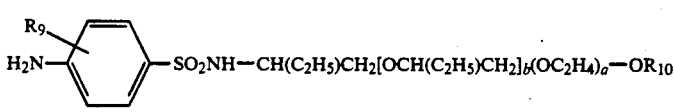
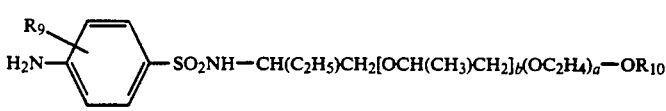
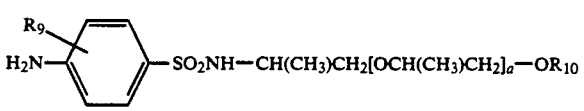
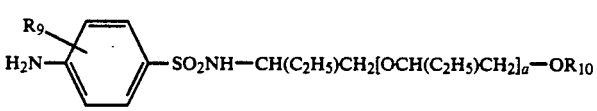
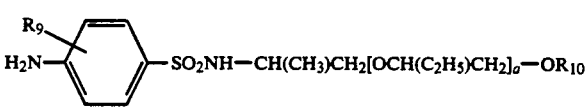
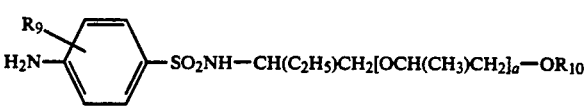
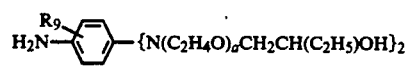
wherein a=1–19; b=2–31; and $R_{10}$ is selected from $CH_3$, $C_2H_5$, n-$C_3H_7$, n-$C_3H_7$, n-$C_4H_9$, n-$C_5H_{11}$, or n-$C_6H_{11}$ and $R_9$ is recited above.
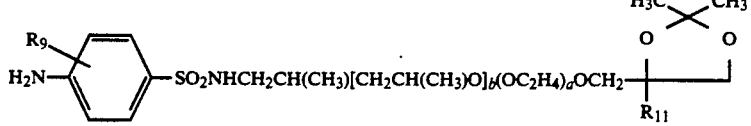

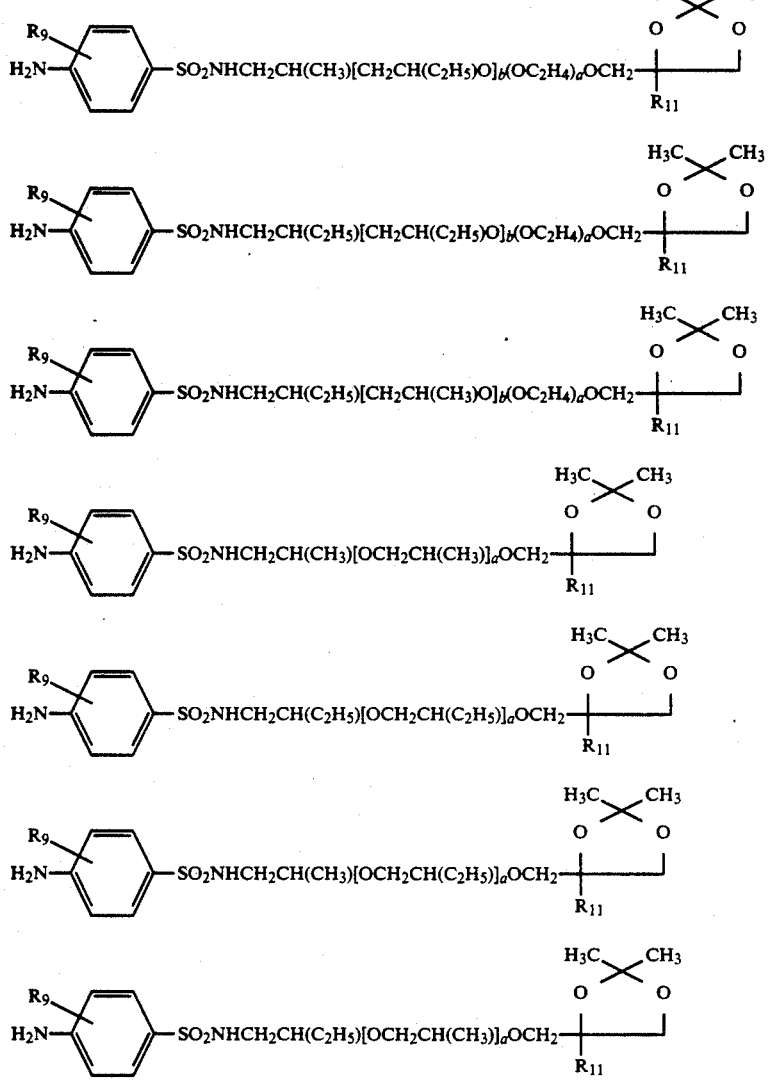
wherein a=1–19; b=2–31; and $R_{11}$ is selected from hydrogen, $CH_3$, or $C_2H_5$, and $R_9$ is recited above.
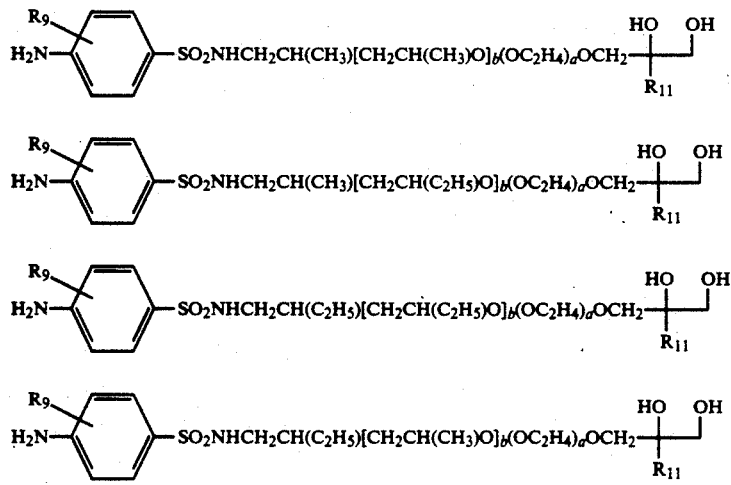

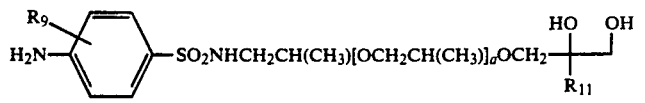
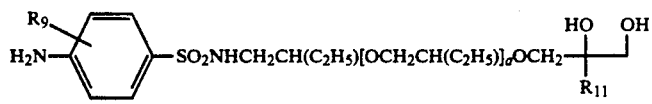
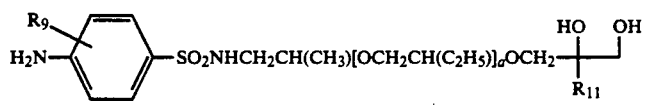
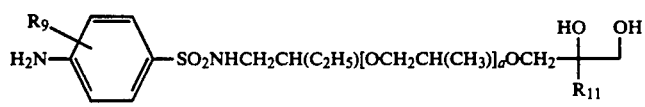
wherein a=1-19; b=2-31; and $R_{11}$ is recited above.
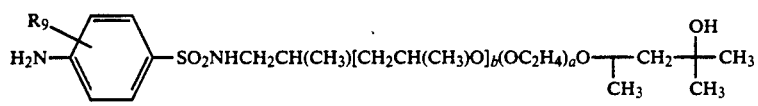
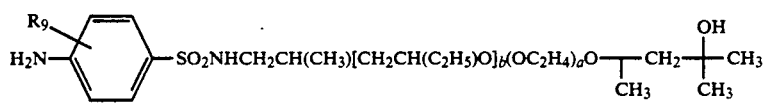
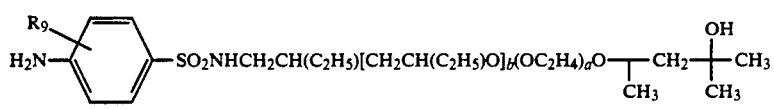
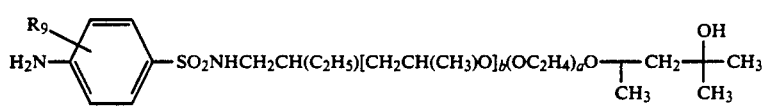
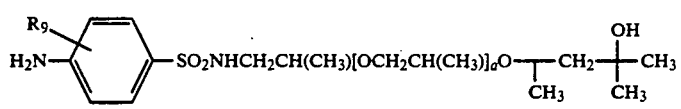
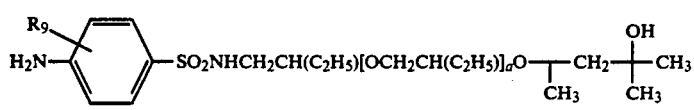
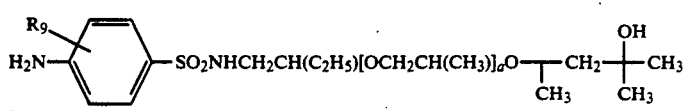
wherein a=1-19; and b=2-31.

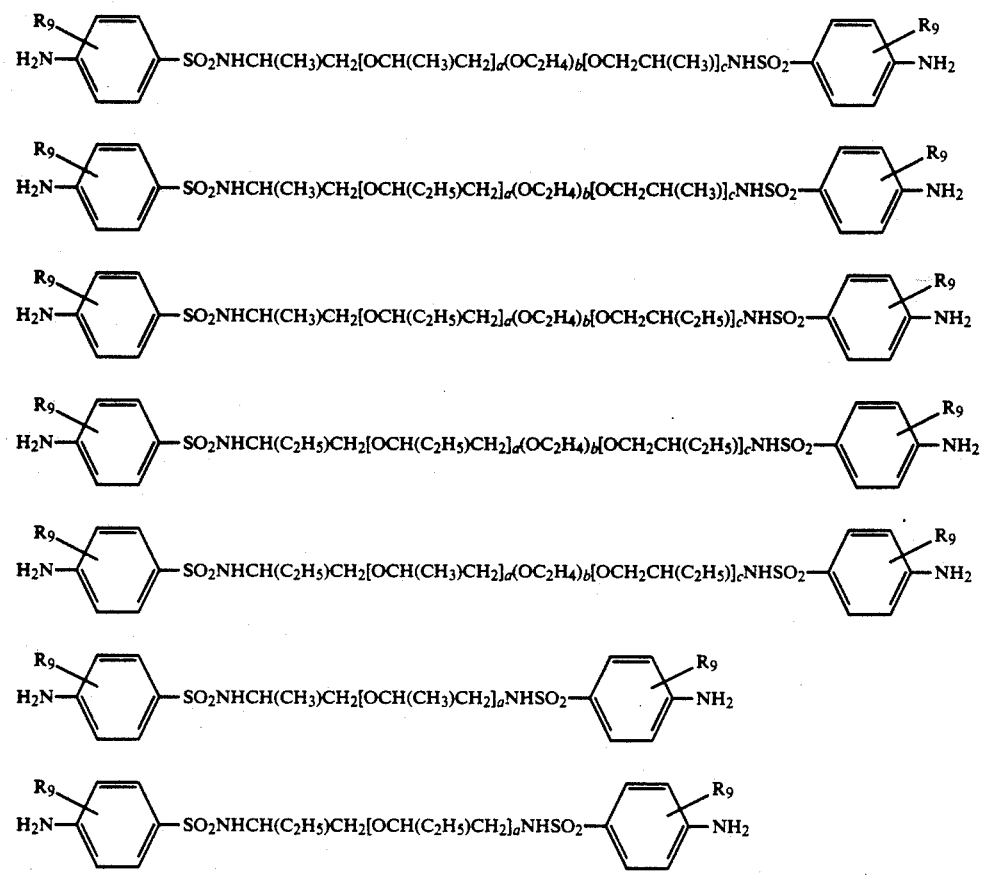
wherein a=4–132; and a+c=2–5.
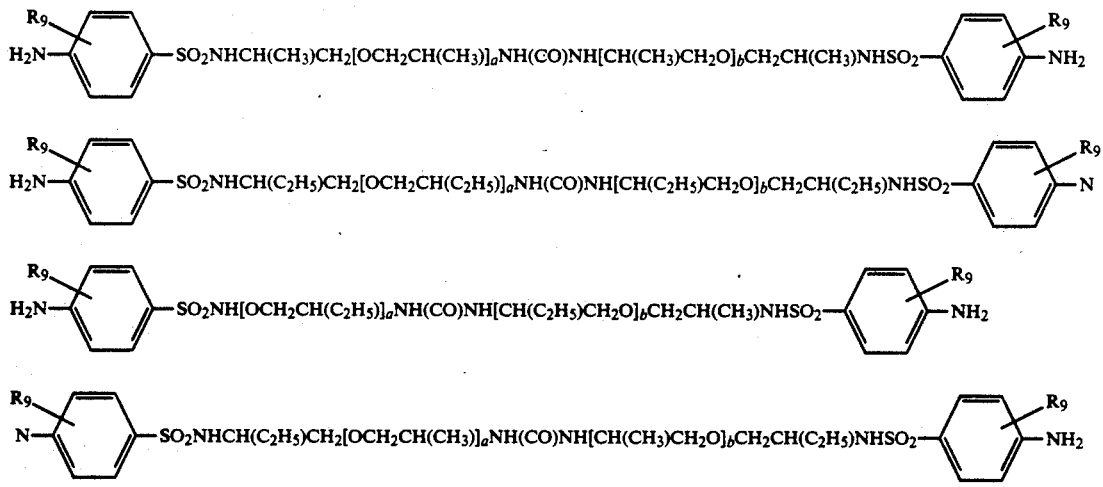
wherein a=1–19; and b=2–31.
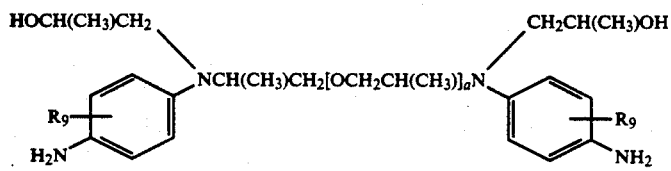
wherein a 2.6.

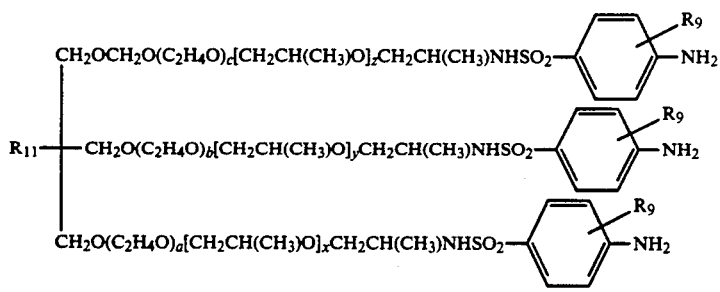
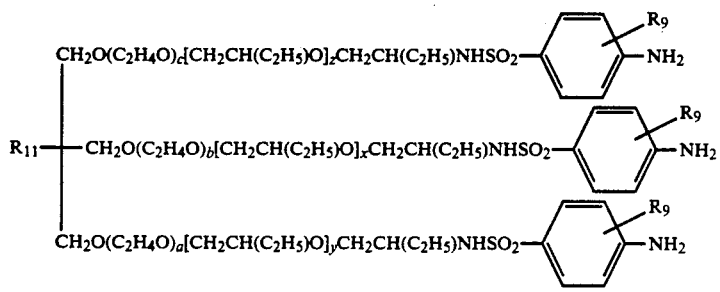
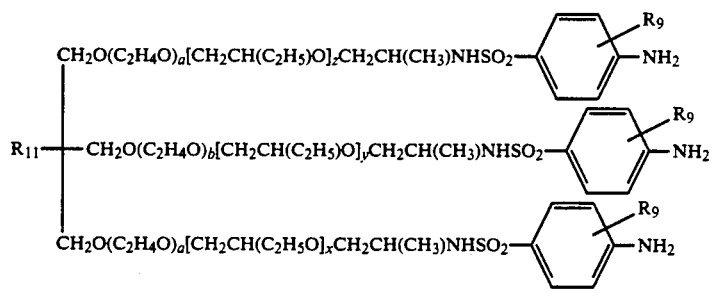
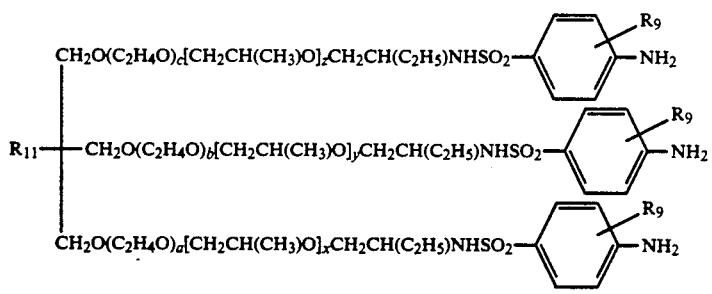
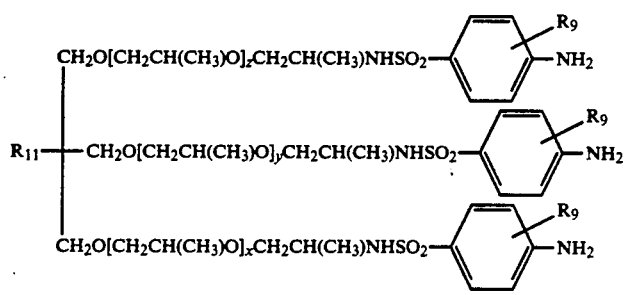

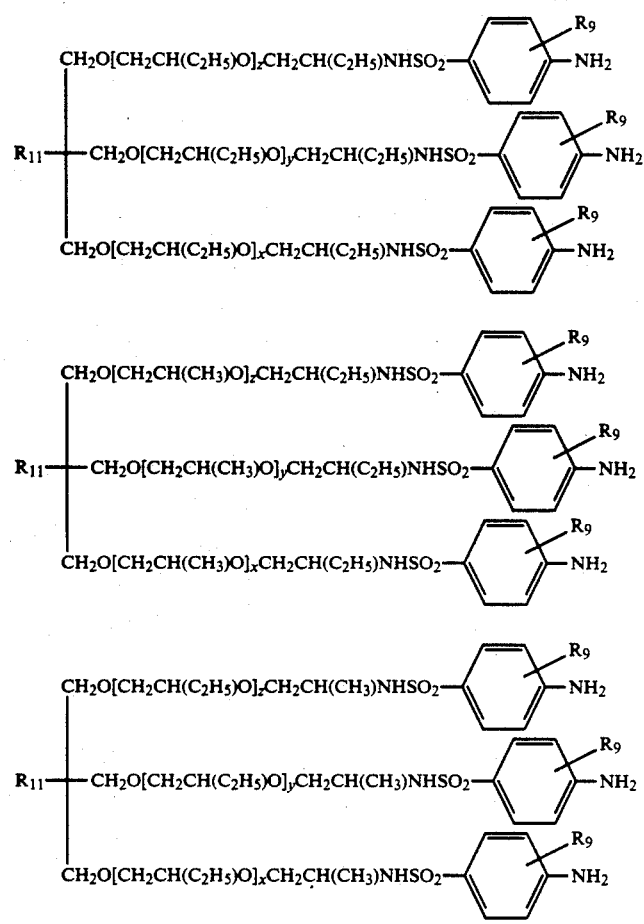

wherein $a+b+c=1-80$ and $x+y+z=5-81$; and $R_{11}$ is recited above.

The following examples illustrate preparation of the present colorants, the parts and percentages, unless other wise stated being by weight.

EXAMPLE 1

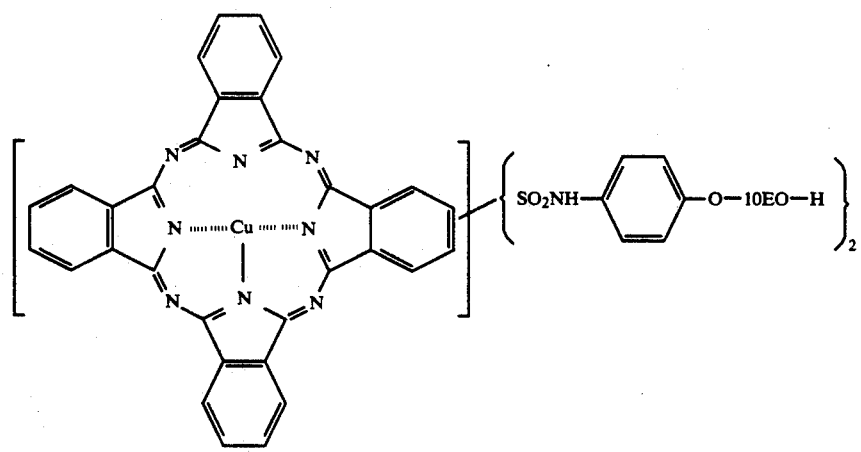

A mixture is prepared by adding 142.7 grams (0.26 mole) of an aromatic primary amine with an amine equivalent weight of 1.82 meq/g) to 31.4 grams of sodium carbonate (0.30 mole) in 250 grams of water. The mixture is stirred mechanically and cooled to 10°–15° C., and 259 grams (0.105 mole) of a 33% active aqueous wet cake of freshly prepared copper phthalocyaninesulfonyl chloride derivative (containing an average of about 2 chlorosulfonyl groups per molecule) are added to the mixture over one and a half hours. After the addition is complete, the mixture is warmed to 50° C. for an additional two hours to insure complete reaction.

Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid with an absorbance maximum at 668 nm.

4-Aminophenoxypoly(oxyethylene)

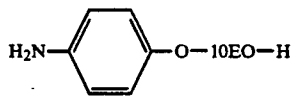

In a 2000 milliter autoclave are charged 579 grams (1 mole) of 4-nitrophenoxypoly(oxyalkylene) intermediate, 1200 milliters of ethyl alcohol and 93 grams of wet Raney nickel catalyst. The autoclave is then purged three times with hydrogen gas and heated to 85°-90° C. at a pressure of about 1300 psi. After about two hours the hydrogen uptake ceases. A sample is removed and vacuum stripped of solvent. The IR spectrum of this sample shows no nitro bands and the presence of an amine band indicating that the reaction is complete. The autoclave is cooled and vented. The liquid product is isolated by filtering the reaction mixture and stripped away the solvent under reduced pressure.

4-Nitrophenoxypoly(oxyalkylene)

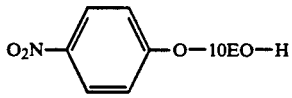

One hundred thirty grams (1 mole) of p-nitrophenol, 3 grams of potassium hydroxide catalyst, and 350 milliters of methylisobutyl ketone are charged into a two-liter pressure reactor. The mixture is stripped at 93° C. for 15 minutes, then purged with nitrogen to 5 psi. The mixture is heated to 120° C. and 44 grams (1 mole) ethylene oxide are added. After 90 minutes at 120° C., 396 grams (9 moles) ethylene oxide are then added to the reactor. After 5 hours hold time, the contents of the reactor are stripped of all volatiles under reduced pressure at 110° C. for 45 minutes to give a liquid intermediate.

EXAMPLE 2

A mixture is prepared by adding 188 grams (0.19 moles) of an aromatic primary amine with an amine equivalent weight of 1.01 meq/g) to 24.0 grams (0.23 moles) sodium carbonate in 400 ml of THF. The mixture is cooled to 10°-15° C. and 100 grams (0.061 mole) of a 50% active aqueous wet cake of freshly prepared copper phthalocyanine-sulfonyl chloride derivative (containing an average of about 2 chlorosulfonyl groups per molecule) are added to the mixture over one and a half hours. After the addition is complete, the mixture is warmed to 50° C. for an additional two hours to insure complete reaction. Afterwards, the mixture is cooled and t he product is extracted into methylene chloride. The corresponding methylene chloride/THF solution is separated from the salt water solution. The THF solution is allowed to evaporate in a fume hood, 300 ml of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to obtain a blue liquid with an absorbance maximum at 667 nm.

3-Aminoanilinopoly(oxyalkylene)

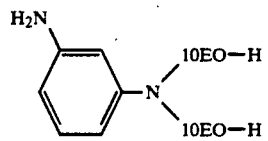

In a 2000 milliter autoclave are charged 1018 grams (1 mole) of 3-nitroanilino-poly(oxyalkylene) intermediate, 600 milliters of ethyl alcohol and 130 grams of wet Raney nickel catalyst. The autoclave is then purged three times with hydrogen gas and heated to 85°-90° C. at a pressure of about 1300 psi. After about two hours the hydrogen uptake ceases. A sample is removed and vacuum stripped of solvent. The IR spectrum of this sample shows no nitro bands and the presence of an amine band indicating that the reaction is complete. The autoclave is cooled and vented. The liquid product is isolated by filtering the reaction mixture and stripping away the solvent under reduced pressure.

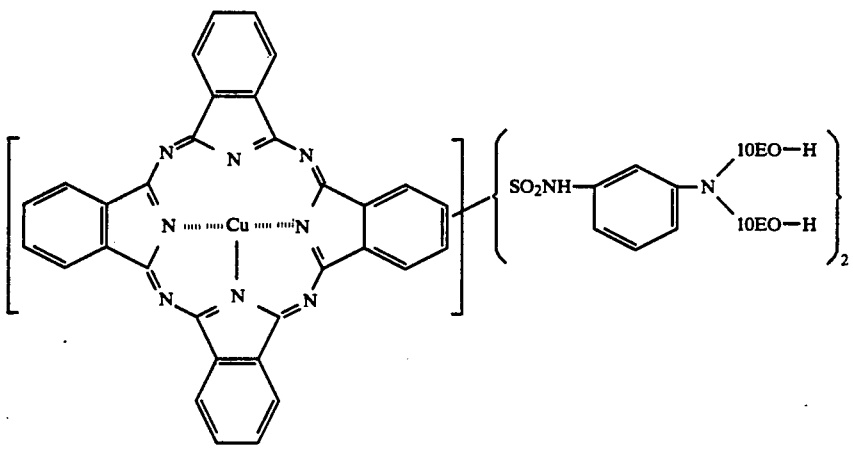

3-Nitroanilinopoly(oxyalkylene)

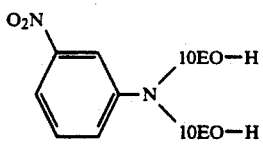

Two hundred twenty six grams (1 mole) N,N-(di-2-hydroxyethyl)-m-nitroaniline and 500 milliters of toluene are charged into a two-liter pressure reactor. The mixture is stripped at 93° C. for 15 minutes, then purged with nitrogen to 5 psi. The mixture is heated to 120° C. and 2 grams of potassium hydroxide catalyst are added and the reaction mixture stripped for 15 minutes. Seven hundred and ninety-two grams (18 moles) propylene oxide are added to the reactor and the mixture then heated at 121° C. for 3 hours. Afterwards, the contents of the reactor are stripped of all volatiles under reduced pressure at 118° C. for 45 minutes to give a liquid intermediate.

Dihydroxyethyl-m-nitroaniline

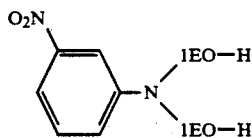

Four hundred eighty three grams (3.5 moles) of m-nitroaniline, 173 grams of acetic acid, and 578 grams of water are charged into a one-gallon pressure reactor. The mixture is purged with nitrogen to 5 psi and heated to 35° C. Three hundred eight grams (7 moles) of ethylene oxide are added over several hours and the reaction mixture is heated overnight at 35° C. The dihydroxyethylnitroaniline intermediate is isolated by quenching the mixture in ice water. The resulting solid is reslurried several times with water and then finally with dilute base until neutral. The resulting solid product is vacuum dried at 40° C.

EXAMPLE 3 mole) sodium carbonate in 400 ml of THF. The mixture is cooled to 10°-15° C. and 100 grams (0.061 mole) of a 50% active aqueous wet cake of freshly prepared copper phthalocyanine-sulfonyl chloride derivative (containing an average of about 2 chlorosulfonyl groups per molecule) are added to the mixture over one and a half hours. After the addition is complete, the mixture is warmed to 50° C. for an additional two hours to insure complete reaction. Afterwards, the mixture is cooled and the product is extracted into methylene chloride. The corresponding methylene chloride/THF solution is separated rom the salt water solution. The THF solution is allowed to evaporate in a fume hood, 300 ml of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to a blue liquid with an absorbance maximum at 664 nm.

4-Anilinosulfonamidopoly(oxyalkylene)

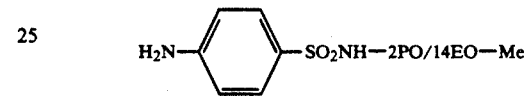

A mixture is prepared by adding 715 grams (1 mole) of a primary amine with an amine equivalent weight of 1.40 meq/g) to 122 grams (1.2 moles) sodium carbonate in 250 ml of THF. The mixture is cooled to 10°-15° C. and 233 grams (1 mole) of 4-acetamidobenzene sulfonyl chloride are added to the mixture over one half hour. After the addition is complete, the mixture is warmed to 50° C. for an additional two hours to insure complete reaction. Forty grams (1 mole) of sodium hydroxide are added to the mixture and the mixture is heated to reflux one hour. Afterwards, the mixture was cooled and the product is extracted into methylene chloride. The corresponding methylene chloride solution is separated from the salt water solution. The methylene chloride solution is separated from the salt water solution, further washed several times with water to neutral pH, and dried over anhydrous magnesium sulfate. The dried

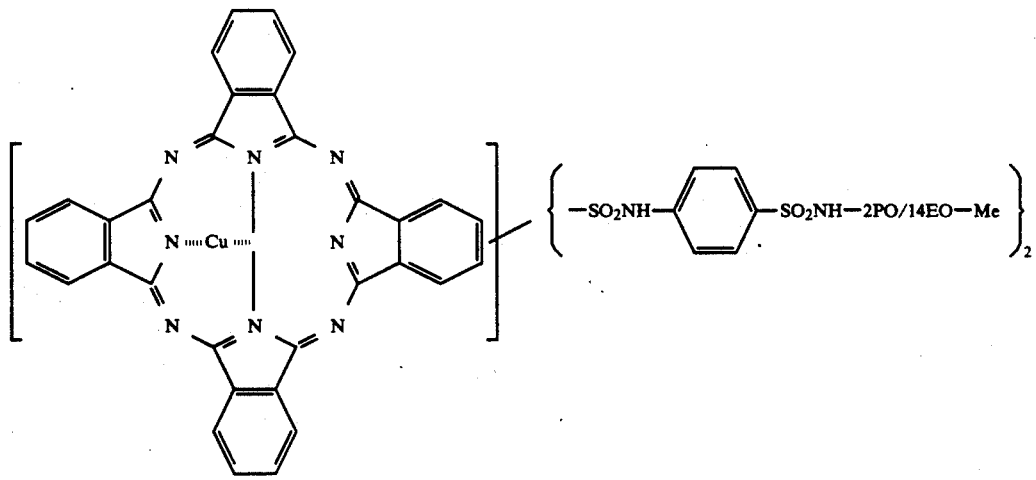

A mixture is prepared by adding 174 grams (0.19 mole) of an aromatic primary amine with an amine equivalent weight of 1.09 meq/g) to 24.0 grams (0.23

EXAMPLE 4

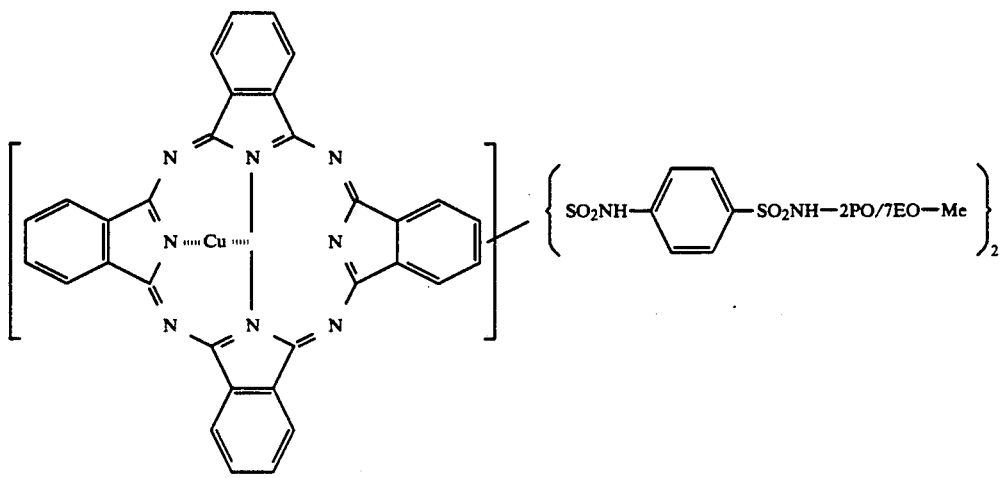

A mixture is prepared by adding 116 grams (0.19 mole) of an aromatic primary amine with an amine equivalent weight of 1.64 meq/g to 24.0 grams (0.23 mole) sodium carbonate in 400 ml of THF. The mixture is cooled to 10°-15° c. and 100 grams (0.061 mole) of a 50% active aqueous wet cake of freshly prepared copper phthalocyanine-sulfonyl chloride derivative (containing an average of about 2 chlorosulfonyl groups per molecule) are added to the mixture over one an a half hours. After the addition is complete, the mixture is warmed to 50° C. for an additional two hours to insure complete reaction. Afterwards, the mixture is cooled and the product is extracted into methylene chloride. The corresponding methylene chloride/THF solution is separated from the salt water solution. The THF solution is allowed to evaporate in a fume hood, 300 ml of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to a liquid intermediate.

EXAMPLE 5

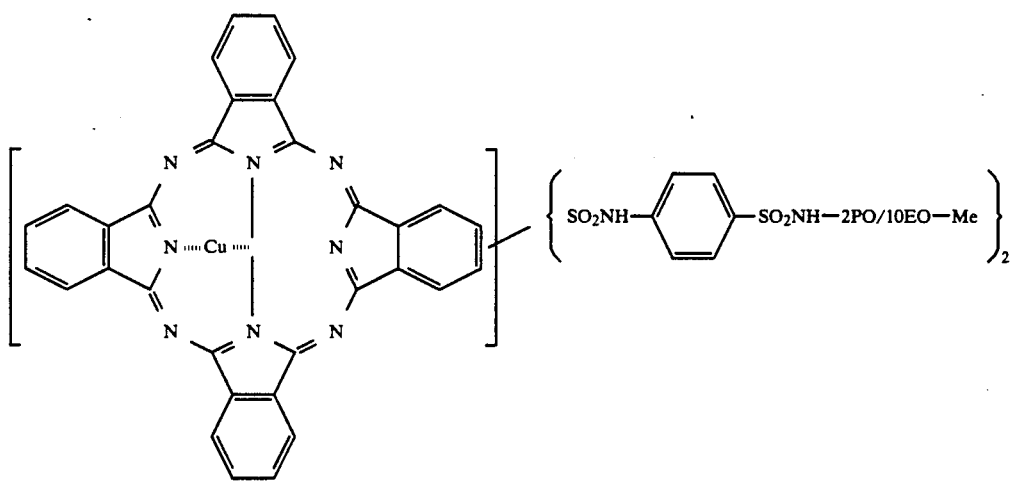

A mixture is prepared by adding 95.5 grams (0.14 mole) of an aromatic primary amine with an amine equivalent weight of 1.47 meq/g to 24.0 grams (0.23 mole) sodium carbonate in 400 ml of THF. The mixture is cooled to 10°-15° C. and 113 grams (0.046 mole) of a 50% active aqueous wet cake of freshly prepared copper phthalocyanine-sulfonyl chloride derivative (containing an average of about 2 chlorosulfonyl groups per molecule) are added to the mixture over one and a half hours. After the addition is complete, the mixture is warmed to 50° C. for an additional two hours to insure complete reaction. Afterwards, the mixture is cooled and the product is extracted into methylene chloride. The corresponding methylene chloride/THF solution is separated from the salt water solution. The THF solution is allowed to evaporate in a fume hood, 300 ml of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to a blue liquid with an absorbance maximum at 664 nm.

and stripped under reduced pressure at 90° C. to a blue liquid with an absorbance maximum at 664 nm.

EXAMPLE 6

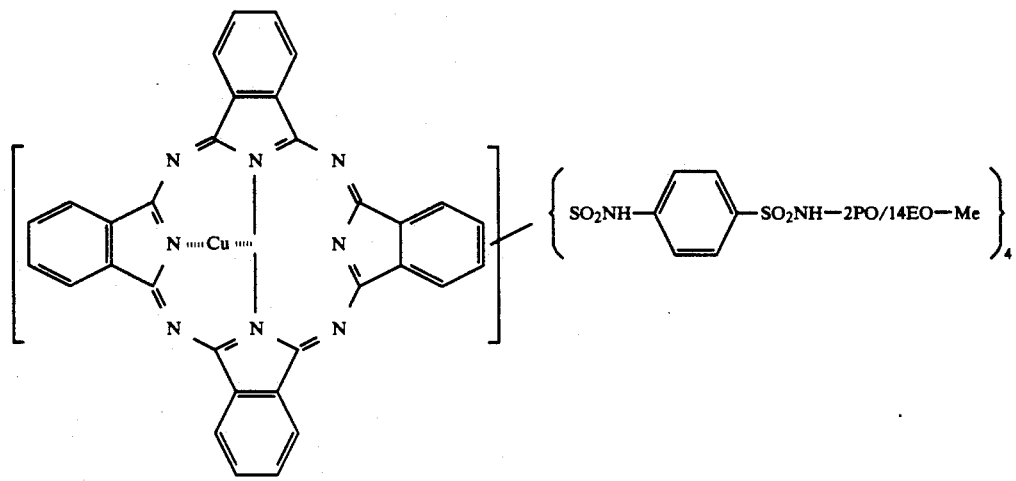

A mixture is prepared by adding 91.8 grams (0.10 mole) of an aromatic primary amine with an amine equivalent weight of 1.09 meq/g to 21.6 grams (0.20 mole) sodium carbonate in 500 ml of water. The mixture is cooled to 10°–15° C. and 0.026 mole of an aqueous wet cake of freshly prepared copper phthalocyaninesulfonyl chloride derivative (containing an average of about 4 chlorosulfonyl groups per molecule) is added to the mixture over one-half hour. After the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid with an absorbance maximum at 664 nm.

EXAMPLE 7

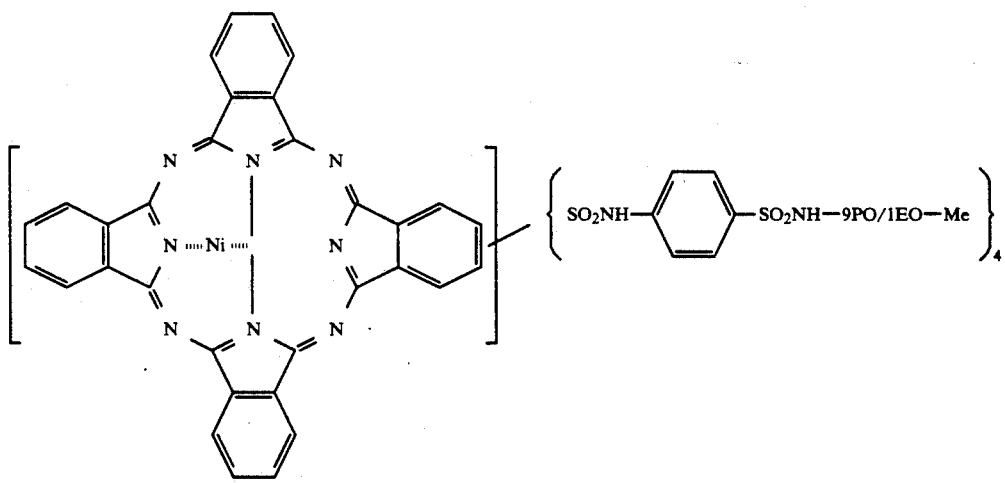

A mixture is prepared by adding 308.3 grams (0.41 mole) of an aromatic primary amine with an amine equivalent weight of 1.33 meq/g to 173.0 grams (1.63 mole) sodium carbonate in 1000 ml of water. The mixture is cooled to 10°–15° C. and 0.10 mole of an aqueous wet cake of freshly prepared nickel phthalocyaninesulfonyl chloride derivative (containing an average of about 4 chlorosulfonyl groups per molecule) is added to the mixture over about one hour. When the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid.

EXAMPLE 8

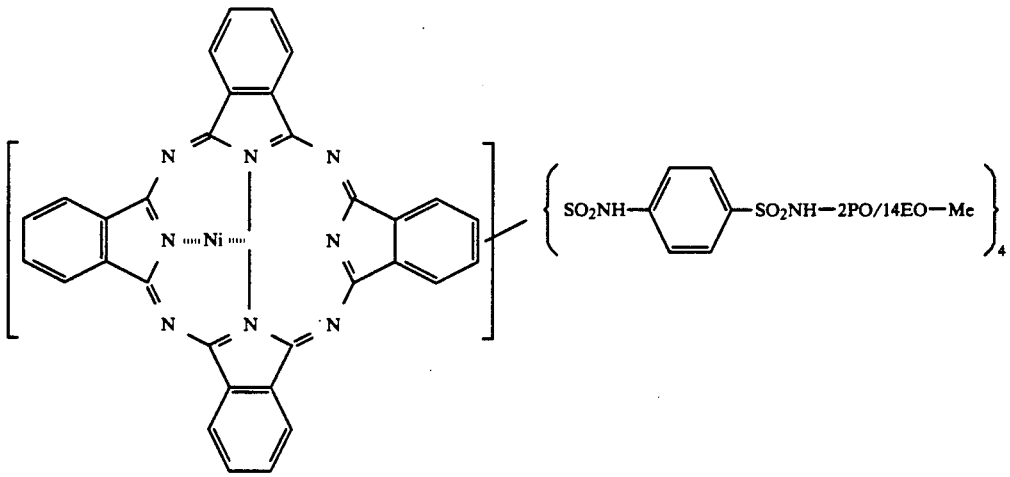

A mixture is prepared by adding 91.8 grams (0.10 mole) of an aromatic primary amine with an amine equivalent weight of 1.09 meq/g to 21.6 grams (0.20 mole) sodium carbonate in 500 ml of water. The mixture is cooled to 10°-15° C. and 0.025 mole of an aqueous wet cake of freshly prepared nickel phthalocyaninesulfonyl chloride derivative (containing an average of about 4 chlorosulfonyl groups per molecule) is added to the mixture over about one hour. When the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid.

EXAMPLE 9

A mixture is prepared by adding 56.9 grams (0.062 mole) of an aromatic primary amine with an amine equivalent weight of 1.09 meq/g to 11.9 grams (0.11 mole) sodium carbonate in 250 ml of water. The mixture is cooled to 10°-15° C. and 0.014 mole an aqueous wet cake of freshly prepared cobalt phthalocyaninesulfonyl chloride derivative (containing an average of about four chlorosulfonyl groups per molecule) is added to the mixture over one and a half hours. When the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid.

EXAMPLE 10

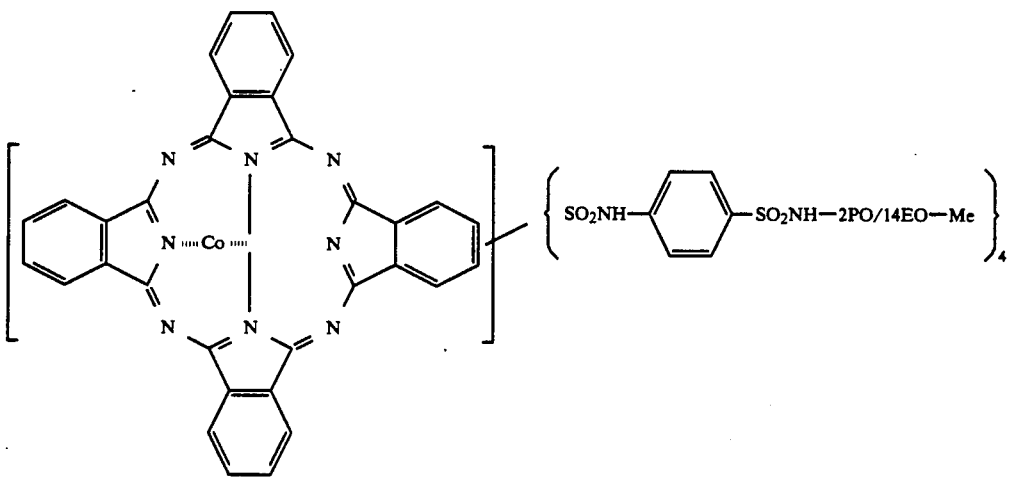

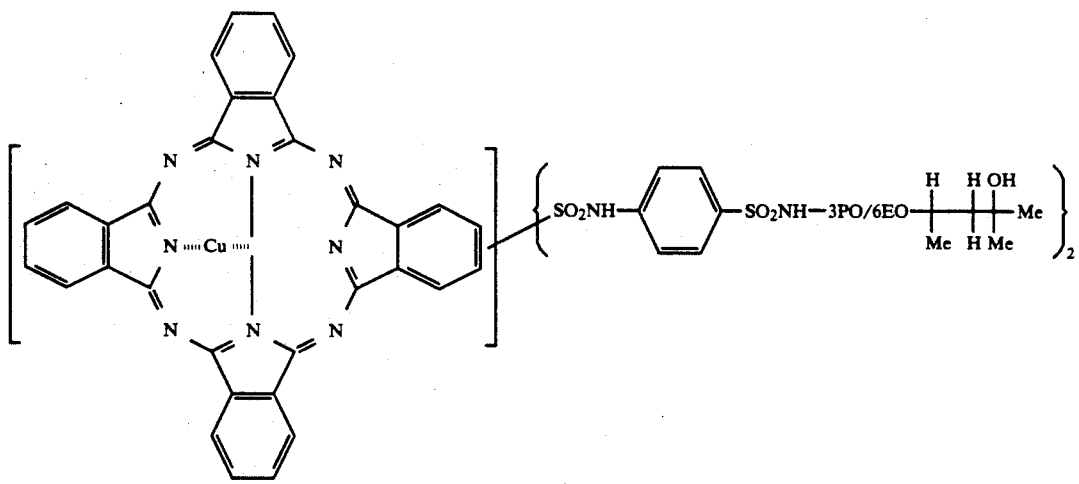

A mixture is prepared by adding 177.5 grams (0.25 mole) of an aromatic primary amine with an amine equivalent weight of 1.41 meq/g to 10.6 grams (0.10 mole) sodium carbonate in 400 ml of THF. The mixture is cooled to 10°-15° C. and 77.8 grams (0.0315 mole) of a 33% active aqueous wet cake of freshly prepared copper phthalocyaninesulfonyl chloride derivative (containing an average of about 2 chlorosulfonyl groups per molecule) are added to the mixture over one and a half hours. When the addition is complete, the mixture is warmed to 50° C. for an additional two hours to insure complete reaction. Afterwards, the mixture is cooled and the product is extracted into methylene chloride. The corresponding methylene chloride/THF solution is prepared from the salt water solution. The THF solution is allowed to evaporate in a fume hood, 300 ml of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to a blue liquid with an absorbance maximum at 664 nm.

A mixture is prepared by adding 98.4 grams (0.19 mole) of an aromatic primary amine with an amine equivalent weight of 1.93 meq/g to 24.0 grams (0.23 mole) sodium carbonate in 400 ml of THF. The mixture is cooled to 10°-15° C. and 100 grams (0.061 mole) of a 50% active aqueous wet cake of freshly prepared copper phthalocyaninesulfonyl chloride derivative (containing an average of about 2 chlorosulfonyl groups per molecule) are added to the mixture over one and a half hours. After the addition is complete, the mixture is warmed to 50° C. for an additional two hours to insure complete reaction. Afterwards, the mixture is cooled and the product is extracted into methylene chloride. The corresponding methylene chloride/THF solution is separated from the salt water solution. The THF solution is allowed to evaporate in a fume hood, 300 ml of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to a blue liquid with an absorbance maximum at 664 nm.

EXAMPLE 11

EXAMPLE 12

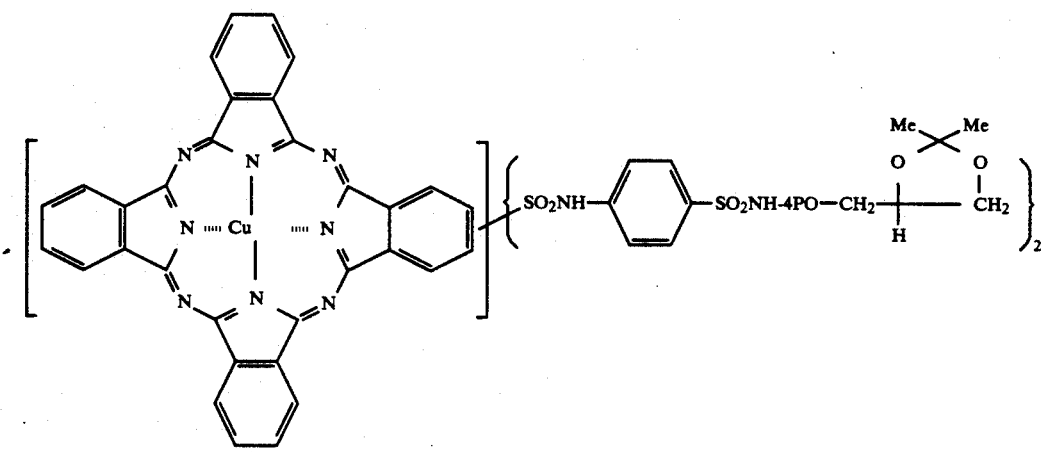

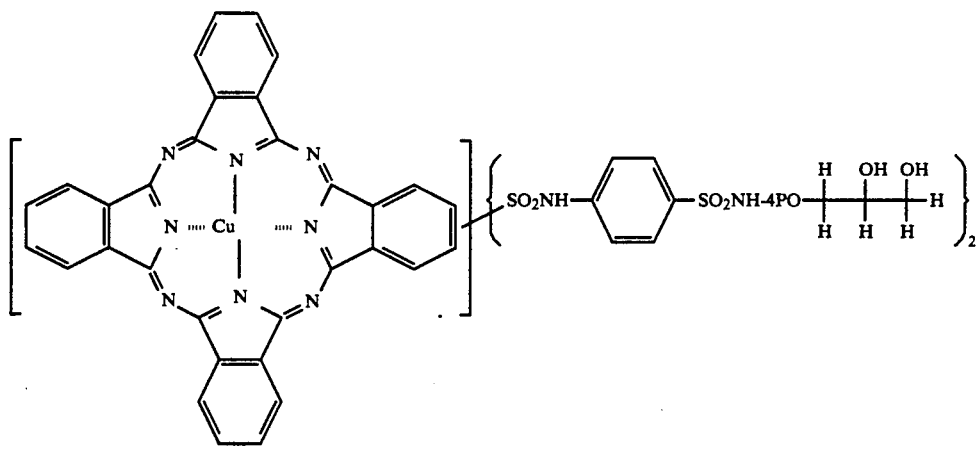

Fifty grams (0.0302 mole) of the acetal prepared in Example 11 are added along with 100 ml of water to a three necked 250 ml flask equipped with overhead stirrer, heating mantle, and Dean-Stark trap. The mixture is heated to 80° C. and 2 grams of 70% sulfuric acid are added. This reaction mixture is maintained at 80° C. until no more acetone can be detected overhead in the trap. The mixture is then cooled and the product is extracted into methylene chloride. The methylene chloride solution is separated, washed several times with water to neutral pH, and dried over anhydrous magnesium sulfate. The dried methylene chloride solution is filtered and stripped under reduced pressure at 90° C. to give a blue product containing a hydroxyl band in the IR spectrum.

EXAMPLE 13

A mixture is prepared by adding 185.1 grams (0.352 mole) of an aromatic primary amine with an amine equivalent weight of 1.41 meq/g to 52.1 grams (0.377 mole) potassium carbonate in 500 ml of water. The mixture is cooled to 10°–15° C. and 0.088 mole of an aqueous wet cake of freshly prepared nickel phthalocyaninesulfonyl chloride derivative (containing an average of about four chlorosulfonyl groups per molecule) is added to the mixture over one-half hour. When the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid.

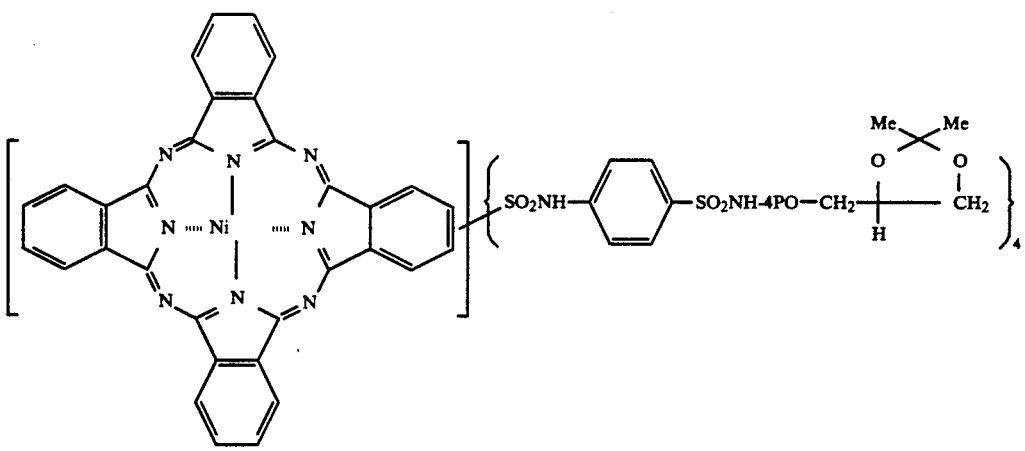

EXAMPLE 14

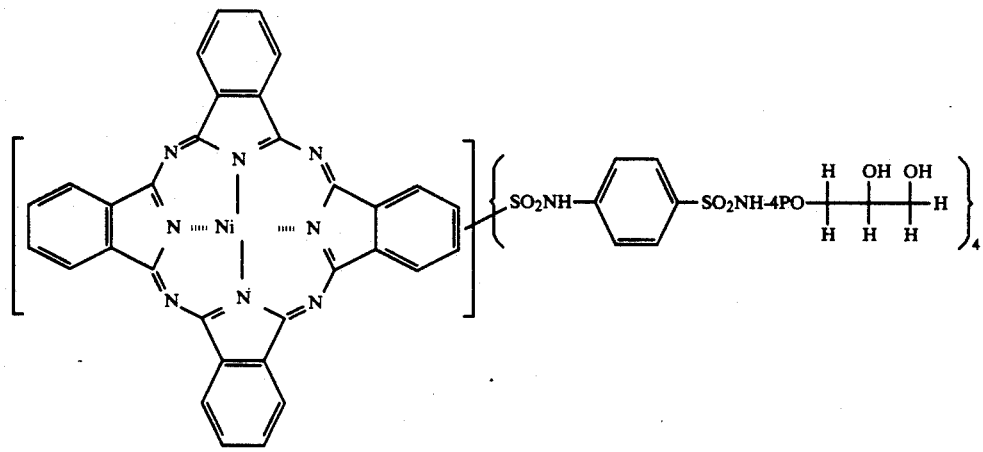

Fifty grams (0.22 mole) of the acetal prepared in Example 13 are added along with 100 ml of water to a three-necked 250 ml flask equipped with overhead stirrer, heating mantle, and Dean-Stark trap. The mixture is heated to 80° C. and 2 grams of 70% sulfuric acid are added. This reaction mixture is maintained at 80° C. until no more acetone can be detected overhead in the trap. The mixture is then cooled and the product is extracted into methylene chloride. The methylene chloride solution is separated, washed several times with water to neutral pH, and dried over anhydrous magnesium sulfate. The dried methylene chloride solution is filtered and stripped under reduced pressure at 90° C. to give a blue product containing a hydroxyl band in the IR spectrum.

EXAMPLE 15 dium carbonate (0.30 mole) in 250 grams of water. The mixture is stirred mechanically and cooled to 10°-15° C., and 259 grams (0.105 mole) of a 33% active aqueous wet cake of freshly prepared copper phthalocyaninesulfonyl chloride derivative (containing an average of about 2 chlorosulfonyl groups per molecule) are added to the mixture over one and a half hours. After the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid with an absorbance maximum at 668 nm.

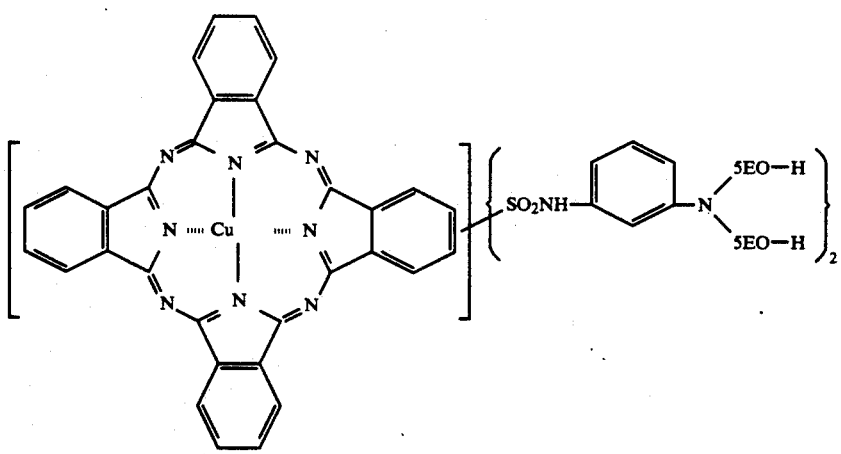

A mixture is prepared by adding 142.7 grams (0.26 mole) of an aromatic primary amine with an amine equivalent weight of 1.82 meq/g to 31.4 grams of so-

EXAMPLE 16

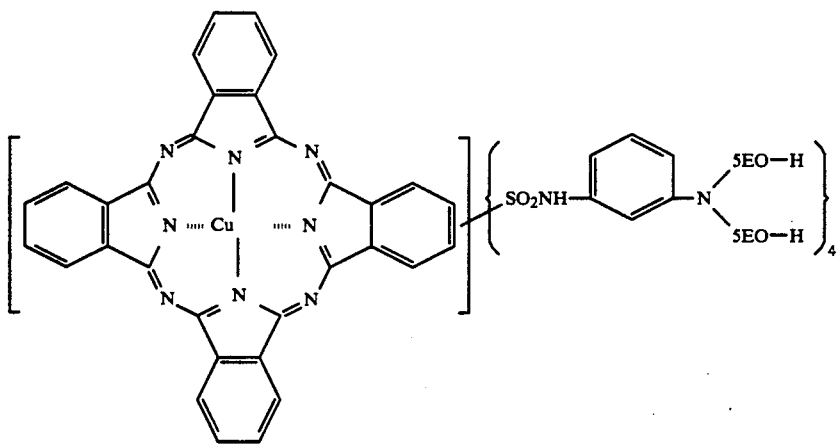

A mixture is prepared by adding 54.9 grams (0.10 mole) of an aromatic primary amine with an amine equivalent weight of 1.82 meq/g to 21.6 grams (0.20 mole) sodium carbonate in 500 ml of water. The mixture is cooled to 10°-15° C. and 0.026 mole of an aqueous wet cake of freshly prepared copper phthalocyaninesulfonyl chloride derivative (containing an average of about 4 chlorosulfonyl groups per molecule) is added to the mixture over one-half hour. After the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid with an absorbance maximum at 668 nm.

EXAMPLE 17

A mixture is prepared by adding 224.1 grams (0.41 mole) of an aromatic primary amine with an amine equivalent weight of 1.82 meq/g to 173.0 grams (1.63 mole) sodium carbonate in 1000 ml of water. The mixture is cooled to 10°-15° C. and 0.10 mole of an aqueous wet cake of freshly prepared nickel phthalocyaninesulfonyl chloride derivative (containing an average of about four chlorosulfonyl groups per molecule) is added to the mixture over about one hour. When the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid.

EXAMPLE 18

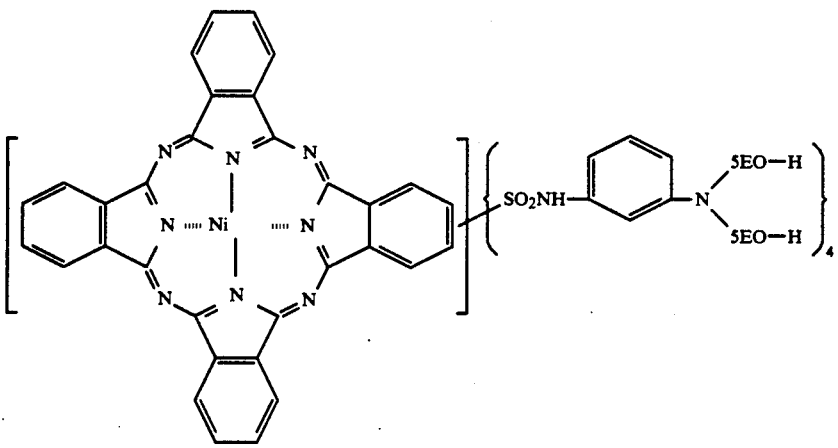

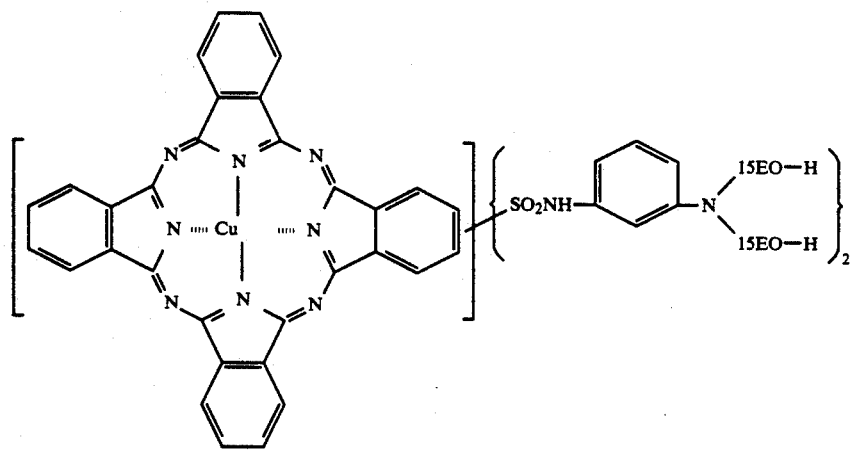

A mixture is prepared by adding 271.3 grams (0.19 mole) of an aromatic primary amine with an amine equivalent weight of 0.70 meq/g to 24.0 grams (0.23 mole) sodium carbonate in 400 ml of THF. The mixture is cooled to 10°–15° C. and 100 grams (0.61 mole) of a 50% active aqueous wet cake of freshly prepared copper phthalocyanine-sulfonyl chloride derivative (containing an average of about 2 chlorosulfonyl groups per molecule) are added to the mixture over one and a half hours. After the addition is complete, the mixture is warmed to 50° C. for an additional two hours to insure complete reaction. Afterwards, the mixture is cooled and the product is extracted into methylene chloride. The corresponding methylene chloride/THF solution is separated from the salt water solution. The THF solution is allowed to evaporate in a fume hood, 300 ml of methylene chloride solution is separated from the salt water solution, further washed several times with water to neutral pH, and dried over anhydrous magnesium sulfate. The dried solution is filtered and stripped under reduced pressure at 90° C. to a blue liquid with an absorbance maximum at 667 nm.

EXAMPLE 19

A mixture is prepared by adding 88.5 grams (0.062 mole) of an aromatic primary amine with an amine equivalent weight of 0.70 meq/g to 11.9 grams (0.11 mole) sodium carbonate in 250 ml of water. The mixture is cooled to 10°–15° C. and 0.014 mole of an aqueous wet cake of freshly prepared cobalt phthalocyaninesulfonyl chloride derivative (containing an average of about 4 chlorosulfonyl groups per molecule) is added to the mixture over one and a half hours. When the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid.

EXAMPLE 20

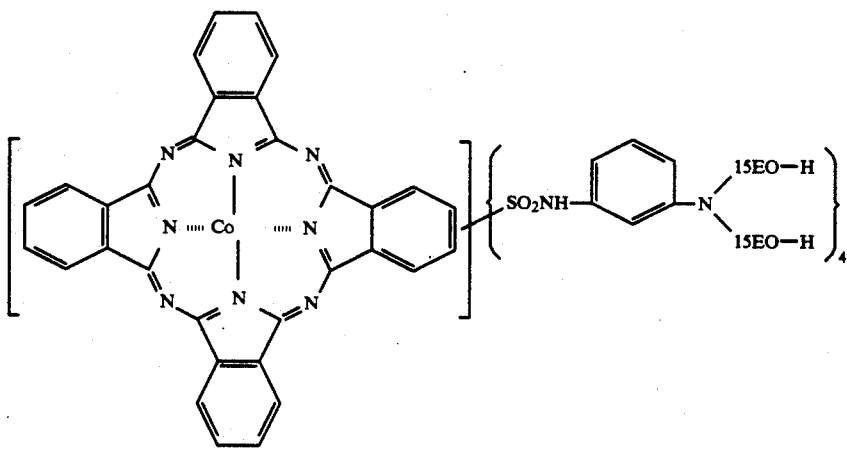

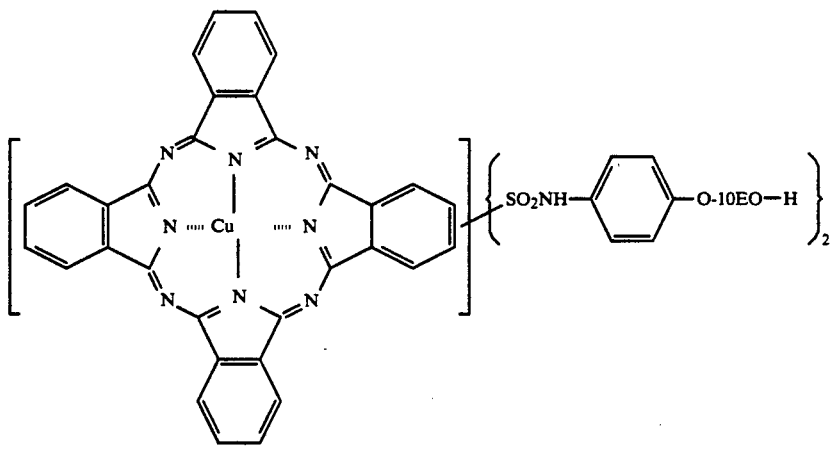

A mixture is prepared by adding 142.9 grams (0.26 mole) of an aromatic primary amine with an amine equivalent weight of 1.82 meq/g to 31.4 grams of sodium carbonate (0.30 mole) in 250 grams of water. The mixture is stirred mechanically and cooled to 10°–15° C., and 259 grams (0.105 mole) of a 33% active aqueous wet cake of freshly prepared copper phthalocyaninesulfonyl chloride derivative (containing an average of about 2 chlorosulfonyl groups per molecule) are added to the mixture over one and a half hours. After the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid.

EXAMPLE 21

A mixture is prepared by adding 225.3 grams (0.41 mole) of an aromatic primary amine with an amine equivalent weight of 1.82 meq/g to 173.0 grams (1.63 mole) sodium carbonate in 1000 ml of water. The mixture is cooled to 10°–15° C. and 0.10 mole of an aqueous wet cake of freshly prepared nickel phthalocyaninesulfonyl chloride derivative (containing an average of about four chlorosulfonyl groups per molecule) is added to the mixture over about one hour. When the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid.

EXAMPLE 22

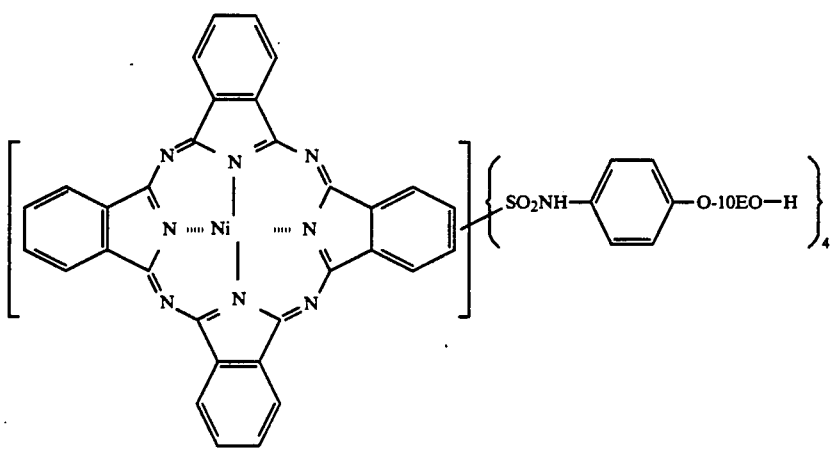

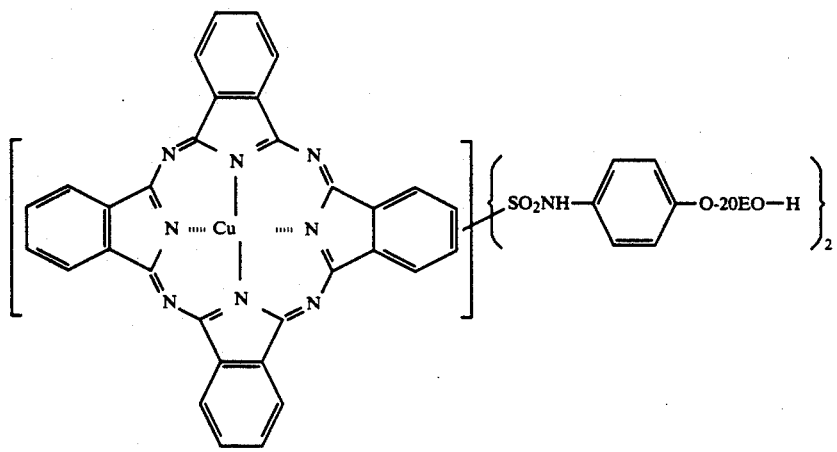

A mixture is prepared by adding 257.1 grams (0.26 mole) of an aromatic primary amine with an amine equivalent weight of 1.01 meq/g) to 31.4 grams of sodium carbonate (0.30 mole) in 250 grams of water. The mixture is stirred mechanically and cooled to 10°–15° C., and 259 grams (0.105 mole) of a 33% active aqueous wet cake of freshly prepared copper phthalocyaninesulfonyl chloride derivative (containing an average of about 2 chlorosulfonyl groups per molecule) are added to the mixture over one and a half hours. After the solution is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid with an absorbance maximum at 668 nm.

EXAMPLE 23

A mixture is prepared by adding 61.3 grams (0.62 mole) of an aromatic primary amine with an amine equivalent weight of 1.01 meq/g to 11.9 grams (0.11 mole) sodium carbonate in 250 ml of water. The mixture is cooled to 10°–15° C. and 0.014 mole an aqueous wet cake of freshly prepared cobalt phthalocyaninesulfonyl chloride derivative (containing an average of about four chlorosulfonyl groups per molecule) is added to the mixture over one and a half hours. When the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid with an absorbance maximum at 668 nm.

EXAMPLE 24

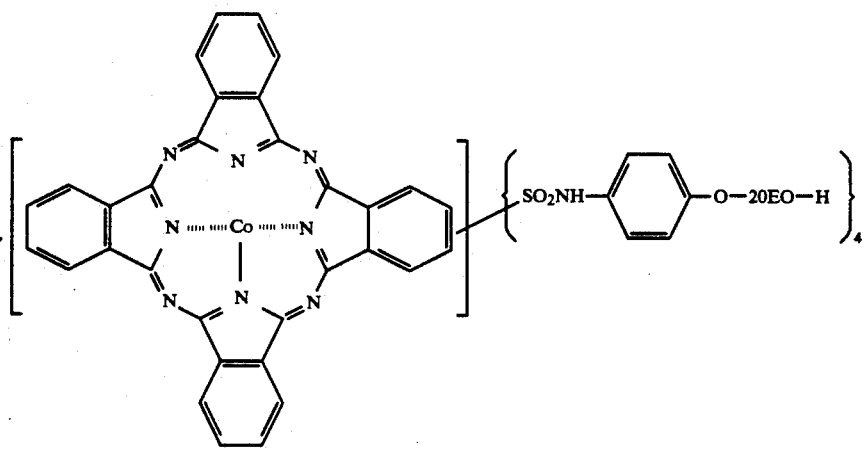

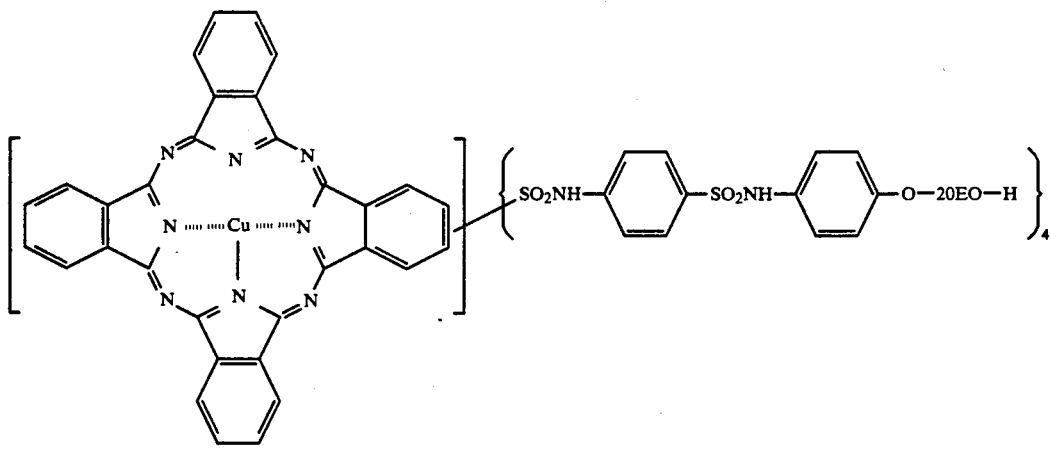

A mixture is prepared by adding 114.4 grams (0.10 mole) of an aromatic primary amine with an amine equivalent weight of 0.87 meq/g to 21.6 grams (0.20 mole) sodium carbonate in 500 ml of water. The mixture is cooled to 10°–15° C. and 0.026 mole of an aqueous wet cake of freshly prepared copper phthalocyaninesulfonyl chloride derivative (containing an average of about 4 chlorosulfonyl groups per molecule) is added to the mixture over one-half hour. After the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid with an absorbance maximum at 664 nm.

EXAMPLE 25

A mixture is prepared by adding 288.2 grams (0.41 mole) of an aromatic primary amine with an amine equivalent weight of 1.42 meq/g to 173.0 grams (1.63 mole) sodium carbonate in 1000 ml of water. The mixture is cooled to 10°–15° C. and 0.10 mole of an aqueous wet cake of freshly prepared nickel phthalocyaninesulfonyl chloride derivative (containing an average of about 4 chlorosulfonyl groups per molecule) is added to the mixture over about one hour. When the addition is complete, the mixture is warmed to 50° C. for an additional two hours to insure complete reaction. Afterwards, the mixture is cooled and the product is extracted into methylene chloride. The methylene chloride solution is separated from the salt water solution, washed several times with water to neutral pH, and dried over anhydrous magnesium sulfate. The dried methylene chloride solution is filtered and stripped under reduced pressure at 90° C. to give a blue liquid.

EXAMPLE 26

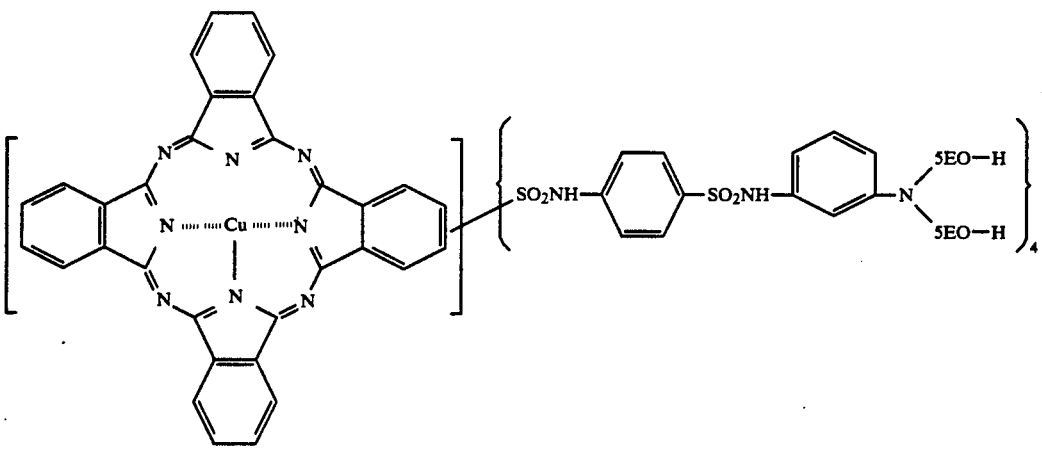

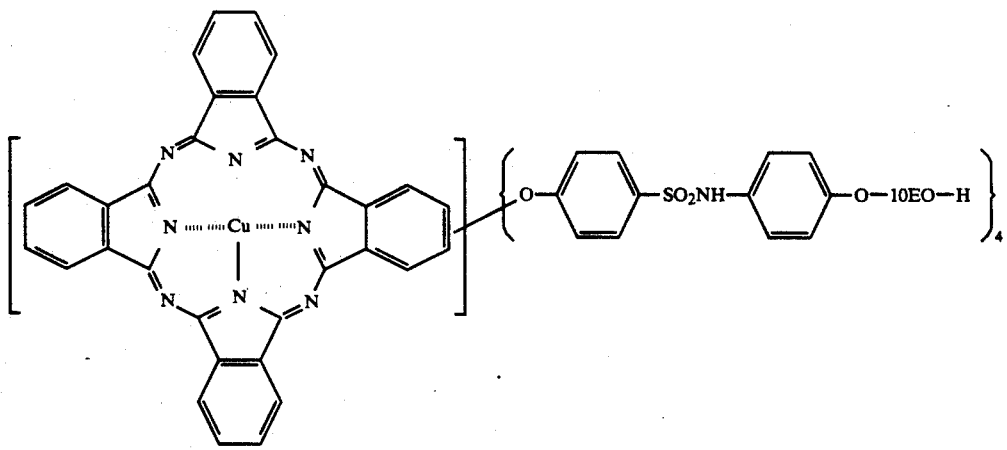

A mixture is prepared by adding 60.3 grams (0.11 mole) of an aromatic primary amine with an amine equivalent weight of 1.82 meq/g) to 25.7 grams sodium carbonate in 500 ml of water. The mixture is cooled to 10°–15° C. and 0.0242 mole of an aqueous wet cake of freshly prepared tetraphenoxy copper phthalocyanine sulfonyl chloride derivative (containing an average of about four chlorosulfonyl groups per molecule) is added to the mixture. After the addition is complete, the mixture was warmed to 50° C. for an additional two hours to insure complete reaction. Three hundred ml of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue liquid.

Chlorosulfonation of copper tetraphenoxyphthalocyanine

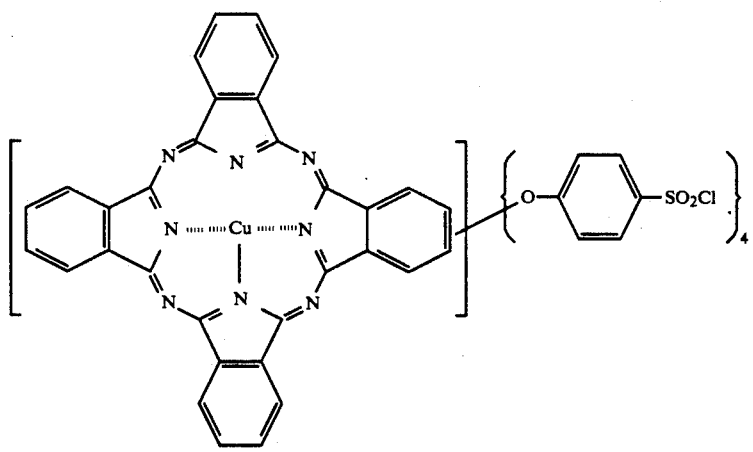

Thirty one grams (0.03 mole) of copper tetraphenoxyphthalocyanine are dissolved at less than 0° C. in 263 grams of chlorosulfuric acid. The cooling bath is removed and the solution is allowed to warm to room temperature over two hours. The solution is further heated to 30° C. for about two hours after which the heat is removed and the solution is allowed to stir overnight at room temperature. The solution is then poured very gradually into a stirred mixture of water and ice. The dull blue suspension is filtered and washed with ice water several times.

Preparation of copper tetraphenoxyphthalocyanine

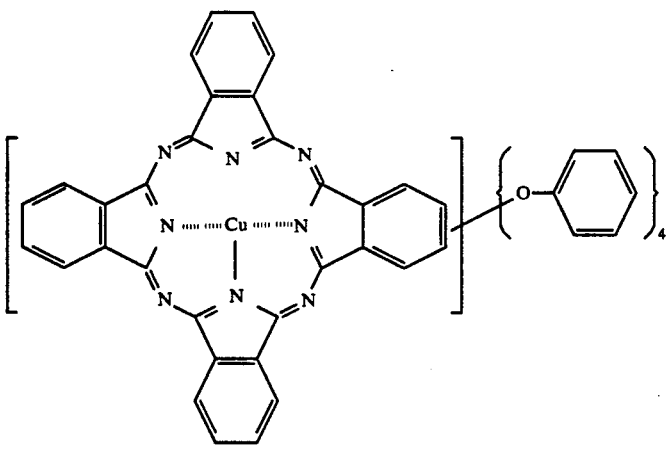

A mixture is prepared by adding of 147 grams (0.67 mole) of 4-phenoxyphthalonitrile, 16.6 grams (0.16 mole) of cuprous chloride to 2670 ml of Cellosolve. The mixture is heated at reflux. One hundred and two grams (0.67 mole) of DBU(1,8-diazabicyclo[5.4.0]-undec-7-ene are added to the reaction mixture. This mixture is then heated at reflux for about six hours. During this time the reaction proceeds and the mixture turns blue and a solid precipitates. The precipitate is collected by filtration, washed with 3 percent hydrochloric acid solution, water, then ethanol. The copper tetraphenoxyphthalocyanine is obtained with a maximum absorbance at 680 nm.

Phenoxyphthalonitrile

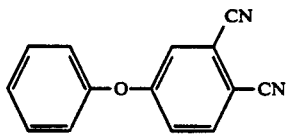

A mixture is prepared by adding 104 grams (1.1 moles) of phenol, 173 grams (1 mole of 4-nitrophthalonitrile, and 207 grams of potassium carbonate in 1667 ml of dimethylformamide. The mixture is heated to 70° C. and mechanically stirred. Samples are taken of this reaction mixture periodically and analyzed by GLC. After five hours, the reaction is complete. The 4-phenoxyphthalonitrile is isolated by quenching the crude reaction mixture in ice water. The product is further purified by washing the crude precipitate with dilute sodium carbonate and then water. Finally the 4-phenoxyphthalonitrile is vacuum dried at 60° C.

EXAMPLE 27

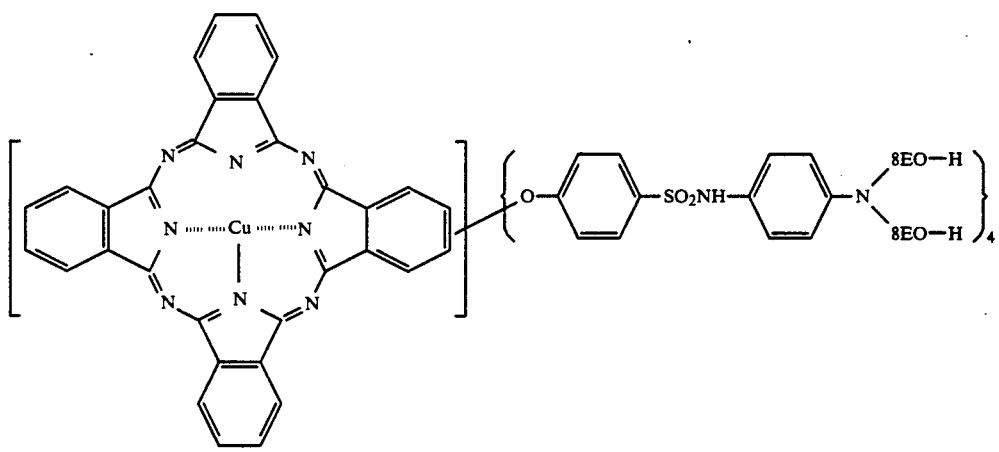

A mixture is prepared by adding 84.5 grams (0.11 mole) of an aromatic primary amine with an amine equivalent weight of 1.30 meq/g) to 25.7 grams sodium carbonate in 500 ml of water. The mixture is cooled to 10°-15° C. and 0.0242 mole of an aqueous wet cake of freshly prepared tetraphenoxy copper phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred ml of methylene chloride are added followed by 300 milliters of water. The methylene chloride solution is separated from the salt water solution, further washed several times with water to neutral pH, and dried over anhydrous magnesium sulfate. The dried solution is filtered and stripped under reduced pressure at 90° C. to give a blue liquid.

EXAMPLE 28

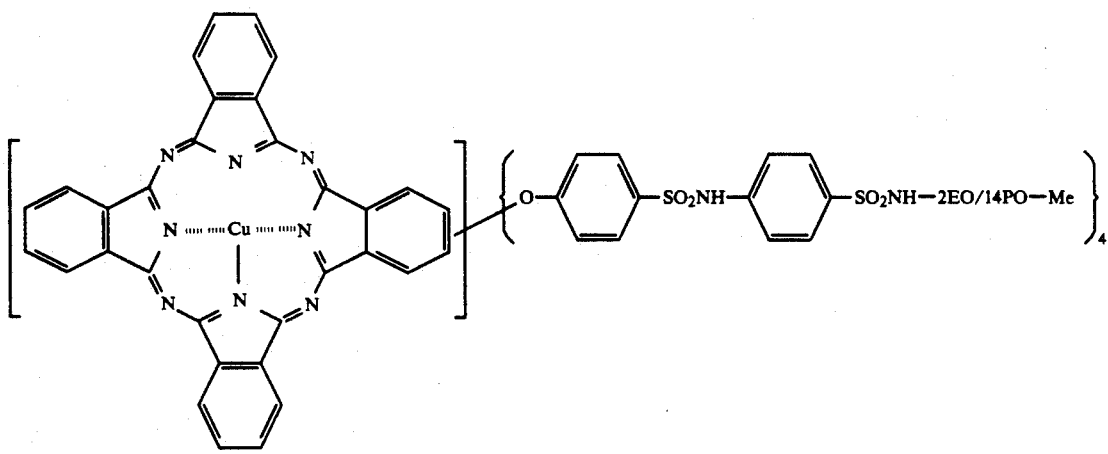

A mixture is prepared by adding 100.1 grams (0.11 mole) of an aromatic primary amine with an amine equivalent weight of 1.09 meq/g to 25.7 grams sodium carbonate in 500 ml of water. The mixture is cooled to 10°–15° C. and 0.0242 mole of an aqueous wet cake of freshly prepared tetraphenoxy copper phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue liquid.

EXAMPLE 29

A mixture is prepared by adding 142.5 grams (0.275 mole) of an aromatic primary amine with an amine equivalent weight of 1.93 meq/g to 64.7 grams sodium carbonate in 400 ml of THF. The mixture is cooled to 10°–15° C. and 0.061 mole of an aqueous wet cake of freshly prepared tetraphenoxy copper phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue liquid.

EXAMPLE 30

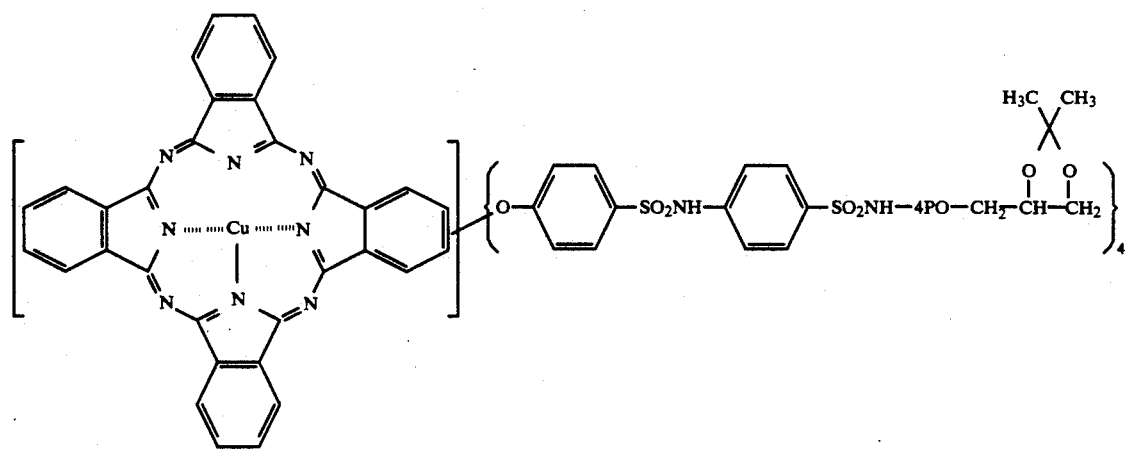

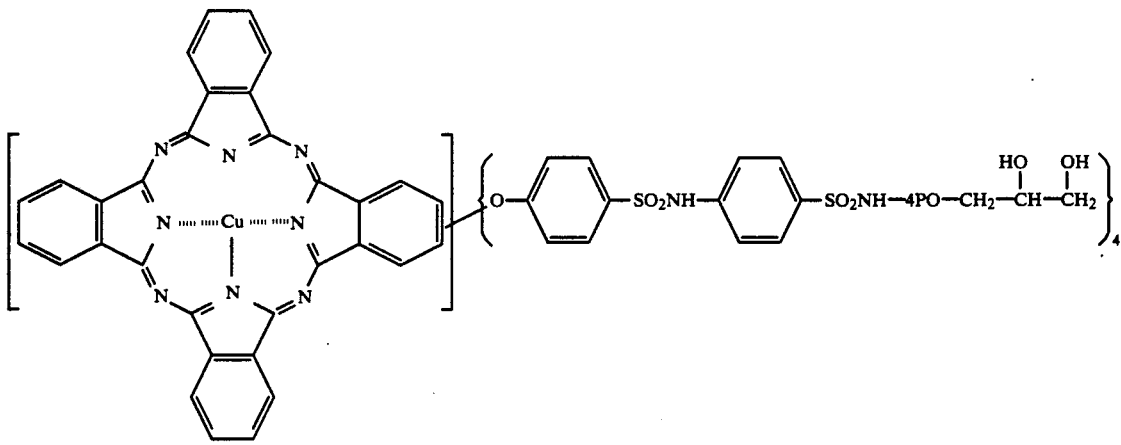

One hundred and eighty grams (0.061 mole) of the acetal prepared in Example 29 are added along with 100 ml of water to a three-necked 250 ml flask equipped with overhead stirrer, heating mantle, and Dean-Stark trap. The mixture is heated to 80° C. and 4 grams of 70% sulfuric acid are added. This reaction mixture is maintained at 80° C. until no more acetone can be detected overhead in the trap. The mixture is then cooled and the product is extracted into methylene chloride. The methylene chloride solution is separated, washed several times with water to neutral pH, and dried over anhydrous magnesium sulfate. The dried methylene chloride solution is filtered and stripped under reduced pressure at 90° C. to give a blue product containing a hydroxyl band in the IR spectrum.

EXAMPLE 31 equivalent weight of 1.01 meq/g) to 42.4 grams sodium carbonate in 400 ml of THF. The mixture is cooled to 10°-15° C. and 0.040 mole of an aqueous wet cake of freshly prepared tetraphenoxy cobalt phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred milliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue colorant.

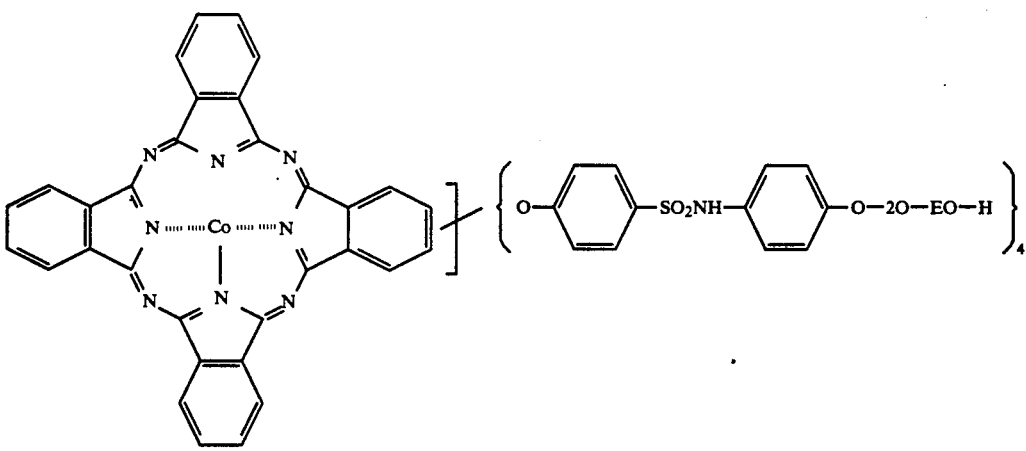

A mixture is prepared by adding 177.8 grams (0.18 mole) of an aromatic primary amine with an amine Sulfonation of cobalt tetraphenoxyphthalocyanine

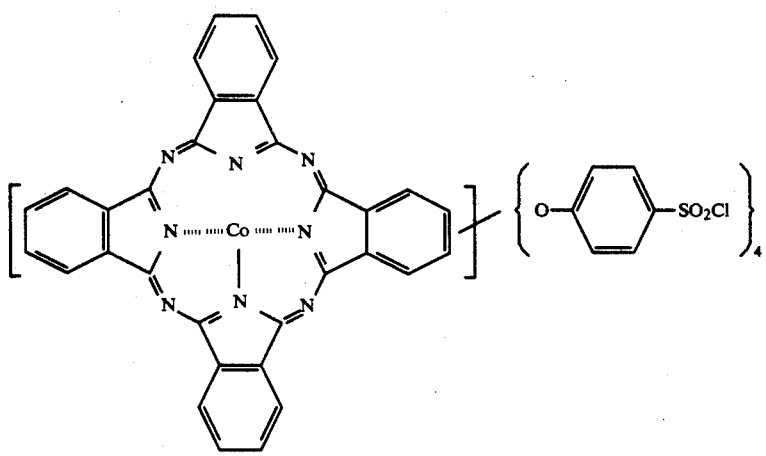

Thirty-one grams (0.03 mole) of cobalt tetraphenoxyphthalocyanine are dissolved at less than 0° C. in 260 grams of chlorosulfuric acid. The cooling bath is removed and the solution is allowed to warm to room temperature over two hours. The solution is further heated to 30° C. for about two hours after which the heat is removed and the solution is allowed to stir overnight at room temperature. The solution is then poured very gradually into a stirred mixture of water and ice. The dull blue suspension is filtered and washed with ice water several times.

Preparation of cobalt tetraphenoxyphthalocyanine

A mixture is prepared by adding of 147 grams (0.667 mole) of 4-phenoxyphthalonitrile, and 20.8 grams (0.162 mole) of cobalt(II) chloride to 2632 ml of butyl Cellosolve. The mixture is heated at reflux. One hundred grams (0.667 mole) of DBU (1,8-diazabicyclo[5.4.0]-undec-7-ene) are added to the reaction mixture. This mixture is then heated at reflux for about six hours. During this time the reaction proceeds and the mixture turns blue and a solid precipitates. The precipitate is collected by filtration, washed with 3 percent hydrochloric acid solution, water, then ethanol.

EXAMPLE 32

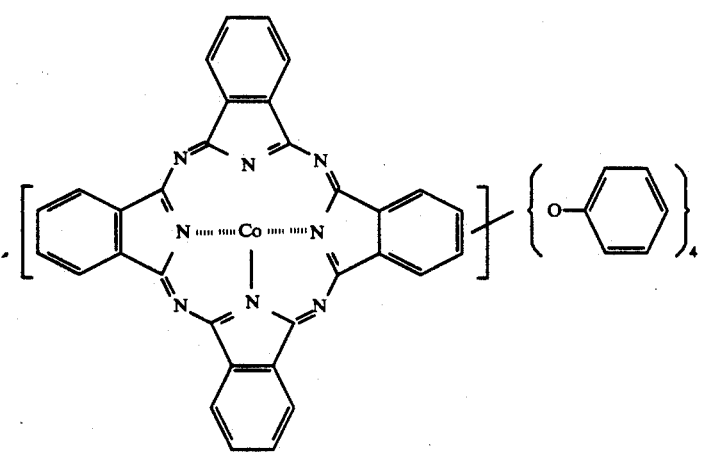

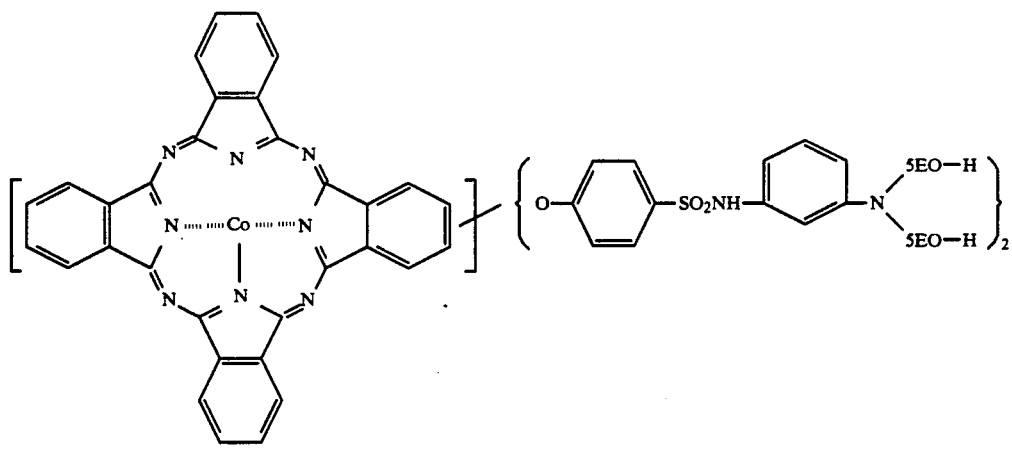

A mixture is prepared by adding 98.6 grams (0.18 mole) of an aromatic primary amine with an amine equivalent weight of 1.82 meq/g) to 42.4 grams sodium carbonate in 400 ml of THF. The mixture is cooled to 10°-15° C. and 0.040 mole of an aqueous wet cake of freshly prepared tetraphenoxy cobalt phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred milliters of methylene chloride is added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue colorant.

A mixture is prepared by adding 122.7 grams (0.16 mole) of an aromatic primary amine with an amine equivalent weight of 1.30 meq/g) to 36.2 grams sodium carbonate in 200 ml of THF. The mixture is cooled to 10°-15° C. and 0.0242 mole of an aqueous wet cake of freshly prepared tetraphenoxy nickel phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred milliters of methylene chloride solution is separated from the salt water solution, further washed several times with water to neutral pH, and dried over anhydrous magnesium sulfate. The dried solution is filtered and stripped under reduced pressure at 90° C. to give a blue liquid.

EXAMPLE 33

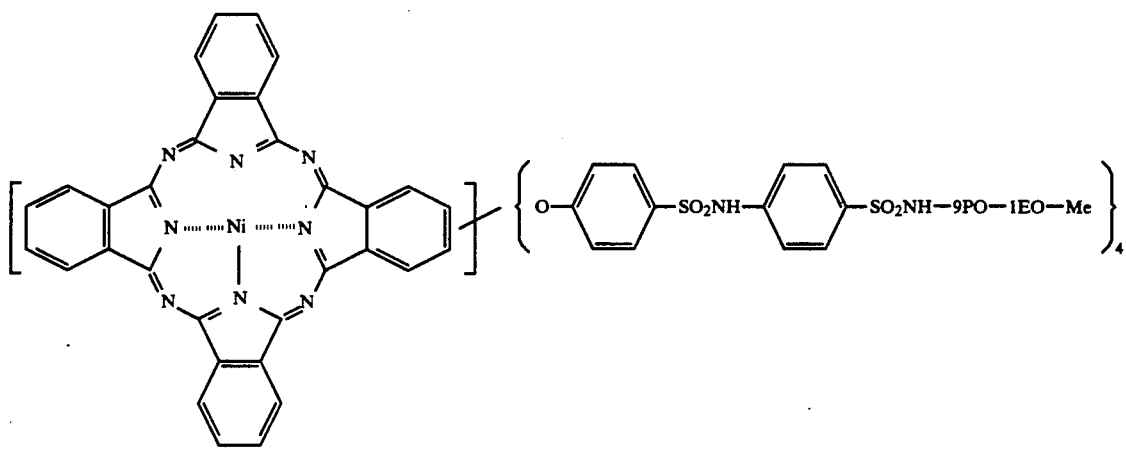

Chlorosulfonation of nickel tetraphenoxyphthalocyanine

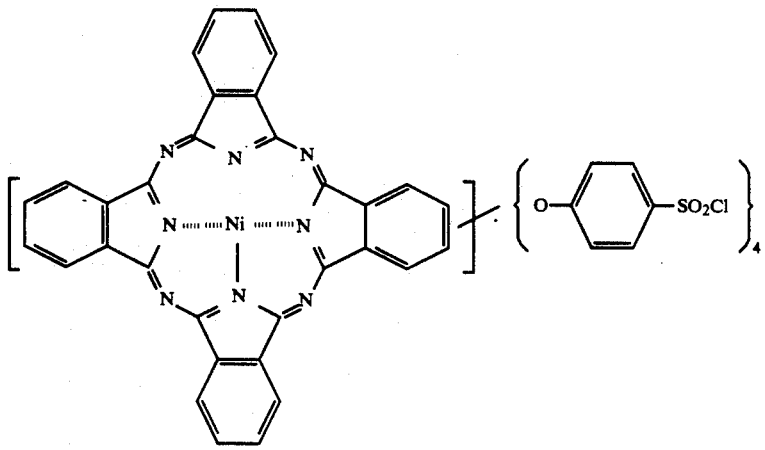

Thirty-one grams (0.0344 mole) of nickel tetraphenoxyphthalocyanine are dissolved at less than 0° C. in 264 grams of chlorosulfuric acid. The cooling bath is removed and the solution is allowed to warm to room temperature over two hours. The solution is further heated to 30° C. for about two hours after which the heat is removed and the solution is allowed to stir overnight at room temperature. The solution is then poured very gradually into a stirred mixture of water and ice. The dull blue suspension is filtered and washed with ice water several times.

Preparation of nickel tetraphenoxyphthalocyanine mole) of nickel(II) acetate tetrahydrate to 925 ml of Cellosolve. The mixture is heated at reflux collecting water in a Dean-Start trap. The trap is emptied of azeotrope several times to insure that water was removed and make-up Cellosolve solvent is added to keep the volume constant in the reaction vessel. Thirty-one grams (0.20 mole) of DBU (1,8-diazabicyclo[5.4.0]-undec-7-ene) are added to the reaction mixture. This mixture is then heated at reflux for about six hours. During this time the reaction proceeds and the mixture turns blue and a solid precipitates. The precipitate is collected by filtration, washed with 3 percent hydrochloric acid solution, water, then ethanol. A yield of 22.3 grams of nickel tetraphenoxyphthalocyanine is obtained with maximum absorbance at 672 nm.

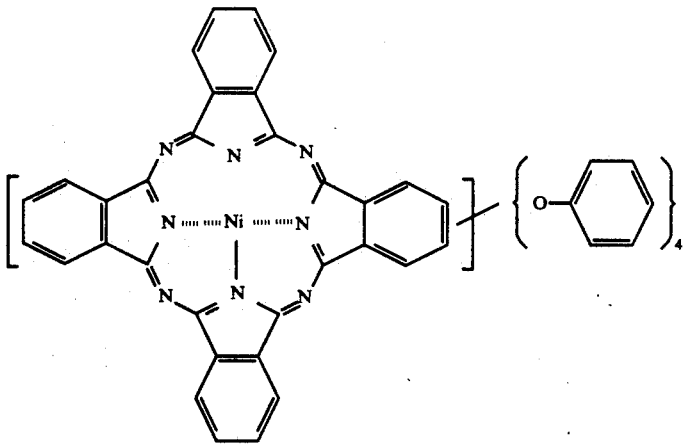

A mixture is prepared by adding of 44 grams (0.20 mole) of 4-phenoxyphthalonitrile, 12.4 grams (0.05

EXAMPLE 34

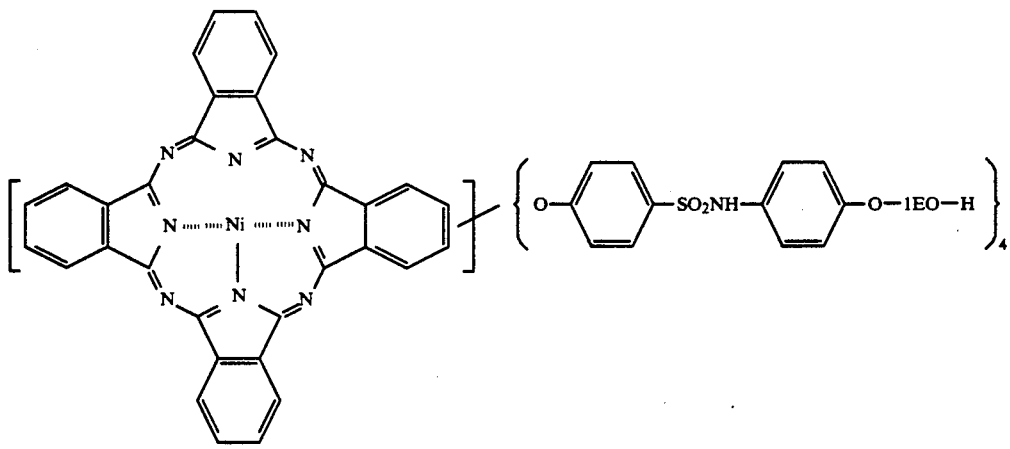

A mixture is prepared by adding 87.7 grams (0.16 mole) of an aromatic primary amine with an amine equivalent weight of 1.82 meq/g to 36.2 grams sodium carbonate in 200 ml of THF. The mixture is cooled to 10°–15° C. and 0.0242 mole of an aqueous wet cake of freshly prepared tetraphenoxy nickel phthalocyanine sulfonyl chloride derivative (containing an average of about four chlorsulfonyl groups per molecule) is added to the mixture. After the addition is complete, t he mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue liquid.

EXAMPLE 35

A mixture is prepared by adding 87.7 grams (0.16 mole) of an aromatic primary amine with an amine equivalent weight of 1.82 meq/g to 36.2 grams sodium carbonate in 200 ml of THF. The mixture is cooled to 10°–15° C. and 0.0242 mole of an aqueous wet cake of freshly prepared tetraphenoxy nickel phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue liquid.

EXAMPLE 36

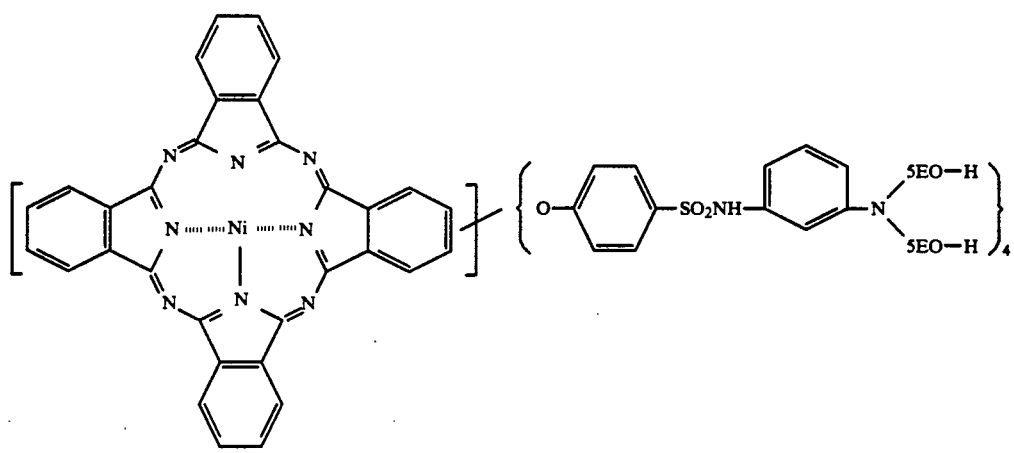

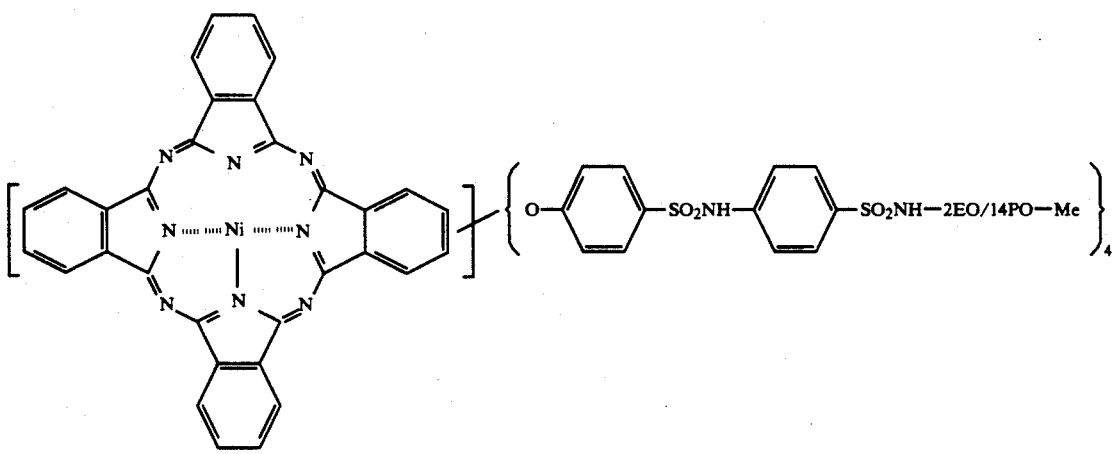

A mixture is prepared by adding 146.9 grams (0.275 mole) of an aromatic primary amine with an amine equivalent weight of 1.09 meq/g) to 64.7 grams sodium carbonate in 400 ml of THF. The mixture is cooled to 10°-15° C. and 0.061 mole of an aqueous wet cake of freshly prepared tetraphenoxy copper phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue liquid.

EXAMPLE 37

A mixture is prepared by adding 142.5 grams (0.275 mole) of an aromatic primary amine with an amine equivalent weight of 1.93 meq/g) to 64.7 grams sodium carbonate in 400 ml of THF. The mixture is cooled to 10°-15° C. and 0.061 mole of an aqueous wet cake of freshly prepared tetraphenoxy copper phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred ml of methylene chloride is added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue liquid.

EXAMPLE 38

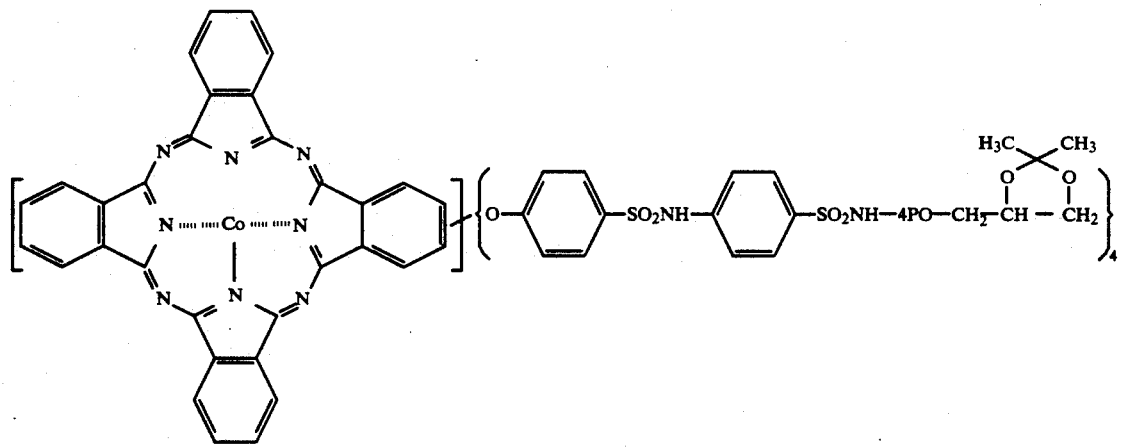

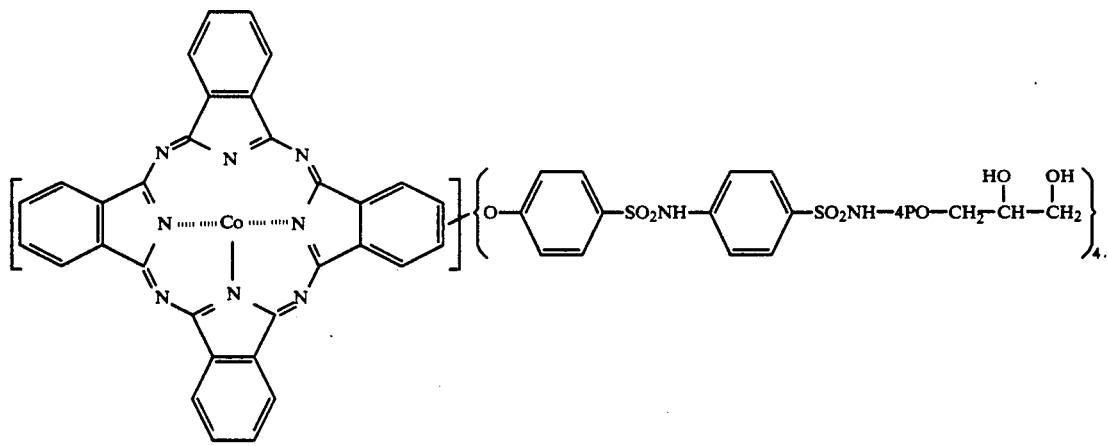

One hundred and eighty grams (0.061 mole) of the acetal prepared in Example 37 are added along with 100 ml of water to a three-necked 250 ml flask equipped with overhead stirrer, heating mantle, and Dean-Stark trap. The mixture is heated to 80° C. and 4 grams of 70% sulfuric acid are added. This reaction mixture is maintained at 80° C. until no more acetone can be detected overhead in the trap. The mixture is then cooled and the product is extracted into methylene chloride. The methylene chloride solution is separated, washed several times with water to neutral pH, and dried over anhydrous magnesium sulfate. The dried methylene chloride solution is filtered and stripped under reduced pressure at 90° C. to give a blue product containing a hydroxyl band in the IR spectrum.

EXAMPLE 39

A mixture is prepared by adding 142.4 grams (0.275 mole) of an aromatic primary amine with an amine equivalent weight of 1.93 meq/g to 64.7 grams sodium carbonate in 400 ml of THF. The mixture is cooled to 10°–15° C. and 0.061 mole of an aqueous wet cake of freshly prepared tetraphenoxy nickel phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue liquid.

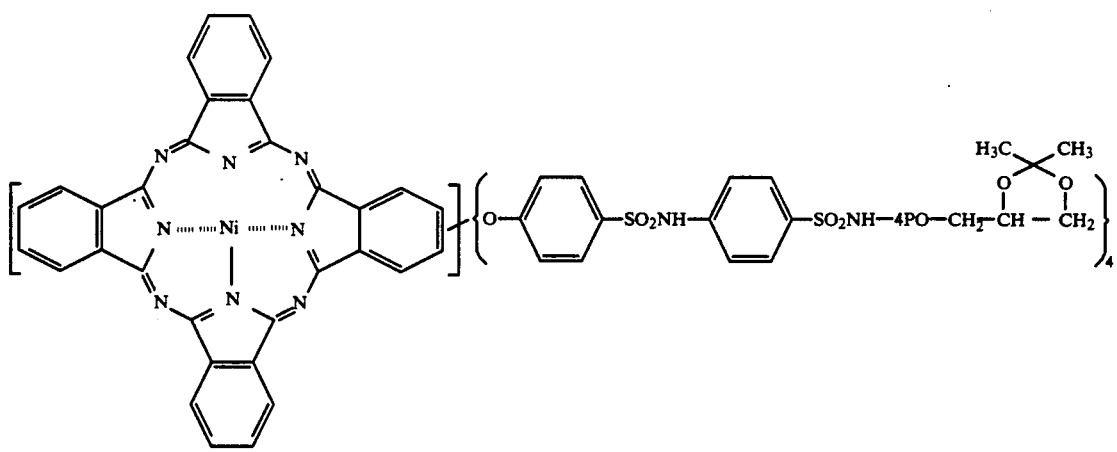

EXAMPLE 40

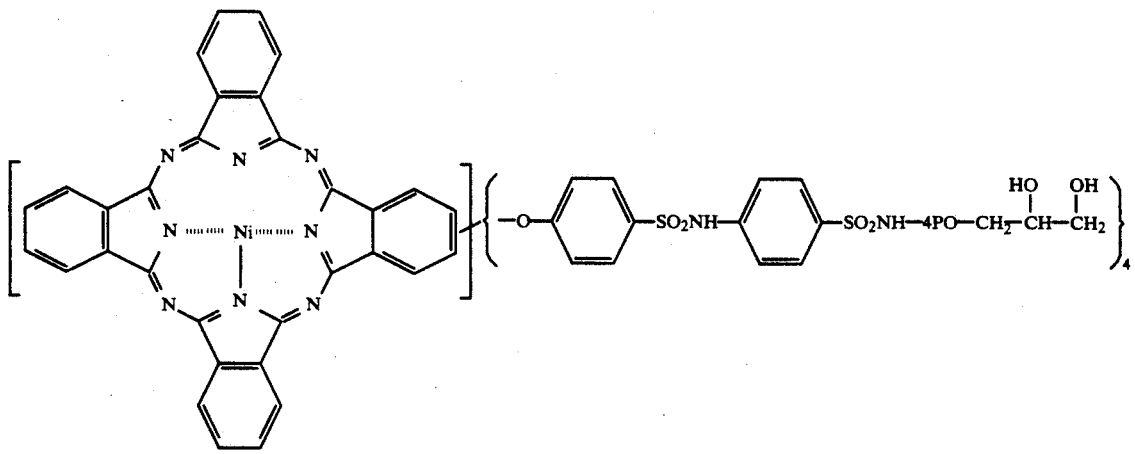

One hundred and eighty grams (0.061 mole) of the acetal prepared in Example 39 are added along with 100 ml of water to a three-necked 250 ml flask equipped with overhead stirrer, heating mantle, and Dean-Stark trap. The mixture is heated to 80° C. and 4 grams of 70% sulfuric acid are added. This reaction mixture is maintained at 80° C. until no more acetone can be detected overhead in the trap. The mixture is then cooled and the product is extracted into methylene chloride. The methylene chloride solution is separated, washed several times with water to neutral pH, and dried over anhydrous magnesium sulfate. The dried methylene chloride solution is filtered and stripped under reduced pressure at 90° C. to give a blue product containing a hydroxyl band in the IR spectrum.

EXAMPLE 41 equivalent weight of 1.82 meq/g to 31.8 grams sodium carbonate in 400 ml of water. The mixture is cooled to 10°–15° C. and 0.030 mole of an aqueous wet cake of freshly prepared tetra-p-methoxyphenoxy copper phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred milliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue liquid.

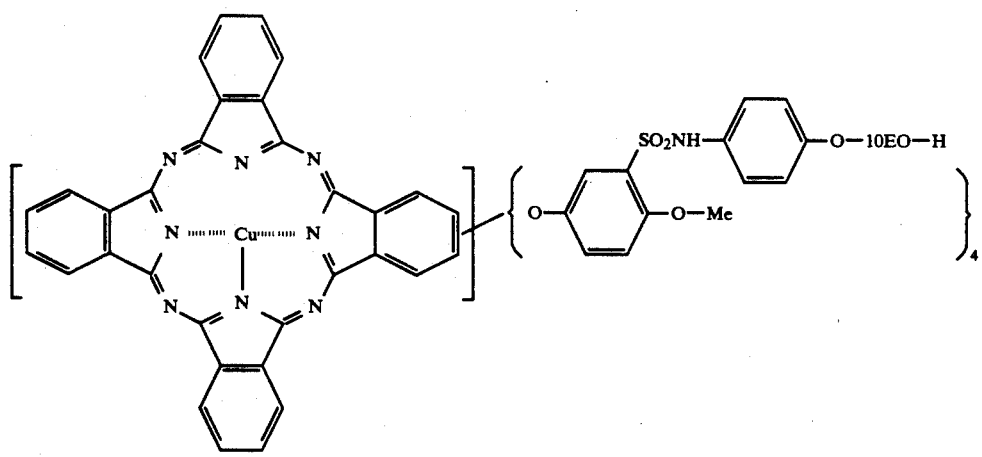

A mixture is prepared by adding 74.0 grams (0.135 mole) of an aromatic primary amine with an amine

Chlorosulfonation of copper tetra-p-methoxyphenoxyphthalocyanine

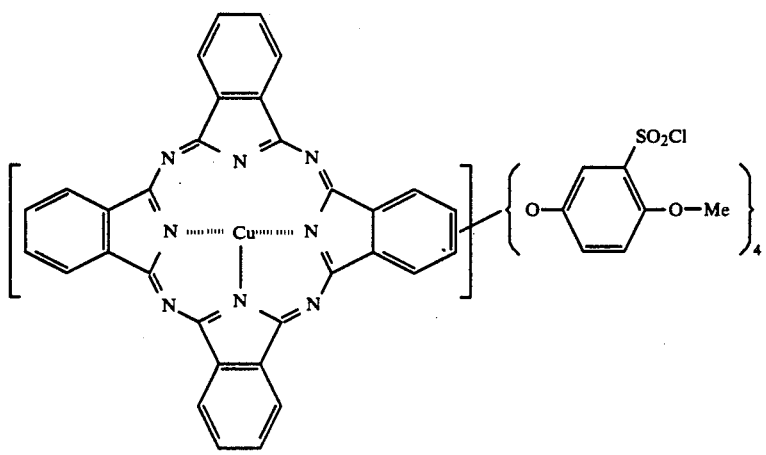

Thirty-five grams (0.03 mole) of copper tetra-p-methoxyphenoxyphthalocyanine are dissolved at less than 0° C. in 263 grams of chlorosulfuric acid. The cooling bath is removed and the solution is allowed to warm to room temperature over two hours. The solution is further heated to 30° C. for about two hours after which the heat is removed and the solution is allowed to stir overnight at room temperature. The solution is then poured very gradually into a stirred mixture of water and ice. The dull blue suspension is filtered and washed with ice water several times.

Preparation of copper tetra-p-methoxyphenoxyphthalocyanine

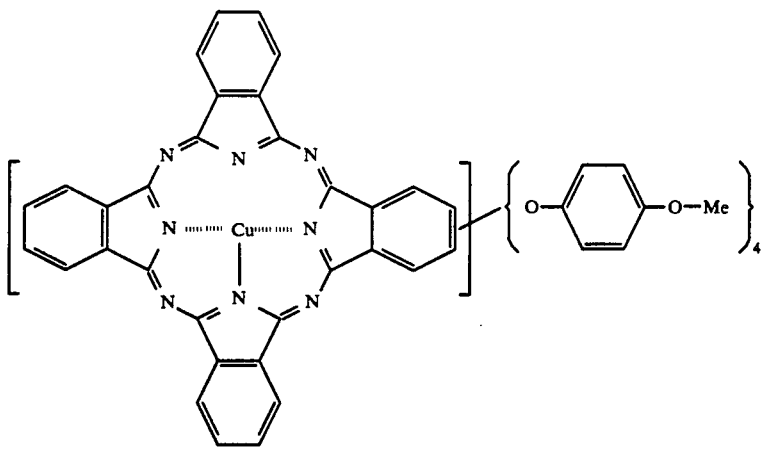

A mixture is prepared by adding of 164.5 grams (0.67 mole) of p-methoxyphenoxyphthalonitrile, 16.3 grams (0.166 mole) of cuprous chloride to 4000 ml of butyl Cellosolve. The mixture is heated at reflux. One hundred and two grams (0.67 mole) of DBU (1,8-diazabicyclo[5.4.0]-undec-7-ene) are added to the reaction mixture. This mixture is then heated at reflux for about six hours. During this time the reaction proceeds and the mixture turns blue and a solid precipitates. The precipitate is collected by filtration, washed with 3 percent hydrochloric acid solution, water, then ethanol. The copper tetra-p-methoxyphenoxyphthalocyanine is obtained with maximum absorbance at 680 nm.

P-Methoxyphenoxyphthalonitrile

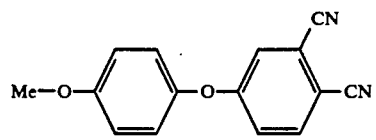

A mixture is prepared by adding 136.4 grams (1.1 moles) of p-methoxyphenol, 173 grams (1 mole) of 4-nitrophthalonitrile, and 207 grams of potassium carbonate in 1667 ml of dimethylformamide. The mixture is heated to 70° C. and mechanically stirred. Samples are taken of this reaction mixture periodically and analyzed by GLC. After five hours, the reaction is complete. The p-methoxyphenoxyphthalonitrile is isolated by quenching the crude reaction mixture in ice water. The product is further purified by washing the crude precipitate with dilute sodium carbonate and then water. Finally the p-methoxyphenoxyphthalonitrile is vacuum dried at 60° C.

EXAMPLE 42

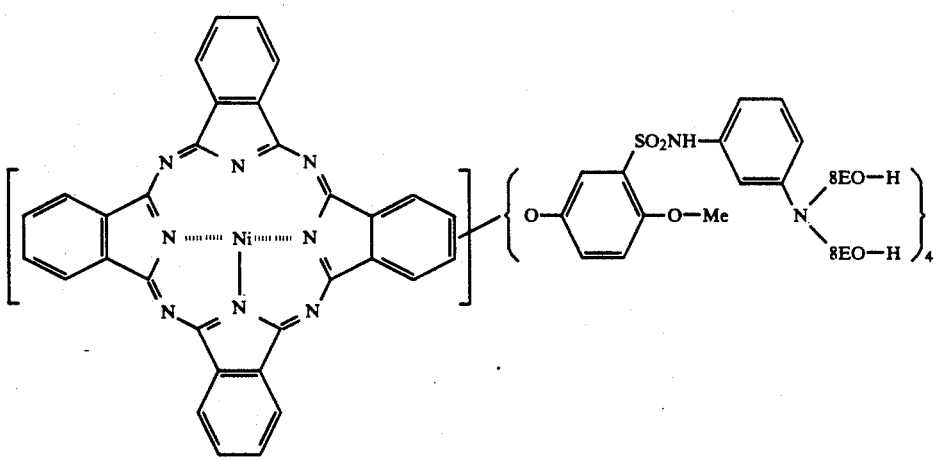

A mixture is prepared by adding 138.2 grams (0.18 mole) of an aromatic primary amine with an amine equivalent weight of 1.30 meq/g) to 42.4 grams sodium carbonate in 400 ml of THF. The mixture is cooled to 10°-15° C. and 0.040 mole of an aqueous wet cake of freshly prepared tetra-p-methoxyphenoxy nickel phthalocyanine sulfonyl chloride derivative (containing an average of about four chlorsulfonyl groups per molecule) is added to the mixture. After the addition is complete, the mixture is warmed to 50° C. for an additional two hours to insure complete reaction. Three hundred milliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue colorant.

EXAMPLE 43

A mixture is prepared by adding 165.2 grams (0.18 mole) of an aromatic primary amine with an amine equivalent weight of 1.09 meq/g) to 42.4 grams sodium carbonate in 400 ml of THF. The mixture is cooled to 10°-15° C. and 0.040 mole of an aqueous wet cake of freshly prepared tetra-p-methoxyphenoxy cobalt phthalocyanine sulfonyl chloride derivative (containing an average of about four chlorosulfonyl groups per molecule) is added to the mixture. After the addition is complete, the mixture is warmed to 50° C. for an additional two hours to insure complete reaction. Three hundred milliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue colorant.

EXAMPLE 44

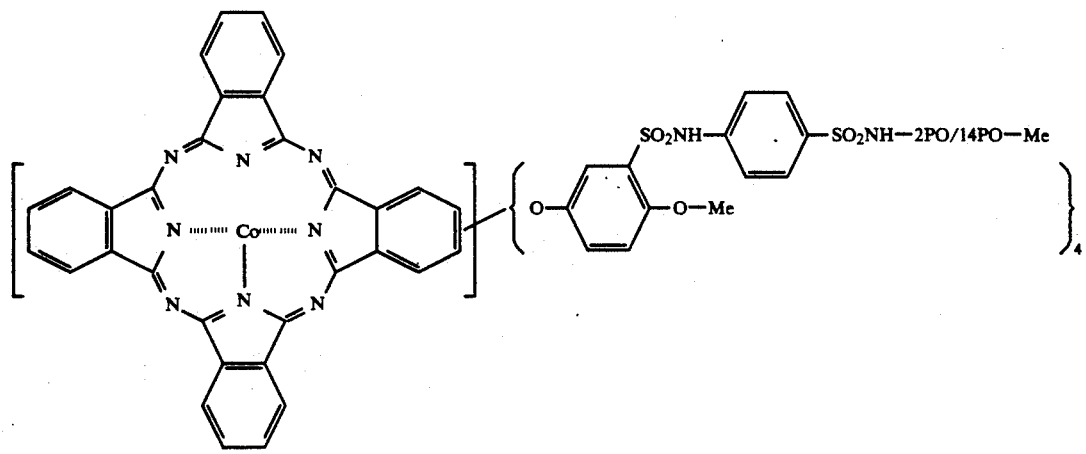

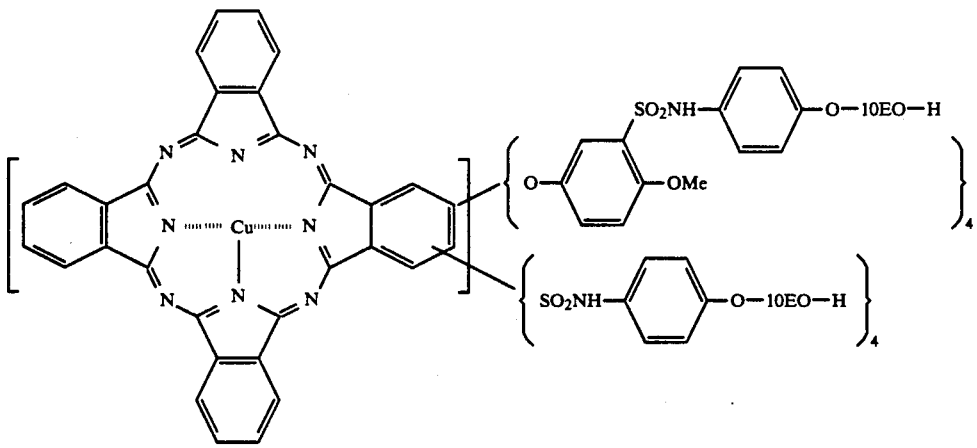

A mixture is prepared by adding 168 grams (0.306 mole) of an aromatic primary amine with an amine equivalent weight of 1.82 meq/g) to 72.1 grams sodium carbonate in 400 ml of THF. The mixture is cooled to 10°–15° C. and 0.034 mole of an aqueous wet cake of freshly prepared tetraphenoxy copper phthalocyanine sulfonyl chloride derivative (containing an average of about eight chlorosulfonyl groups per molecule) is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue colorant.

Chlorosulfonation of copper tetraphenoxyphthalocyanine

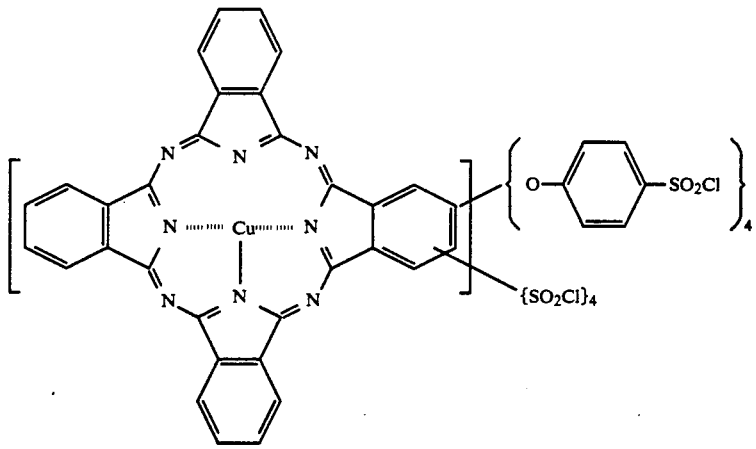

Thirty-one grams (0.03 mole) of copper tetraphenoxyphthalocyanine are dissolved at less than 0° C. in 400 grams of chlorosulfuric acid. The cooling bath is removed and the solution is allowed to warm to room temperature over two hours. The solution is further heated to 70° C. for about two hours than at 130° C. for eight hours. The heat is removed and the solution is allowed to stir overnight at room temperature. The solution is then poured very gradually into a stirred mixture of water and ice. The dull blue suspension is filtered and washed with ice water several times.

EXAMPLE 45

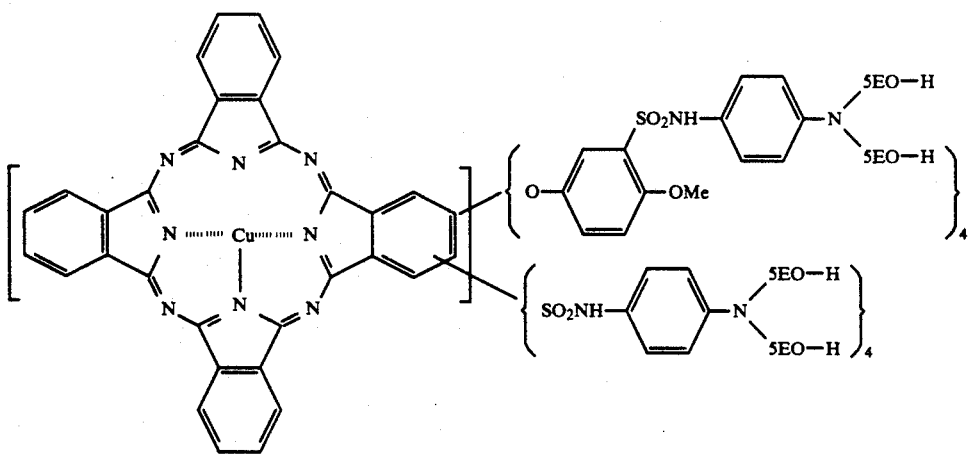

A mixture is prepared by adding 167.7 grams (0.306 mole) of an aromatic primary amine with an amine equivalent weight of 1.82 meq/g) to 72.1 grams sodium carbonate in 400 ml of THF. The mixture is cooled to 10°-15° C. and 0.034 mole of an aqueous wet cake of freshly prepared tetraphenoxy copper phthalocyanine sulfonyl chloride derivative (containing an average of about eight chlorosulfonyl groups per molecule) is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue colorant.

EXAMPLE 46

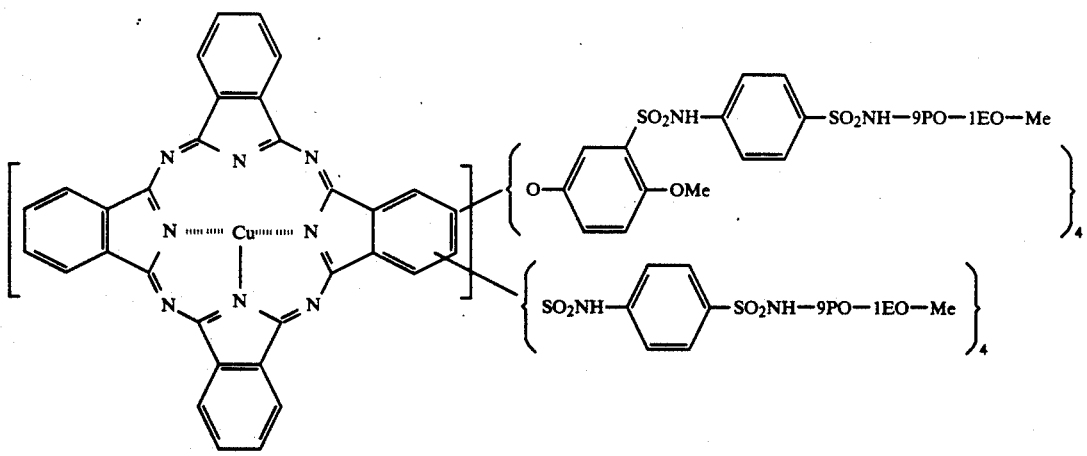

A mixture is prepared by adding 230.1 grams (0.306 mole) of an aromatic primary amine with an amine equivalent weight of 1.33 meq/g) to 72.1 grams sodium carbonate in 400 ml of THF. The mixture is cooled to 10°-15° C. and 0.034 mole of an aqueous wet cake of freshly prepared tetraphenoxy copper phthalocyanine sulfonyl chloride derivative (containing an average of about eight chlorosulfonyl groups per molecule) is added to the mixture. After the addition is complete, the mixture is warmed to 50° C. for an additional two hours to insure complete reaction. Three hundred milliliters of methylene chloride are added followed by 300 ml of water. The methylene chloride solution is separated from the salt water solution, further washed several times with water to neutral pH, and dried over anhydrous magnesium sulfate. The dried solution is filtered and stripped under reduced pressure at 90° C. to give a blue colorant.

EXAMPLE 47

This example illustrates the use of polymeric phthalocyanine colorants in polyolefin systems. The following formulations are preblended using a paddle type mixer and the colorant of Example one:

| *INGREDIENT | Formulation 1 |
|---|---|
| 4MF Polypropylene resin (Exxon 9142G) | 99.47% |
| Irganox 1010 (Ciba-Geigy) | 800 ppm |
| Millad 3940 | 2500 ppm |
| Calcium stearate | 1000 ppm |
| Polymeric colorant (Example #1) | 1000 ppm |
| *INGREDIENT | Formulation 2 |
| 4MF Polypropylene resin (Exxon 9142G) | 99.62% |
| Irganox 1010 (Ciba-Geigy) | 800 ppm |
| TiO$_2$ | 1000 ppm |
| Calcium stearate | 1000 ppm |

| -continued | |
|---|---|
| Polymeric colorant (Example #1) | 1000 ppm |

Calcium stearate functions as a stabilizer; Irganox 1010 is a registered trademark of Ciba-Geigy Corporation for a hindered phenol stabilizer; Millard 3940 is a clarifier for polyolefins; TiO$_2$ is a white pigment which serves as an opacifier; 4MF Polypropylene resin (Exxon 9142G) is a random copolymer of propylene and ethylene.

After mixing, the formulations shown above are melt compounded on a Brabender Twin Screw Mixer with a stock temperature of 245°–250° C. The compounded samples are then injection molded on a small toggle clamp machine into two-step plaques with thicknesses of 50 and 85 mils.

Formulation #1 has good clarity and a deep cyan shade. Formulation #2 is opaque and has a medium cyan shade. Both formulations process well in addition to having properties such as excellent heat stability, non-nucleation, non-migration and ease of resin clean up.

EXAMPLE 48

This example illustrates the use of polymeric phthalocyanine colorants in polyurethane. A polyurethane foam was prepared using colorant of Example 12 in the formulation shown below:

| | |
|---|---|
| Niax 16-56 Polyol (Union Carbide Corp.) | 100 g |
| Water | 4.8 ml |
| Dabco 33 LV (Air Products) | 0.31 ml |

| -continued | |
|---|---|
| T-9 Catalyst (MIT Chemical Co.) | 0.2 ml |
| L-520 Silicone (Union Carbide Corp.) | 1.5 ml |
| Methylene Chloride | 5.4 ml |
| Toluene Diisocyanate | 55 ml |
| Colorant (Example #12) | 1 g |

This foam is cured for one hour at 160° F. to give an even, bright, aqua blue shade. The polymeric colorant is not extractable with methanol, indicating that the colorant had copolymerized into the polyurethane structure.

EXAMPLE 49

This example illustrates the use of polymeric phthalocyanine the colorants in epoxy systems. The colorant prepared according to Example 3 is incorporated into an epoxy cured system. The system is prepared according to the following procedure: To a beaker containing 100 grams of epoxy resin based on diglycidyl ether of bisphenol A(n=0.2, WPE=185-195) of the formula:

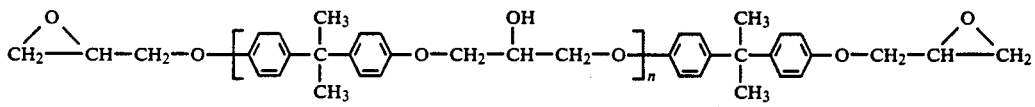

are added 0.1 grams of the colorant prepared according to Example 3 and 15.5 grams of 1,2-diaminocyclohaxane. After mixing the contents of the beaker thoroughly for two minutes and centrifuging at a speed of 300 rpm, the resin mixture is placed in an aluminum mold and cured for two hours at 100° C.

The epoxy cured product has good clarity and a deep cyan shade. The resin system processes well in addition to having properties such as excellent heat stability, non-nucleation, nonmigration and ease of resin clean up.

TABLE 1

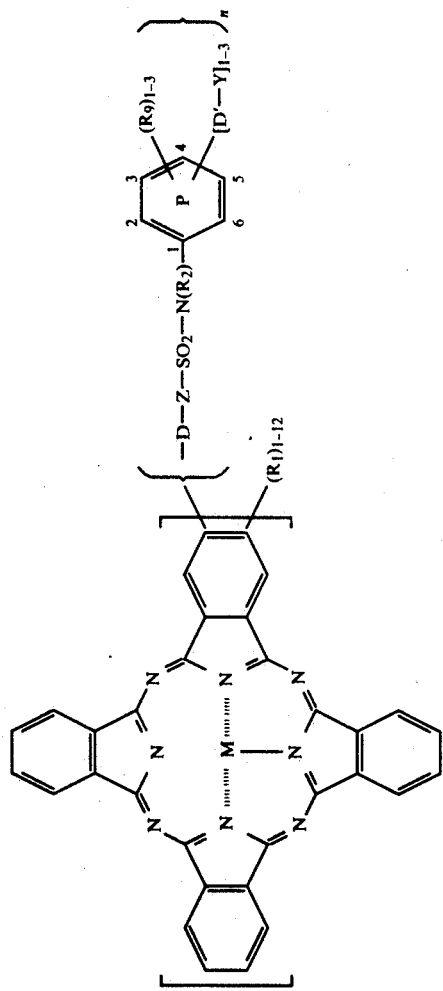

| Example | M | n | (R₁)₁₋₁₂ | —D—Z— | R₂ | R₉ | —[D'—Y]₁₋₃ |
|---|---|---|---|---|---|---|---|
| 1 | Cu | 1 | tetra-CH₃ | -4-OC₆H₄— | Me | H | 4-(O—6EO)COC₂H₅ |
| 2 | Al | 3 | H | -5-OC₆H₃(2-OMe)— | H | 2-Cl | 4-S-(3PO)—N(SO₂A)—(10EO)—C₂H₄—O—C₆H₄-p-NH₂ |
| 3 | Cu | 4 | H | -4-OC₆H₄— | H | H | 3,4-di-(O—15EO)—H |
| 4 | Cu | 2 | H | -4-OC₆H₄— | H | 3-Me | 4-(O—20EO)—H |
| 5 | Cu | 4 | H | -4-OC₆H₄— | H | 4-OMe | 3-(O—10EO)—H |
| 6 | Cu | 1 | tetra-Cl | -4-OC₆H₄— | H | 2,6-di-Me | 4-(O—20EO)—H |
| 7 | Cu | 2 | H | -4-OC₆H₄— | Et | H | 4-(O—15EO)—H |
| 8 | Cu | 3 | H | -3-OC₆H₃(4-OMe)— | H | H | 3,4-di-(S—10EO)—H |
| 9 | Cu | 4 | H | -3-OC₆H₃(4-OEt)— | H | H | 4-(S—5EO/10PO)—H |
| 10 | Cu | 2 | H | -5-OC₆H₃(2-OMe)— | C₆H₁₁ | H | 2,4-di-(S—20EO)—H |
| 11 | Cu | 1 | H | -4-OCC₆H₃(2-Br)— | C₆H₅ | H | 3-(S—10EO)—COCH₃ |
| 12 | Cu | 2 | H | -5-OC₆H₁(2-O-n-C₄H₆)— | CH₂C₆H₅ | 2-Br | 3-(S—10EO)—H |
| 13 | Cu | 4 | H | -5-O—C₆H₃(2-OC₆H₁₁)— | CH₂C₆H₁₁ | H | 3-(S—10EO/5PO)—H |
| 14 | Cu | 2 | H | -5-OC₆H₃(2-OMe)— | CH(CH₃)₂ | H | 4-(SO₂NH—2PO/19EO)—H |
| 15 | Cu | 2 | H | -5-OC₆H₃(2-Cl)— | CH(CH₃)C₂H₅ | H | 4-(SO₂N(Me)-2PO/7EO)—H |
| 16 | Cu | 4 | H | -5-OC₆H₃(2-OMe)— | C₂H₄OH | H | 4-[SO₂N(C₆H₅)—2BO/3EO]—CH₃ |
| 17 | Cu | 3 | H | -5-OC₆H₃(2-OMe)— | C₂H₄Cl | H | 4-[SO₂C₆H₁₁)—2EO/10PO]—C₂H₄Cl |
| 18 | Cu | 4 | H | -5-OC₆H₃(2-OMe)— | C₂H₄OCH₃ | H | 4-(SO₂NH—2BO/6EO)—CH₂COOCH₃ |
| 19 | Al | 3 | H | —O—CH₂-4-C₆H₄— | H | H | 4-O—5PO—CH₂CH(CH₃)NH₂ |
| 20 | Al | 2 | tetra-Me | —O—C₂H₄-4-C₆H₄— | H | H | 2-O—5PO/3EO—CH₂CH(CH₃)N(CH₃)₂ |
| 21 | Co | 3 | tetra-Cl | —S—C₂H₄-4-C₆H₄— | H | H | 4-[SO₂NH(5PO)(CH₂)₆—O—(5PO)]—CH₂CH(CH₃)NHSO₂ |
| 22 | Ni | 3 | di-COOCH₃ | —C₂H₄-4-C₆H₄— | H | H | 4-[O—(2BO)—C₆H₄O—(3EO)]—CH₂CH₂NHC₆H₅ |
| 23 | Cu | 4 | tetra-Me | —SO₂(CH₂)₄-4-C₆H₄— | H | H | 4-[5PO—O—(5PO)]—CH₂CH₂NHC₆H₄(4-CH₃) |
| 24 | Fe | 4 | di-OC₂H₅ | —SO₂(CH₂)₃—O—C₂H₄-4-C₆H₄— | H | H | 4-[O—(3BO)—NH(14EO)CH₂CH₂OC₅H₄(4-NH₂) |
| 25 | Cr | 4 | di-NHSO₂Me | —OC₂H₄—O—C₂H₄-4-C₆H₄— | H | H | 4-[O—(5PO)—N(CH₃)—(10PO)]—CH₂CH₂OCH₂CH₂N(CH₃)₂ |
| 26 | Mn | 2 | tetra-N(ME)₂ | —OC₂H₄—S—C₂H₄-4-C₆H₄— | H | H | 4[O—(5PO)N(C₆H₁₁)—(10EO)—CH₂(OH)CH₃] |
| 27 | Cu | 2 | tetra-NCOCH₃ | —N(SO₂CH₃)— | H | H | -2-[O—(10EO)—N(C₆H₅)—(10PO)—C₂H₄OCH₃] |
| 28 | Cu | 2 | H | —N(SO₂C₆H₅)C₂H₄—O-C₅H₄— | H | H | -3[O—(3BO)—N(SO₂A)—(18EO)—C₂H₄—C₆H₅] |
| 29 | Al | 4 | H | —N(SO₂CH₃)C₂H₄—O-4-C₆H₄— | H | H | 4[O—(2PO)NHCONH—(3EO)—C₂H₄—)C₆H₅] |

TABLE 1-continued

| No. | M | n | R | Bridge | | R' |
|---|---|---|---|---|---|---|
| 30 | Al | 4 | H | —N(CH₃)-4-C₆H₄— | H | 4-(O—3PO/6EO)—C₂H₄—NHCONH₂ |
| 31 | Al | 4 | tetra-C₂H₅ | —N(C₆H₁₁)C₂H₄-4-C₆H₄— | H | 2-(O—9PO/1EO)—C₂H₄—NHCON(CH₃)₂ |
| 32 | Fe | 1 | tetra-Br | —N(SO₂C₆H₅)C₂H₄—O-4-C₆H₄— | H | 4-(O—20EO)—C₂H₄—N(CH₃)₂ |
| 33 | Fe | 2 | tetra-C₆H₅ | —N(SO₂C₆H₁₁)-4-C₆H₄— | H | -2,4-di-(O—10EO)—H |
| 34 | Fe | 3 | tetra-I | —SO₂(CH₂)₃—N(CH₃)-4-C₆H₄— | H | -4-(O—4PO)—H |
| 35 | Ni | 4 | tetra-NH₂ | —N(SO₂CH₃)C₂H₄—N(SO₂CH₃)-4-C₆H₄— | H | 4-(O—2PO/14EO)—H |
| 36 | Ni | 2 | tetra-NHCOCH₃ | —SO₂NH-4-C₆H₄— | H | 4-(O—4PO)C₂H₄—COCH₃ |
| 37 | Cu | 2 | H | —SO₂NH—C₂H₄-4-C₆H₄— | H | 4-(O—3PO/6EO)—C₆H₅ |
| 38 | Cu | 4 | H | —SO₂N(CH₃)C₂H₄—O-4-C₆H₄— | H | 4-(O—4PO)—CH₂CH(OH)CH₂OH |
| 39 | Cu | 4 | H | 4-OC₆H₄— | H | 4-(O—4EO)—H |
| 40 | Cu | 4 | H | 4-S—C₅H₄— | H | 4-(O—10PO)—H |
| 41 | Cu | 4 | H | 4-C₆H₂(2,5-di-OMe)— | H | 4-(O—20EO)—H |
| 42 | Cu | 4 | H | —O—C₂H₄—NH-4-C₅H₄— | H | -3-[N(20EO)—H]₂ |
| 43 | Cu | 4 | H | —S—C₂H₄—SO₂-4-C₆H₄— | H | -3-[N(10PO)—H]₂ |
| 44 | Cu | 4 | H | —O—(CH₂)₄—N(SO₂CH₃)-4-C₆H₄— | H | -3-[N(5EO)—H]₂ |
| 45 | Cu | 2 | H | —NH—C₆H₄— | H | 4-(O—4PO)—H |
| 46 | Cu | 2 | H | —N(C₆H₅)—C₆H₄— | H | -3-[N(20EO)—H]₂ |
| 47 | Cu | 2 | di-COOCH₂ | covalent bond | H | -3[N(CH₃)—(20EO)—H] |
| 48 | Cu | 4 | tetra-Me | covalent bond | H | 4-(SO₂NH—14EO/7PO)—Me |
| 49 | Cu | 4 | di-OC₂H₅ | covalent bond | H | -3-[N(15PO/5EO)—H]₂ |

TABLE 2

$$A \left\{ -D-Z-SO_2-N(R_2) - \underset{[D'-Y]_{1-3}}{\overset{(R_9)_{1-3}}{P}} \right\}_n$$

| Example | Structure | n |
|---|---|---|
| 1 | $A\{OC_2H_4S-\text{thiazole}-C_6H_4-SO_2NH-P-O-(10PO)-H\}$ | 4 |
| 2 | $A\{OC_2H_4S-\text{benzothiazole(OMe)}-SO_2N(Me)-P(O-(20EO)-H)-O-(20EO)-H\}$ | 4 |
| 3 | $A\{SC_2H_4S-\text{thiadiazole}-C_6H_4-SO_2NH-P-N(15PO/5EO-H)_2\}$ | 2 |
| 4 | $A\{OCH_2-\text{furan}-SO_2NH-P(Me)-O-(20EO)-H\}$ | 4 |
| 5 | $A\{SCH_2-\text{thiophene}-SO_2NH-P-N(10PO/5EO-H)_2\}$ | 6 |
| 6 | $A\{OCH_2-N(SO_2Me)-\text{thiazole}-C_6H_3-SO_2NH-P-N(30EO-H)_2\}$ | 3 |
| 7 | $A\{OCH_2CH_2O-C_6H_3(O-n-C_4H_9)-SO_2NH-P-O-(10PO/5EO)-H\}$ | 3 |

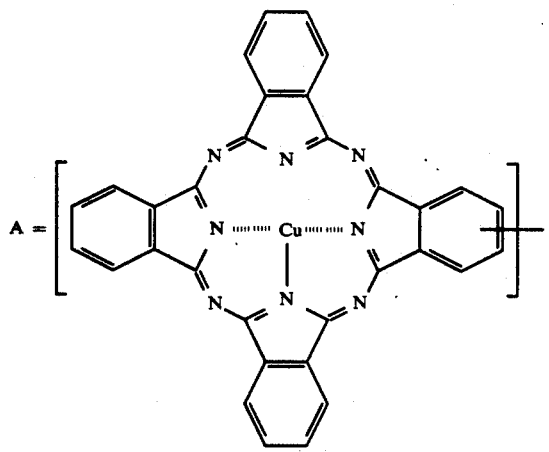

A = copper phthalocyanine

TABLE 2-continued $$A \leftarrow D-Z-SO_2-N(R_2)-\underset{[D'-Y]_{1-3}}{\overset{(R_9)_{1-3}}{P}} \rightarrow_n$$

| Example | Structure | n |
|---------|-----------|---|
| 8 | A—{OCH$_2$CH$_2$O—(phenyl with OEt)—SO$_2$NH—P—O—(15PO)—H} | 4 |
| 9 | A—{O—(naphthyl)—SO$_2$NH—P—N(5PO/5EO—H)$_2$} | 4 |
| 10 | A—{O—(naphthyl)—SO$_2$NH—P—S—(10EO)—H} | 2 |
| 11 | A—{O—(biphenyl)—SO$_2$NH—P—O—(20EO)—H} | 4 |
| 12 | A—{(benzoxazole S,N)—SO$_2$NH—P—O—(4BO/8EO)—H} | 4 |
| 13 | A—{(benzothiazole S,N)—SO$_2$NH—P—N(1O/5EO—H)$_2$} | 2 |
| 14 | A—{(thiadiazole)—(phenyl)—SO$_2$NH—P—SO$_2$NH—9PO/1EO—Me} | 2 |
| 15 | A—{O—(quinoline)—SO$_2$NH—P—SO$_2$NH—15PO/5EO—Me} | 4 |

TABLE 2-continued $$A \leftarrow \left\{ -D-Z-SO_2-N(R_2) - \underset{[D'-Y]_{1-3}}{\overset{(R_9)_{1-3}}{P}} \right\}_n$$

| Example | Structure | n |
|---|---|---|
| 16 | A—{OCH₂CH₂O—(2,5-disubst. phenyl with OMe)—SO₂NH—P—O—(10PO/5EO)—H} | 3 |
| 17 | A—{OCH₂CH₂O—(phenyl with OMe)—SO₂NH—P—N(5PO/5EO—H)₂} | 2 |
| 18 | A—{(MeO-naphthyl-O)—SO₂NH—P—N(10EO—H)₂} | 4 |
| 19 | A—{(Me-naphthyl-O)—SO₂NH—P—O—(10PO/5EO)—H} | 2 |

$$A = \left[ \text{Cu phthalocyanine} \right]$$

TABLE 3

| Example | M | n | (R₁)₁₋₁₂ | —D—Z— | —N(R₂)— | —D'— | W | Y |
|---|---|---|---|---|---|---|---|---|
| 1 | Cu | 2 | H | 4-OC₆H₄— | —NH— | 4-O— | H | 2EO/10PO |
| 2 | Cu | 2 | H | 4-OC₆H₄— | —NH— | 4-O— | H | 2EO/6PO |
| 3 | Cu | 3 | tetra-Me | 4-OC₆H₄— | —N(C₂H₅)— | 4-O— | H | 2EO/20PO |
| 4 | Ni | 4 | H | 4-OC₆H₄— | —NH— | 4-O— | H | 2EO/5BO |
| 5 | Cu | 2 | H | 4-OC₆H₄— | —N(C₆H₅)— | 3-O— | H | 30EO |
| 6 | Al | 4 | H | 4-OC₆H₄— | —NH— | 3-O— | H | 20EO |
| 7 | Cu | 2 | di-Cl | 3-OC₆H₃(4-OMe)— | —NH— | 3-O— | H | 15EO |
| 8 | Al | 3 | H | 3-OC₆H₃(4-OMe)— | —N(C₆H₁₁)— | 4-S— | H | 2EO/20PO |
| 9 | Cu | 4 | tetra-Cl | 3-OC₆H₃(4-OMe)— | —NH— | 4-S— | H | 2EO/15PO |
| 10 | Cu | 1 | H | 5-OC₆H₃(4-OMe)— | —NH— | 4-S— | H | 2EO/15PO |
| 11 | Cu | 2 | tetra-Br | 5-OC₆H₃(2-OMe)— | —NH— | 3-S— | H | 2EO/10PO |
| 12 | Al | 4 | H | 5-OC₆H₃(2-OMe)— | —N(CH₂C₆H₅)— | 3-S— | H | 2EO/13PO |
| 13 | Cu | 2 | H | 5-OC₆H₃(2-OMe)— | —NH— | 3-S— | H | 2EO/5BO |
| 14 | Cu | 3 | tetra-I | 5-OC₆H₃(2-OMe)— | —N(Me)— | 4-SO₂NH— | Me | 4PO/3EO |
| 15 | Mn | 4 | H | 5-OC₆H₃(2-OMe)— | —NH— | 4-SO₂NH— | Me | 9PO/1EO |
| 16 | Cu | 3 | H | 5-OC₆H₃(2-OMe)— | —N(n-C₄H₉)— | 4-SO₂NH— | n-Bu | 3BO/6EO |
| 17 | Fe | 4 | H | 5-OC₆H₃(2-OMe)— | —NH— | 4-SO₂NH— | n-Bu | 2BO/3EO |
| 18 | Cu | 4 | H | 4-OC₆H₃(3-OMe)— | —NH— | 4-N(CH₃)— | n-Bu | 4BO/3EO |
| 19 | Cu | 1 | tetra-OMe | 4-OC₆H₃(3-OMe)— | —NH— | 4-N(2EO/6PO)— | H | 2EO/6PO |
| 20 | Ni | 2 | H | 4-OC₆H₃(3-OMe)— | —N(CH₃)— | 4-N(Me)— | H | 4PO/3EO |
| 21 | Cu | 3 | H | 4-OC₆H₃(3-OMe)— | —N(CH₃)— | 3-N(10EO)— | H | 10EO |
| 22 | Cr | 4 | di-OMe | 5-OC₆H₂(2,6-di-OMe)— | —N(CH₃)— | 3-N(2EO/5PO)— | H | 2EO/5PO |
| 23 | Cu | 1 | di-OMe | 5-OC₆H₂(2,6-di-OMe)— | —N(CH₃)— | 3-O— | H | 2EO/15PO |
| 24 | Cu | 2 | H | 3-OC₆H₃(4-Me)— | —NH— | 4-SO₂NH— | Me | 10EO |
| 25 | Cu | 2 | H | 3-OC₆H₃(4-Me)— | —NH— | 4-SO₂NH— | Me | 2PO/14EO |
| 26 | Cu | 3 | di-Et | 3-OC₆H₃(4-Me)— | —NH— | 4-SO₂NH— | Me | 4PO/3EO |
| 27 | Cu | 4 | H | 3-OC₆H₃(4-Me)— | —NH— | 4-SO₂NH— | Me | 2PO/8EO |
| 28 | Cr | 4 | H | 3-OC₆H₃(4-Me)— | —N(C₂H₅)— | 3-SO₂NH— | Me | 2PO/7EO |
| 29 | Cu | 2 | H | 3-OC₆H₃(4-Me)— | —NH— | 3-SO₂NH— | Me | 2PO/4EO |
| 30 | Cr | 4 | H | 3-OC₆H₃(4-Me)— | —N(CH₃)— | 3-SO₂NH— | Me | 20PO |

TABLE 3-continued

| | | | | | | | |
|---|---|---|---|---|---|---|---|
| 31 | Cu | 2 | H | -5-OC$_6$H$_3$(2-Me)- | —NH— | 3-SO$_2$NH— | n-Bu | 2BO/4EO |
| 32 | Cu | 2 | tetra-t-C$_4$H$_9$ | -5-OC$_6$H$_3$(2-Me)- | —NH— | 3-SO$_2$NH— | Me | 2BO/6EO |
| 33 | Cu | 3 | tetra-Me | -5-OC$_6$H$_3$(2-Me)- | —NH— | 4-SO$_2$NH— | Me | 2PO/1EO |
| 34 | Cu | 4 | H | -5-OC$_6$H$_3$(2-Me)- | —N(CH$_3$)— | 4-SO$_2$NH— | Me | 2PO/7EO |
| 35 | Cu | 2 | tetra-Br | -5-OC$_6$H$_3$(2-Me)- | —N(CH$_3$)— | 4-SO$_2$NH— | Me | 2PO/4EO |
| 36 | Cu | 4 | H | -5-OC$_6$H$_3$(2-Me)- | —NH— | 3-O— | H | 2EO/13PO |
| 37 | Cu | 2 | H | -4-OC$_6$H$_3$(3-Me)- | —NH— | 3-O— | H | 2EO/20PO |
| 38 | Cu | 3 | di-Br | -4-OC$_6$H$_3$(3-Me)- | —NH— | 3-O— | H | 2EO/10BO |
| 39 | Cu | 2 | H | -4-OC$_6$H$_3$(3-Me)- | —NH— | 4-O— | H | 2EO/15PO |
| 40 | Cu | 4 | H | -4-OC$_6$H$_3$(3-Me)- | —NH— | 4-O— | H | 2EO/5PEO |
| 41 | Cu | 4 | tetra-Cl | -5-OC$_6$H$_2$(2,6-di-Me)- | —N(C$_6$H$_{11}$)— | 3-S— | H | 30EO |
| 42 | Cu | 2 | H | -5-OC$_6$H$_2$(2,6-di-Me)- | —NH— | 4-S— | H | 20EO |
| 43 | Cu | 3 | H | -3-OC$_6$H$_3$(4-OEt)- | —NH— | 4-N(CH$_3$)— | H | 2EO/10PO |
| 44 | Cu | 2 | H | -3-OC$_6$H$_3$(4-Et)- | —NH— | 4-N(C$_2$H$_5$)— | H | 2EO/14PO |
| 45 | Cu | 3 | H | -3-OC$_6$H$_3$(4-OEt)- | —NH— | 4-N(10EO)— | H | 10EO |
| 46 | Cu | 2 | H | -3-OC$_6$H$_3$(4-OEt)- | —NH— | 3-N(CH$_3$)— | H | 2EO/10PO |
| 47 | Cu | 2 | di-OEt | -5-OC$_6$H$_3$(2-OEt)- | —NH— | 3-N(5EO)— | H | 5EO |
| 48 | Cu | 3 | H | -5-OC$_6$H$_3$(2-OEt)- | —NH— | 3-O— | H | 20EO |
| 49 | Cu | 4 | H | -4-OC$_6$H$_3$(2-OEt)- | —NH— | 4-O— | H | 2EO/15PO/5EO |
| 50 | Cu | 2 | H | -5-OC$_6$H$_3$(2-OEt)- | —NH— | 4-SO$_2$NH— | Me | 2PO/7EO |
| 51 | Cu | 3 | H | -5-OC$_6$H$_3$(2-OEt)- | —NH— | 4-SO$_2$NH— | n-Bu | 8PO/8EO |
| 52 | Cu | 2 | H | -5-OC$_6$H$_3$(2-OEt)- | —NH— | 4-SO$_2$NH— | Me | 2PO/5EO |
| 53 | Cu | 4 | tetra-I | -4-OC$_6$H$_3$(3-OEt)- | —NH— | 3-SO$_2$NH— | C$_6$H$_5$ | 2PO/4EO |
| 54 | Cu | 2 | H | -4-OC$_6$H$_3$(3-OEt)- | —NH— | 4-O— | H | 2EO/15PO |
| 55 | Cu | 3 | H | -4-OC$_6$H$_3$(3-OEt)- | —NH— | 4-O— | H | 2EO/10PO |
| 56 | Cu | 4 | H | -4-OC$_6$H$_3$(3-OEt)- | —NH— | 4-O— | H | 30EO |
| 57 | Cu | 2 | di-Cl | -5-OC$_6$H$_3$(4-t-Bu)- | —NH— | 4-O— | COMe | 15EO |
| 58 | Cu | 3 | H | -5-OC$_6$H$_3$(4-t-Bu)- | —NH— | 3-O— | H | 20EO |
| 59 | Cu | 4 | tetra-Me | -3-OC$_6$H$_3$(4-t-Bu)- | —NH— | 4-N(CH$_3$)— | H | 2EO/10PO |
| 60 | Cu | 2 | H | -3-OC$_6$H$_3$(4-t-Bu)- | —NH— | 4-N(CH$_3$)— | H | 2EO/20EO |
| 61 | Cu | 3 | di-Cl | -3-OC$_6$H$_3$(4-t-Bu)- | —NH— | 4-N(10EO)— | H | 10EO |
| 62 | Cu | 2 | H | -3-OC$_6$H$_3$(4-Cl)- | —NH— | 3-N(15EO)— | H | 15EO |
| 63 | Cu | 4 | H | -3-OC$_6$H$_3$(4-Cl)- | —NH— | 4-SO$_2$NH— | Me | 2PO/10EO |
| 64 | Cu | 2 | H | -3-OC$_6$H$_3$(4-Cl)- | —NH— | 4-SO$_2$NH— | Me | 4PO/3EO |
| 65 | Cu | 3 | H | -3-OC$_6$H$_3$(4-Cl)- | —NH— | 4-SO$_2$NH— | Me | 6PO/6EO |
| 66 | Cu | 4 | tetra-Et | -3-OC$_6$H$_3$(4-Cl)- | —NH— | 4-SO$_2$NH— | Me | 2PO/7EO |
| 67 | Cu | 2 | H | -5-OC$_6$H$_3$(2-Cl)- | —NH— | 3-SO$_2$NH— | Me | 4BO/4EO |
| 68 | Cu | 3 | H | -5-OC$_6$H$_3$(2-Cl)- | —NH— | 3-SO$_2$NH— | Me | 4PO/3EO |
| 69 | Cu | 2 | tetra-Br | -5-OC$_6$H$_3$(2-Cl)- | —NH— | 4-O— | COEt | 20EO |
| 70 | Cu | 3 | H | -5-OC$_6$H$_3$(2-Cl)- | —NH— | 4-O— | COMe | 20EO |
| 71 | Cu | 2 | H | -3-OC$_6$H$_3$(4-Br)- | —NH— | 3-O— | H | 15EO |
| 72 | Cu | 3 | H | -3-OC$_6$H$_3$(4-Br)- | —NH— | 3-S— | H | 20EO |
| 73 | Cu | 2 | H | -3-OC$_6$H$_3$(4-Br)- | —NH— | 4-S— | H | 20EO |
| 74 | Cu | 3 | H | -3-OC$_6$H$_3$(4-Br)- | —NH— | 4-O— | H | 20EO |
| 75 | Cu | 2 | tetra-Cl | -4-SC$_6$H$_4$- | —N(CH$_3$)— | 4-O— | H | 2EO/10PO |
| 76 | Cu | 3 | tri-Cl | -4-SC$_6$H$_4$- | —N(C$_2$H$_5$)— | 4-O— | H | 2EO/15PO/5EO |
| 77 | Cu | 2 | H | -4-SC$_6$H$_4$- | —N(CH$_2$C$_6$H$_5$)— | 4-N(CH$_3$)— | H | 2EO/10PO |
| 78 | Cu | 3 | H | -4-SC$_6$H$_4$- | —N(iso-C$_3$H$_7$)— | 4-O— | H | 30EO |
| 79 | Cu | 2 | H | -4-SC$_6$H$_4$- | —N[(6EO)-C$_6$H$_{13}$]— | 4-O— | H | 20EO |
| 80 | Cu | 2 | H | -4-SC$_6$H$_4$- | —N[(2EO/3PO)—Me]— | 4-O— | H | 27EO |
| 81 | Cu | 2 | tetra-OEt | -3-SC$_6$H$_3$(4-OMe)- | —N[(4EO)—C$_6$H$_{13}$]— | 3-O— | COMe | 27EO |
| 82 | Cu | 2 | tetra-OEt | -3-SC$_6$H$_3$(4-OMe)- | —N(CH$_2$C$_6$H$_5$)— | 3-N(10EO)— | H | 10EO |
| 83 | Cu | 3 | H | -3-SC$_6$H$_3$(4-OMe)- | —N(iso-C$_4$H$_9$)— | 4-N(5EO)— | H | 5EO |
| | Cu | | H | | —N(C$_6$H$_{11}$)— | 4-SO$_2$NH— | Me | 9PO/1EO |

TABLE 3-continued

| No. | M | n | R' | Ar | X | Y | R | Alkoxy |
|---|---|---|---|---|---|---|---|---|
| 84 | Cu | 4 | H | -3-SC$_6$H$_3$(4-OMe)- | -N(C$_6$H$_5$)- | 4-SO$_2$NH- | Me | 2PO/7EO |
| 85 | Cu | 2 | di-OEt | -3-SC$_6$H$_3$(4-Me)- | -N(C$_2$H$_4$OH)- | 3-SO$_2$NH- | Me | 5PO/5EO |
| 86 | Cu | 2 | H | -3-SC$_6$H$_3$(4-Me)- | -NH- | 3-SO$_2$NH- | Me | 4PO/3EO |
| 87 | Cu | 3 | H | -3-SC$_6$H$_3$(4-Me)- | -NH- | 3-SO$_2$NH- | Me | 3BO/2EO |
| 88 | Cu | 4 | H | -3-SC$_6$H$_3$(4-Me)- | -NH- | 4-SO$_2$NH- | Me | 2PO/5EO |
| 89 | Cu | 4 | H | -3-SC$_6$H$_3$(4-Me)- | -NH- | 4-SO$_2$NH- | n-Bu | 2BO/4EO |
| 90 | Cu | 4 | H | -[3-SC$_6$H$_3$(4-Me)- | -NH- | 4-SO$_2$NH- | n-Bu | 3BO/2EO |
| 91 | Cu | 2 | tri-Cl | -3-SC$_6$H$_3$(4-Cl)- | -NH- | 4-SO$_2$NH- | Me | 2PO/16EO |
| 92 | Cu | 2 | H | -3-SC$_6$H$_3$(4-Cl)- | -N(CH$_3$)- | 4-SO$_2$NH- | Me | 4PO/3EO |
| 93 | Cu | 2 | H | -3-SC$_6$H$_3$(4-Cl)- | -N(CH$_3$)- | 4-SO$_2$NH- | Me | 4PO/2EO |
| 94 | Cu | 2 | tetra-Cl | -3-SC$_6$H$_3$(4-Cl)- | -NH- | 4-SO$_2$NH- | Me | 2PO/7EO |
| 95 | Ni | 2 | H | -4-OC$_6$H$_4$- | -NH- | 4-O- | H | 2EO/10PO |
| 96 | Ni | 3 | H | -4-OC$_6$H$_4$- | -NH- | 4-O- | H | 2EO/10PO |
| 97 | Ni | 2 | H | -4-OC$_6$H$_4$- | -NH- | 4-O- | COMe | 2EO/15EO |
| 98 | Ni | 2 | H | -4-OC$_6$H$_4$- | -NH- | 4-O- | H | 2EO/6BO |
| 99 | Ni | 3 | H | -4-OC$_6$H$_4$- | -NH- | 3-O- | H | 20EO |
| 100 | Ni | 2 | H | -4-OC$_6$H$_4$- | -NH- | 3-O- | COEt | 2EO/20EO |
| 101 | Ni | 1 | tri-Br | -3-OC$_6$H$_3$(4-OMe)- | -NH- | 4-S- | H | 2EO/14PO |
| 102 | Ni | 2 | H | -3-OC$_6$H$_3$(4-OMe)- | -NH- | 4-S- | H | 2EO/10BO |
| 103 | Ni | 2 | H | -5-OC$_6$H$_3$(2-OMe)- | -N(CH$_2$C$_6$H$_5$)- | 4-S- | H | 2EO/15PO |
| 104 | Ni | 2 | di-OEt | -5-OC$_6$H$_3$(2-OMe)- | -N(C$_2$H$_5$)- | 3-S- | H | 2EO/10PO |
| 105 | Ni | 2 | H | -5-OC$_6$H$_3$(2-OMe)- | -NH- | 3-S- | H | 2EO/20EO |
| 106 | Ni | 2 | H | -3-OC$_6$H$_3$(4-Me)- | -NH- | 3-S- | H | 2EO/14PO |
| 107 | Ni | 4 | H | -3-OC$_6$H$_3$(4-Me)- | -NH- | 4-SO$_2$NH- | Me | 4PO/3EO |
| 108 | Ni | 2 | H | -3-OC$_6$H$_3$(4-Me)- | -NH- | 2-SO$_2$NH- | Me | 2PO/7EO |
| 109 | Ni | 3 | H | -3-OC$_6$H$_3$(4-Me)- | -NH- | 4-SO$_2$NH- | Me | 2PO/4EO |
| 110 | Ni | 2 | tetra-Me | -3-OC$_6$H$_3$(2-Me)- | -NH- | 4-N(CH$_3$)- | Me | 12EO |
| 111 | Ni | 2 | di-OMe | -5-OC$_6$H$_3$(2-Me)- | -NH- | 4-N(CH$_3$)- | H | 2EO/15PO |
| 112 | Ni | 2 | H | -5-OC$_6$H$_3$(2-Me)- | -NH- | 3-SO$_2$NH- | Me | 2EO/20PO |
| 113 | Ni | 2 | H | -5-OC$_6$H$_3$(2-Me)- | -NH- | 4-SO$_2$NH- | Me | 2PO/4EO |
| 114 | Ni | 4 | H | -5-OC$_6$H$_3$(2-Me)- | -NH- | 3-SO$_2$NH- | Me | 3BO/3EO |
| 115 | Ni | 2 | di-I | -5-OC$_6$H$_2$(2,6-di-Me)- | -NH- | 3-SO$_2$NH- | Me | 3PO/6EO |
| 116 | Ni | 2 | H | -5-OC$_6$H$_2$(2,6-di-Me)- | -NH- | 4-SO$_2$NH- | Me | 4PO/3EO |
| 117 | Ni | 2 | H | -5-OC$_6$H$_3$(4-OEt)- | -N(CH$_3$)- | 4-N(15EO)- | H | 15EO |
| 118 | Ni | 2 | H | -5-OC$_6$H$_3$(2-OEt)- | -N(CH$_3$)- | 3-N(2EO/5PO)- | H | 2EO/5PO |
| 119 | Ni | 2 | H | -5-OC$_6$H$_3$(2-OEt)- | -NH- | 3-N(C$_2$H$_5$)- | H | 20EO |
| 120 | Ni | 4 | H | -3-OC$_6$H$_3$(4-t-Bu)- | -NH- | 4-N(10EO)- | H | 10EO |
| 121 | Ni | 2 | di-Cl | -3-OC$_6$H$_3$(4-t-Bu)- | -NH- | 4-S- | COMe | 25EO |
| 122 | Ni | 4 | tetra-OEt | -3-OC$_6$H$_3$(4-t-Bu)- | -NH- | 4-SO$_2$NH- | Me | 2PO/7EO |
| 123 | Ni | 2 | H | -4-OC$_6$H$_3$(4-t-Bu)- | -NH- | 4-SO$_2$NH- | Me | 4PO/3EO |
| 124 | Ni | 4 | H | -3-OC$_6$H$_3$(4-Cl)- | -NH- | 4-SO$_2$NH- | Me | 3PO/5EO |
| 125 | Ni | 2 | H | -3-OC$_6$H$_3$(4-Cl)- | -N(iso-C$_3$H$_7$OH)- | 4-SO$_2$NH- | Me | 2PO/10EO |
| 126 | Ni | 2 | H | -3-OC$_6$H$_3$(4-Br)- | -N(C$_2$H$_4$OH)- | 4-SO$_2$NH- | Me | 4PO/3EO |
| 127 | Ni | 2 | di-Br | -5-OC$_6$H$_2$(2,6-di-Me)- | -NH- | 4-SO$_2$NH- | Me | 2PO/7EO |
| 128 | Ni | 2 | H | -4-SC$_6$H$_4$- | -NH- | 3-SO$_2$NH- | Me | 6PO/3EO |
| 129 | Ni | 4 | H | -4-SC$_6$H$_4$- | -N(CH$_3$)- | 3-SO$_2$NH- | n-Bu | 6BO/6EO |
| 130 | Ni | 2 | di-Cl | -4-SC$_6$H$_4$- | -NH- | 3-SO$_2$NH- | Me | 2PO/10EO |
| 131 | Ni | 4 | H | -4-SC$_6$H$_4$- | -N(2EO)- | 3-SO$_2$NH- | n-Bu | 2BO/3EO |
| 132 | Ni | 2 | H | -4-SC$_6$H$_4$- | -NH- | 3-SO$_2$NH- | Me | 2PO/4EO |
| 133 | Ni | 2 | H | -4-SC$_6$H$_4$- | -NH- | 3-SO$_2$NH- | COEt | 2EO/15PO |
| 134 | Ni | 2 | di-Me | -3-SC$_6$H$_3$(4-Me)- | -NH- | 4-O- | H | 27EO |
| 135 | Ni | 2 | H | -3-SC$_6$H$_3$(4-Me)- | -N(CH$_3$)- | 4-O- | H | 2EO/15PO/5EO |
| 136 | Ni | 3 | tetra-Br | -3-SC$_6$H$_3$(4-Me)- | -N(CH$_3$)- | 3-O- | H | 2EO/13PO |

TABLE 3-continued

| No. | M | n | Sub | Ar | L1 | L2 | R | EO/PO |
|---|---|---|---|---|---|---|---|---|
| 137 | Ni | 4 | tetra-Cl | -3-SC$_6$H$_3$(4-Me)- | —NH— | 3-O— | COMe | 2EO/10EO |
| 138 | Ni | 2 | H | -3-SC$_6$H$_3$(4-Me)- | —NH— | 3-O— | H | 2EO/15BO |
| 139 | Ni | 4 | H | -3-SC$_6$H$_3$(4-Me)- | —NH— | 4-S— | H | 20EO |
| 140 | Co | 2 | H | -4-OC$_6$H$_4$- | —N(2PO)— | 4-S— | H | 27EO |
| 141 | Co | 2 | H | -4-OC$_6$H$_4$- | —N(2PO/1EO)— | 3-S— | H | 2EO/13PO |
| 142 | Co | 3 | H | -4-OC$_6$H$_4$- | —NH— | 3-S— | H | 2EO/10EO |
| 143 | Co | 2 | H | -4-OC$_6$H$_4$- | —NH— | 3-S— | H | 2EO/1BO |
| 144 | Co | 2 | di-OEt | -4-OC$_6$H$_4$- | —NH— | 4-SO$_2$NH— | Me | 4PO/3EO |
| 145 | Co | 2 | H | -4-OC$_6$H$_4$- | —NH— | 4-SO$_2$NH— | n-Bu | 2BO/4EO |
| 146 | Co | 2 | H | -3-OC$_6$H$_3$(4-OMe)- | —N(CH$_2$C$_6$H$_5$)— | 4-SO$_2$NH— | Me | 2PO/14EO |
| 147 | Co | 2 | H | -3-OC$_6$H$_3$(4-OMe)- | —NH— | 4-SO$_2$NH— | Me | 4PO/3EO |
| 148 | Co | 2 | tetra-Me | -3-OC$_6$H$_3$(4-OMe)- | —NH— | 4-SO$_2$NH— | Me | 2BO/6EO |
| 149 | Co | 2 | H | -5-OC$_6$H$_3$(2-OMe)- | —NH— | 4-SO$_2$NH— | Me | 5PO/3EO |
| 150 | Co | 2 | H | -5-OC$_6$H$_3$(2-OMe)- | —NH— | 4-SO$_2$NH— | Me | 2PO/10EO |
| 151 | Co | 4 | H | -4-OC$_6$H$_4$- | —NH— | 4-SO$_2$NH— | n-Bu | 2BO/3EO |
| 152 | Co | 2 | H | -3-OC$_6$H$_3$(4-Me)- | —NH— | 4-SO$_2$NH— | Me | 2PO/14EO |
| 153 | Co | 2 | tetra-O-n-C$_4$H$_9$ | -3-OC$_6$H$_3$(4-Me)- | —N(C$_2$H$_5$)— | 3-SO$_2$NH— | Me | 4PO/3EO |
| 154 | Co | 2 | H | -3-OC$_6$H$_3$(4-Me)- | —N(CH$_3$)— | 3-SO$_2$NH— | Me | 2PO/8EO |
| 155 | Co | 2 | H | -3-OC$_6$H$_3$(4-Me)- | —NH— | 3-SO$_2$NH— | Me | 2PO/7EO |
| 156 | Co | 4 | H | -3-OC$_6$H$_3$(4-Me)- | —NH— | 3-SO$_2$NH— | Me | 2PO/4EO |
| 157 | Co | 2 | H | -3-OC$_6$H$_3$(4-Me)- | —NH— | 4-O— | H | 20EO |
| 158 | Co | 2 | di-Cl | -5-OC$_6$H$_3$(4-Me)- | —NH— | 4-O— | H | 2EO/10PO |
| 159 | Co | 2 | H | -3-OC$_6$H$_3$(4-t-Bu)- | —NH— | 3-O— | H | 2EO/15BO |
| 160 | Co | 4 | di-Me | -3-OC$_6$H$_3$(4-Me)- | —NH— | 3-O— | H | 2EO/13PO |
| 161 | Co | 2 | H | -3-OC$_6$H$_3$(4-t-Bu)- | —NH— | 4-N(CH$_3$)— | H | 2EO/10PO |
| 162 | Co | 4 | H | -3-OC$_6$H$_3$(4-t-Bu)- | —NH— | 4-N(CH$_3$)— | H | 30EO |
| 163 | Co | 2 | H | -4-SC$_6$H$_4$- | —NH— | 4-N(10EO—COMe)— | COMe | 10EO |
| 164 | Co | 2 | di-OEt | -4-SC$_6$H$_4$- | —NH— | 3-N(5PO)— | H | 5PO |
| 165 | Co | 3 | H | -4-SC$_6$H$_4$- | —NH— | 3-N(C$_2$H$_5$)— | H | 2EO/15PO |
| 166 | Co | 4 | tetra-OCOMe | -4-SC$_6$H$_4$- | —NH— | 3-N(10EO)— | H | 2PO/10EO |
| 167 | Co | 3 | H | -4-SC$_6$H$_4$- | —NH— | 4-SO$_2$NH— | n-Bu | 2BO/3EO |
| 168 | Co | 2 | H | -3-SC$_6$H$_3$(4-OMe)- | —N(CH$_3$)— | 4-SO$_2$NH— | Me | 2PO/4EO |
| 169 | Co | 2 | H | -3-SC$_6$H$_3$(4-OMe)- | —N(CH$_3$)— | 4-SO$_2$NH— | n-Bu | 8PO/8EO |
| 170 | Co | 2 | di-OCOMe | -3-SC$_6$H$_3$(4-OMe)- | —NH— | 4-SO$_2$NH— | Me | 4PO/3EO |
| 171 | Co | 2 | H | -3-SC$_6$H$_3$(4-OMe)- | —NH— | 3-SO$_2$NH— | Me | 2PO/7EO |
| 172 | Co | 2 | H | -3-SC$_6$H$_3$(4-Me)- | —NH— | 3-SO$_2$NH— | Me | 5PO/5EO |
| 173 | Co | 2 | H | -3-SC$_6$H$_3$(4-Me)- | —NH— | 3-SO$_2$NH— | Me | 4PO/3EO |
| 174 | Co | 4 | H | -3-SC$_6$H$_3$(4-Me)- | —NH— | 3-SO$_2$NH— | Me | 2PO/5EO |
| 175 | Co | 2 | tetra-Cl | -3-SC$_6$H$_3$(4-Me)- | —N(C$_2$H$_4$OH)— | 3-SO$_2$NH— | n-Bu | 2BO/4EO |
| 176 | Co | 4 | H | -3-SC$_6$H$_3$(4-Me)- | —NH— | 3-SO$_2$NH— | n-Bu | 3BO/2EO |
| 177 | Co | 2 | H | -3-SC$_6$H$_3$(4-Me)- | —NH— | 3-SO$_2$NH— | n-Bu | |

TABLE 4

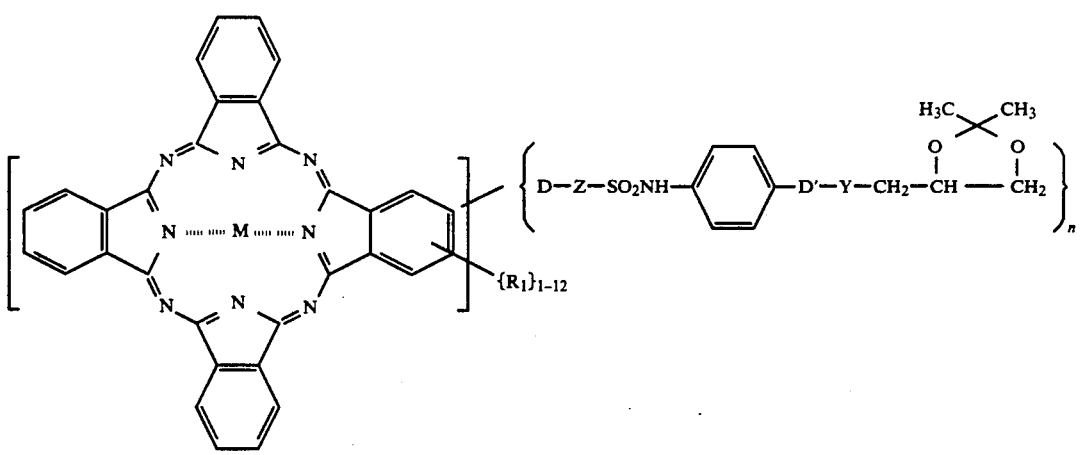

| Example | M | n | (R₁)₁₋₁₂ | —D—Z— | —D'— | Y |
|---|---|---|---|---|---|---|
| 1 | Cu | 2 | H | 4-OC₆H₄— | —SO₂NH— | 3PO/1EO |
| 2 | Cu | 3 | H | 4-OC₆H₄— | —SO₂NH— | 6BO/6EO |
| 3 | Cu | 2 | tetra-Cl | 4-OC₆H₄— | —SO₂NH— | 2PO/10EO |
| 4 | Cu | 4 | di-Cl | 4-OC₆H₄— | —SO₂NH— | 2BO/3EO |
| 5 | Cu | 2 | H | 4-OC₆H₄— | —SO₂NH— | 4PO/3EO |
| 6 | Cu | 4 | H | 4-OC₆H₄— | —SO₂NH— | 2BO/4EO |
| 7 | Cu | 1 | tri-Cl | -3-OC₆H₃(4-OMe)— | —SO₂NH— | 2PO/14EO |
| 8 | Cu | 2 | H | -3-OC₆H₃(4-OMe)— | —SO₂NH— | 4PO/3EO |
| 9 | Cu | 3 | tetra-Br | -3-OC₆H₃(4-OMe)— | —SO₂NH— | 9PO/1EO |
| 10 | Cu | 4 | Me | -3-OC₆H₃(4-OMe)— | —SO₂NH— | 2BO/6EO |
| 11 | Cu | 2 | H | -5-OC₆H₃(2-OMe)— | —SO₂NH— | 5PO/3EO |
| 12 | Cu | 3 | di-Me | -5-OC₆H₃(2-OMe)— | —SO₂NH— | 2PO/10EO |
| 13 | Cu | 4 | H | -5-OC₆H₃(2-OMe)— | —SO₂NH— | 2BO/3EO |
| 14 | Cu | 2 | tri-Br | -5-OC₆H₃(2-OMe)— | —SO₂NH— | 4PO/3EO |
| 15 | Cu | 3 | H | -5-OC₆H₃(2-OMe)— | —SO₂NH— | 9PO/1EO |
| 16 | Cu | 4 | H | -5-OC₆H₃(2-OMe)— | —SO₂NH— | 3BO/6EO |
| 17 | Cu | 3 | di-Cl | -5-OC₆H₃(2-OMe)— | —SO₂NH— | 2BO/3EO |
| 18 | Cu | 4 | tetra-Et | -5-OC₆H₃(2-OMe)— | —SO₂NH— | 4BO/3EO |
| 21 | Cu | 3 | tetra-Cl | -4-OC₆H₃(3-OMe)— | —NH— | 9PO/1EO |
| 22 | Cu | 4 | H | -4-OC₆H₃(3-OMe)— | —NH— | 2PO/7EO |
| 23 | Cu | 1 | di-Br | -5-OC₆H₂(2,6-di-OMe)— | —NH— | 3BO/4EO |
| 24 | Cu | 2 | H | -5-OC₆H₂(2,6-di-OMe)— | —NH— | 10 EO |
| 25 | Cu | 1 | di-OMe | -3-OC₆H₃(4-Me)— | —NH— | 2PO/14EO |
| 26 | Cu | 2 | H | -3-OC₆H₃(4-Me)— | —NH— | 4PO/3EO |
| 27 | Cu | 3 | H | -3-OC₆H₃(4-Me)— | —NH— | 2PO/8EO |
| 28 | Cu | 4 | tetra-I | -3-OC₆H₃(4-Me)— | —NH— | 2PO/7EO |
| 29 | Cu | 2 | H | -3-OC₆H₃(4-Me)— | —NH— | 2PO/4EO |
| 30 | Cu | 4 | tetra-t-C₄H₉ | -3-OC₆H₃(4-Me)— | —NH— | 12 EO |
| 31 | Cu | 1 | H | -5-OC₆H₃(2-Me)— | —NH— | 2BO/4EO |
| 32 | Cu | 2 | H | -5-OC₆H₃(2-Me)— | —NH— | 2BO/6EO |
| 33 | Cu | 3 | tetra-n-C₄H₉ | -5-OC₆H₃(2-Me)— | —NH— | 2PO/1EO |
| 34 | Cu | 4 | H | -5-OC₆H₃(2-Me)— | —NH— | 2PO/7EO |
| 35 | Cu | 2 | tetra-Et | -5-OC₆H₃(2-Me)— | —NH— | 2PO/4EO |
| 36 | Cu | 4 | H | -5-OC₆H₃(2-Me)— | —NH— | 3BO/3EO |
| 37 | Cu | 1 | di-Br | 4-OC₆H₃(3-Me)— | —NH— | 2PO/6EO |
| 38 | Cu | 2 | H | 4-OC₆H₃(3-Me)— | —NH— | 2PO/10EO |
| 39 | Cu | 3 | di-I | 4-OC₆H₃(3-Me)— | —NH— | 3PO/4EO |
| 40 | Cu | 4 | tetra-I | 4-OC₆H₃(3-Me)— | —NH— | 8PO/2EO |
| 41 | Cu | 1 | H | -5-OC₆H₂(2,6-di-Me)— | —NH— | 3PO/6EO |
| 42 | Cu | 2 | H | -5-OC₆H₂(2,6-di-Me)— | —NH— | 4PO/3EO |
| 43 | Cu | 1 | tetra-Cl | -3-OC₆H₃(4-OEt)— | —NH— | 3BO/10EO |
| 44 | Cu | 2 | H | -3-OC₆H₃(4-OEt)— | —SO₂NH— | 2BO/4EO |
| 45 | Cu | 3 | H | -3-OC₆H₃(4-OEt)— | —SO₂NH— | 8PO/8EO |
| 46 | Cu | 4 | di-Br | -3-OC₆H₃(4-OEt)— | —SO₂NH— | 2PO/6EO |
| 47 | Cu | 1 | H | -5-OC₆H₃(2-OEt)— | —SO₂NH— | 2PO/8EO |
| 48 | Cu | 1 | H | -5-OC₆H₃(2-OEt)— | —SO₂NH— | 4PO/3EO |
| 49 | Cu | 3 | tetra-Et | -5-OC₆H₃(2-OEt)— | —SO₂NH— | 2BO/4EO |
| 50 | Cu | 4 | H | -5-OC₆H₃(2-OEt)— | —SO₂NH— | 2PO/7EO |
| 51 | Cu | 3 | H | -5-OC₆H₃(2-OEt)— | —SO₂NH— | 8PO/8EO |
| 52 | Cu | 4 | H | -5-OC₆H₃(2-OEt)— | —SO₂NH— | 2PO/5EO |
| 53 | Cu | 1 | di-OCOMe | 4-OC₆H₃(3-OEt)— | —SO₂NH— | 2PO/4EO |
| 54 | Cu | 2 | H | 4-OC₆H₃(3-OEt)— | —SO₂NH— | 4PO/3EO |
| 55 | Cu | 3 | H | 4-OC₆H₃(3-OEt)— | —SO₂NH— | 9PO/1EO |
| 56 | Cu | 4 | H | 4-OC₆H₃(3-OEt)— | —SO₂NH— | 5PO/3EO |
| 57 | Cu | 1 | H | -3-OC₆H₃(4-t-Bu)— | —SO₂NH— | 2PO/10EO |
| 58 | Cu | 2 | H | -3-OC₆H₃(4-t-Bu)— | —SO₂NH— | 4PO/3EO |
| 59 | Cu | 3 | tetra-Br | -3-OC₆H₃(4-t-Bu)— | —SO₂NH— | 6PO/6EO |
| 60 | Cu | 4 | H | -3-OC₆H₃(4-t-Bu)— | —SO₂NH— | 2PO/7EO |

TABLE 4-continued

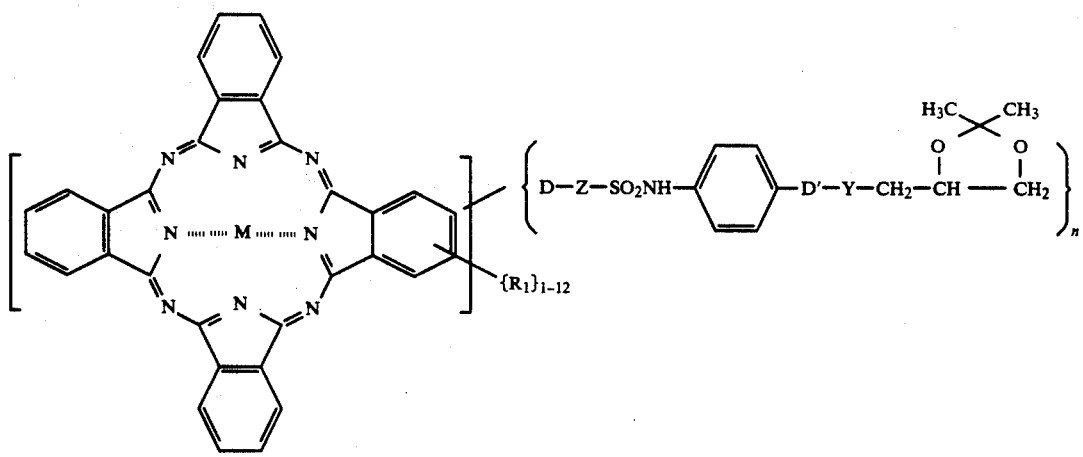

| Example | M | n | (R₁)₁₋₁₂ | —D—Z— | —D'— | Y |
|---|---|---|---|---|---|---|
| 61 | Cu | 2 | H | -3-OC₆H₃(4-t-Bu)— | —SO₂NH— | 4PO/3EO |
| 62 | Cu | 4 | di-Cl | -3-OC₆H₃(4-t-Bu)— | —SO₂NH— | 3PO/5EO |
| 63 | Cu | 1 | tetra-Me | -3-OC₆H₃(4-Cl)— | —SO₂NH— | 2PO/10EO |
| 64 | Cu | 2 | H | -3-OC₆H₃(4-Cl)— | —SO₂NH— | 4PO/3EO |
| 65 | Cu | 3 | H | -3-OC₆H₃(4-Cl)— | —SO₂NH— | 6PO/6EO |
| 66 | Cu | 4 | H | -3-OC₆H₃(4-Cl)— | —SO₂NH— | 2PO/7EO |
| 67 | Cu | 1 | di-Me | -5-OC₆H₃(2-Cl)— | —SO₂NH— | 4BO/4EO |
| 68 | Cu | 2 | H | -5-OC₆H₃(2-Cl)— | —SO₂NH— | 4PO/3EO |
| 69 | Cu | 3 | H | -5-OC₆H₃(2-Cl)— | —SO₂NH— | 3PO/3EO |
| 70 | Cu | 4 | H | -5-OC₆H₃(2-Cl)— | —SO₂NH— | 2PO/7EO |
| 71 | Cu | 1 | H | -3-OC₆H₃(4-Br)— | —SO₂NH— | 2PO/31EO |
| 72 | Cu | 2 | H | -3-OC₆H₃(4-Br)— | —SO₂NH— | 4PO/3EO |
| 73 | Cu | 3 | H | -3-OC₆H₃(4-Br)— | —SO₂NH— | 9PO/1EO |
| 74 | Cu | 4 | H | -3-OC₆H₃(4-Br)— | —SO₂NH— | 2PO/7EO |
| 75 | Cu | 1 | tetra-Cl | -4-SC₆H₄— | —SO₂NH— | 6PO/6EO |
| 76 | Cu | 2 | H | -4-SC₆H₄— | —SO₂NH— | 6BO/6EO |
| 77 | Cu | 3 | H | -4-SC₆H₄— | —SO₂NH— | 2PO/10EO |
| 78 | Cu | 4 | tetra-Br | -4-SC₆H₄— | —SO₂NH— | 2BO/3EO |
| 79 | Cu | 2 | H | -4-SC₆H₄— | —SO₂NH— | 2PO/4EO |
| 80 | Cu | 4 | tetra-t-Bu | -4-SC₆H₄— | —SO₂NH— | 2PO/6EO |
| 81 | Cu | 1 | H | -3-SC₆H₃(4-OMe)— | —SO₂NH— | 8PO/8EO |
| 82 | Cu | 2 | H | -3-SC₆H₃(4-OMe)— | —SO₂NH— | 4PO/3EO |
| 83 | Cu | 3 | H | -3-SC₆H₃(4-OMe)— | —SO₂NH— | 9PO/1EO |
| 84 | Cu | 4 | H | -3-SC₆H₃(4-OMe)— | —SO₂NH— | 2PO/7EO |
| 85 | Cu | 1 | di-Cl | -3-SC₆H₃(4-Me)— | —SO₂NH— | 5PO/5EO |
| 86 | Cu | 2 | tetra-Cl | -3-SC₆H₃(4-Me)— | —SO₂NH— | 4PO/3EO |
| 87 | Cu | 3 | H | -3-SC₆H₃(4-Me)— | —SO₂NH— | 3BO/2EO |
| 88 | Cu | 4 | H | -3-SC₆H₃(4-Me)— | —SO₂NH— | 2PO/5EO |
| 89 | Cu | 2 | H | -3-SC₆H₃(4-Me)— | —SO₂NH— | 2BO/4EO |
| 90 | Cu | 4 | H | -3-SC₆H₃(4-Me)— | —SO₂NH— | 3BO/2EO |
| 91 | Cu | 1 | tri-Br | -3-SC₆H₃(4-Cl)— | —SO₂NH— | 2PO/16EO |
| 93 | Cu | 3 | H | -3-SC₆H₃(4-Cl)— | —SO₂NH— | 4PO/2EO |
| 94 | Cu | 4 | H | -3-SC₆H₃(4-Cl)— | —SO₂NH— | 2PO/7EO |
| 96 | Ni | 2 | di-OMe | -4-OC₆H₄— | —SO₂NH— | 6BO/6EO |
| 97 | Ni | 3 | H | -4-OC₆H₄— | —SO₂NH— | 2PO/10EO |
| 98 | Ni | 4 | H | -4-OC₆H₄— | —SO₂NH— | 2BO/3EO |
| 99 | Ni | 2 | H | -4-OC₆H₄— | —SO₂NH— | 4PO/3EO |
| 100 | Ni | 4 | di-Cl | -4-OC₆H₄— | —SO₂NH— | 2BO/4EO |
| 101 | Ni | 1 | H | -3-OC₆H₃(4-OMe)— | —SO₂NH— | 2PO/14EO |
| 102 | Ni | 2 | H | -3-OC₆H₃(4-OMe)— | —SO₂NH— | 4PO/3EO |
| 103 | Ni | 1 | H | -5-OC₆H₃(2-OMe)— | —SO₂NH— | 5PO/3EO |
| 104 | Ni | 2 | H | -5-OC₆H₃(2-OMe)— | —SO₂NH— | 2PO/10EO |
| 105 | Ni | 4 | H | -5-OC₆H₃(2-OMe)— | —SO₂NH— | 2BO/3EO |
| 106 | Ni | 1 | tetra-Me | -3-OC₆H₃(4-Me)— | —SO₂NH— | 2PO/14EO |
| 107 | Ni | 2 | H | -3-OC₆H₃(4-Me)— | —SO₂NH— | 4PO/3EO |
| 108 | Ni | 4 | H | -3-OC₆H₃(4-Me)— | —SO₂NH— | 2PO/7EO |
| 109 | Ni | 2 | H | -3-OC₆H₃(4-Me)— | —SO₂NH— | 2PO/4EO |
| 110 | Ni | 4 | H | -3-OC₆H₃(4-Me)— | —SO₂NH— | 12 EO |
| 111 | Ni | 1 | tetra-I | -5-OC₆H₃(2-Me)— | —SO₂NH— | 2BO/4EO |
| 112 | Ni | 2 | di-OEt | -5-OC₆H₃(2-Me)— | —SO₂NH— | 2BO/6EO |
| 113 | Ni | 2 | H | -5-OC₆H₃(2-Me)— | —SO₂NH— | 2PO/4EO |
| 114 | Ni | 4 | H | -5-OC₆H₃(2-Me)— | —SO₂NH— | 3BO/2EO |
| 115 | Ni | 1 | H | -5-OC₆H₂(2,6-di-Me)— | —SO₂NH— | 3PO/6EO |
| 116 | Ni | 2 | tetra-Et | -5-OC₆H₂(2,6-di-Me)— | —SO₂NH— | 4PO/3EO |
| 117 | Ni | 1 | H | -3-OC₆H₃(4-OEt)— | —SO₂NH— | 3BO/10EO |
| 118 | Ni | 1 | H | -5-OC₆H₃(2-OEt)— | —SO₂NH— | 2PO/8EO |
| 119 | Ni | 2 | H | -5-OC₆H₃(2-OEt)— | —SO₂NH— | 4PO/3EO |
| 120 | Ni | 3 | tetra-OMe | -3-OC₆H₃(4-t-Bu)— | —SO₂NH— | 2PO/10EO |

TABLE 4-continued

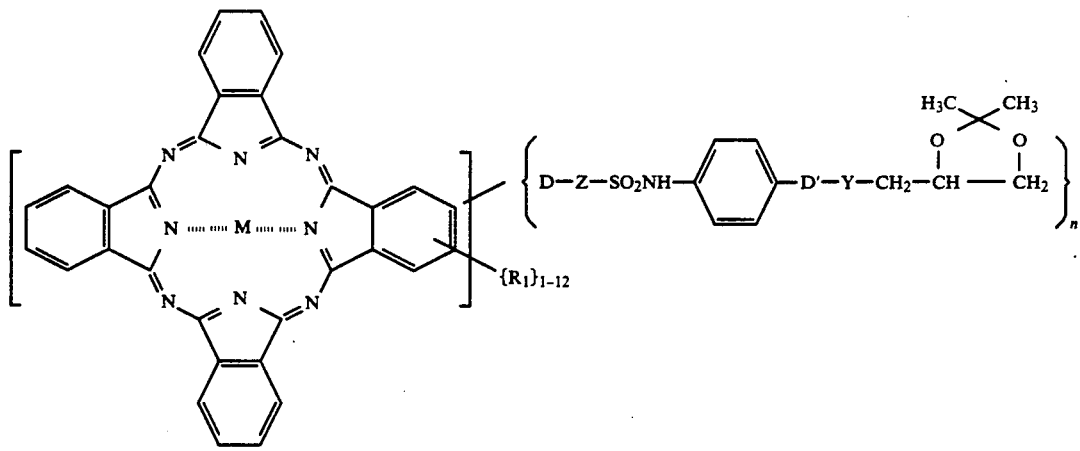

| Example | M | n | (R₁)₁₋₁₂ | —D—Z— | —D'— | Y |
|---|---|---|---|---|---|---|
| 121 | Ni | 2 | H | -3-OC₆H₃(4-t-Bu)— | —SO₂NH— | 4PO/3EO |
| 122 | Ni | 4 | H | -3-OC₆H₃(4-t-Bu)— | —SO₂NH— | 2PO/7EO |
| 123 | Ni | 2 | di-OMe | -3-OC₆H₃(4-t-Bu)— | —SO₂NH— | 4PO/3EO |
| 124 | Ni | 4 | H | -3-OC₆H₃(4-t-Bu)— | —SO₂NH— | 3PO/5EO |
| 125 | Ni | 1 | H | -3-OC₆H₃(4-Cl)— | —SO₂NH— | 2PO/10EO |
| 126 | Ni | 2 | H | -3-OC₆H₃(4-Cl)— | —SO₂NH— | 4PO/3EO |
| 127 | Ni | 4 | H | -3-OC₆H₃(4-Br)— | —SO₂NH— | 2PO/7EO |
| 128 | Ni | 1 | tetra-I | -4-SC₆H₄— | —SO₂NH— | 6PO/3EO |
| 129 | Ni | 2 | H | -4-SC₆H₄— | —SO₂NH— | 6BO/6EO |
| 130 | Ni | 3 | H | -4-SC₆H₄— | —SO₂NH— | 2PO/10EO |
| 131 | Ni | 4 | H | -4-SC₆H₄— | —SO₂NH— | 2BO/3EO |
| 132 | Ni | 2 | H | -4-SC₆H₄— | —SO₂NH— | 2PO/4EO |
| 133 | Ni | 4 | di-OMe | -4-SC₆H₄— | —SO₂NH— | 2PO/6EO |
| 134 | Ni | 1 | H | -3-SC₆H₃(4-Me)— | —SO₂NH— | 5PO/5EO |
| 135 | Ni | 2 | H | -3-SC₆H₃(4-Me)— | —SO₂NH— | 4PO/3EO |
| 136 | Ni | 3 | di-Br | -3-SC₆H₃(4-Me)— | —SO₂NH— | 3BO/2EO |
| 137 | Ni | 4 | H | -3-SC₆H₃(4-Me)— | —SO₂NH— | 2PO/5EO |
| 138 | Ni | 2 | H | -3-SC₆H₃(4-Me)— | —SO₂NH— | 2BO/4EO |
| 139 | Ni | 4 | tetra-Cl | -3-SC₆H₃(4-Me)— | —SO₂NH— | 3BO/2EO |
| 140 | Co | 1 | H | -4-OC₆H₄— | —SO₂NH— | 2PO/7EO |
| 142 | Co | 2 | H | -4-OC₆H₄— | —SO₂NH— | 6BO/6EO |
| 143 | Co | 3 | tetra-O-t-Bu | -4-OC₆H₄— | —SO₂NH— | 2PO/10EO |
| 144 | Co | 4 | H | -4-OC₆H₄— | —SO₂NH— | 2BO/3EO |
| 145 | Co | 2 | di-I | -4-OC₆H₄— | —SO₂NH— | 4PO/3EO |
| 146 | Co | 4 | tetra-I | -4-OC₆H₄— | —SO₂NH— | 2BO/4EO |
| 147 | Co | 1 | H | -3-OC₆H₃(4-OMe)— | —SO₂NH— | 2PO/14EO |
| 148 | Co | 2 | H | -3-OC₆H₃(4-OMe)— | —SO₂NH— | 4PO/3EO |
| 149 | Co | 4 | H | -3-OC₆H₃(4-OMe)— | —SO₂NH— | 2BO/6EO |
| 150 | Co | 1 | H | -3-OC₆H₃(2-OMe)— | —SO₂NH— | 5PO/3EO |
| 151 | Co | 2 | H | -5-OC₆H₃(2-OMe)— | —SO₂NH— | 2PO/10EO |
| 152 | Co | 4 | H | -5-OC₆H₃(2-OMe)— | —SO₂NH— | 2BO/3EO |
| 153 | Co | 1 | di-Br | -3-OC₆H₃(4-Me)— | —SO₂NH— | 2PO/14EO |
| 154 | Co | 2 | H | -3-OC₆H₃(4-Me)— | —SO₂NH— | 4PO/3EO |
| 155 | Co | 3 | H | -3-OC₅H₃(4-Me)— | —SO₂NH— | 2PO/8EO |
| 156 | Co | 4 | H | -3-OC₆H₃(4-Me)— | —SO₂NH— | 2PO/7EO |
| 157 | Co | 2 | di-Me | -3-OC₆H₃(4-Me)— | —SO₂NH— | 2PO/4EO |
| 158 | Co | 4 | H | -3-OC₆H₃(4-Me)— | —SO₂NH— | 12 EO |
| 159 | Co | 1 | H | -5-OC₆H₃(2-Me)— | —SO₂NH— | 2BO/4EO |
| 160 | Co | 1 | H | -3-OC₆H₃(4-t-Bu)— | —SO₂NH— | 2PO/10EO |
| 161 | Co | 2 | H | -3-OC₆H₃(4-t-Bu)— | —SO₂NH— | 4PO/3EO |
| 162 | Co | 4 | tetra-Cl | -3-OC₆H₃(4-t-Bu)— | —SO₂NH— | 2PO/7EO |
| 163 | Co | 2 | H | -3-OC₆H₃(4-t-Bu)— | —SO₂NH— | 4PO/3EO |
| 164 | Co | 4 | H | -3-OC₆H₃(4-t-Bu)— | —SO₂NH— | 3PO/5EO |
| 165 | Co | 1 | H | -4-SC₆H₄— | —SO₂NH— | 6PO/3EO |
| 166 | Co | 2 | di-OEt | -4-SC₆H₄— | —SO₂NH— | 6BO/6EO |
| 167 | Co | 3 | H | -4-SC₆H₄— | —SO₂NH— | 2PO/10EO |
| 168 | Co | 4 | H | -4-SC₆H₄— | —SO₂NH— | 2BO/3EO |
| 169 | Co | 3 | di-I | -4-SC₆H₄— | —SO₂NH— | 2PO/4EO |
| 170 | Co | 1 | H | -3-SC₆H₃(4-OMe)— | —SO₂NH— | 8PO/8EO |
| 171 | Co | 2 | H | -3-S—C₆H₃(4-OMe)— | —SO₂NH— | 4PO/3EO |
| 172 | Co | 4 | H | -3-SC₆H₃(4-OMe)— | —SO₂NH— | 2PO/7EO |
| 173 | Co | 1 | tetra-Cl | -3-SC₆H₃(4-Me)— | —SO₂NH— | 5PO/5EO |
| 174 | Co | 2 | H | -3-SC₆H₃(4-Me)— | —SO₂NH— | 4PO/3EO |
| 175 | Co | 4 | H | -3-SC₆H₃(4-Me)— | —SO₂NH— | 2PO/5EO |
| 176 | Co | 2 | tri-Cl | -3-SC₆H₃(4-Me)— | —SO₂NH— | 2BO/4EO |
| 177 | Co | 4 | H | -3-SC₆H₃(4-Me)— | —SO₂NH— | 3BO/2EO |

TABLE 5

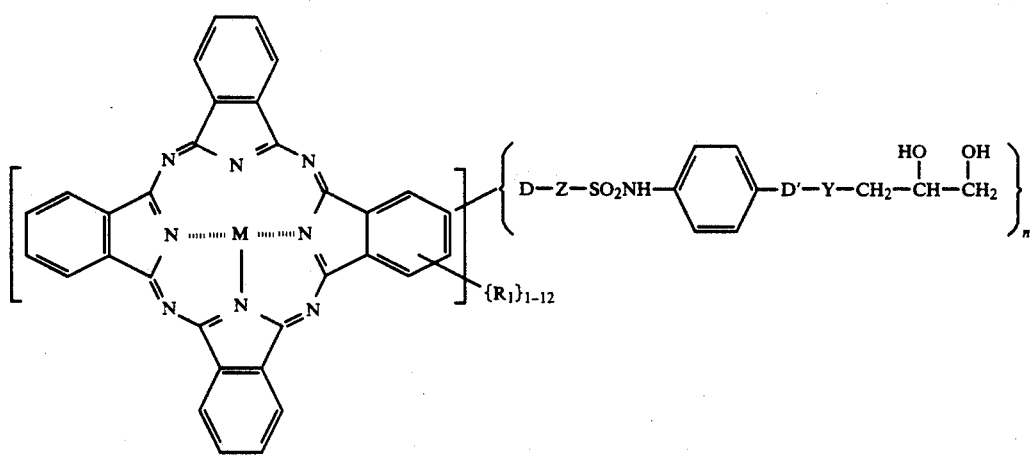

| Example | M | n | (R₁)₁₋₁₂ | —D—Z— | —D'— | Y |
|---|---|---|---|---|---|---|
| 1 | Cu | 2 | H | 4-OC₆H₄— | —SO₂NH— | 3PO/1EO |
| 2 | Cu | 3 | H | 4-OC₆H₄— | —SO₂NH— | 6BO/6EO |
| 3 | Cu | 2 | tetra-Cl | 4-OC₆H₄— | —SO₂NH— | 2PO/10EO |
| 4 | Cu | 4 | di-OMe | 4-OC₆H₄— | —SO₂NH— | 2BO/3EO |
| 5 | Cu | 2 | H | 4-OC₆H₄— | —SO₂NH— | 4PO/3EO |
| 6 | Cu | 4 | H | 4-OC₆H₄— | —SO₂NH— | 2BO/4EO |
| 7 | Cu | 1 | di-Br | -3-OC₆H₃(4-OMe)— | —SO₂NH— | 2PO/14EO |
| 8 | Cu | 2 | H | -3-OC₆H₃(4-OMe)— | —SO₂NH— | 4PO/3EO |
| 9 | Cu | 3 | tetra-I | -3-OC₆H₃(4-OMe)— | —SO₂NH— | 9PO/1EO |
| 10 | Cu | 4 | Me | -3-OC₆H₃(4-OMe)— | —SO₂NH— | 2BO/6EO |
| 11 | Cu | 2 | H | -5-OC₆H₃(2-OMe)— | —SO₂NH— | 5PO/3EO |
| 12 | Cu | 3 | di-Et | -5-OC₆H₃(2-OMe)— | —SO₂NH— | 2PO/10EO |
| 13 | Cu | 4 | H | -5-OC₆H₃(2-OMe)— | —SO₂NH— | 2BO/3EO |
| 14 | Cu | 2 | tri-Cl | -5-OC₆H₃(2-OMe)— | —SO₂NH— | 4PO/3EO |
| 15 | Cu | 3 | H | -5-OC₆H₃(2-OMe)— | —SO₂NH— | 9PO/1EO |
| 16 | Cu | 4 | H | -5-OC₆H₃(2-OMe)— | —SO₂NH— | 3BO/6EO |
| 17 | Cu | 3 | di-I | -5-OC₆H₃(2-OMe)— | —SO₂NH— | 2BO/3EO |
| 18 | Cu | 4 | tetra-Me | -5-OC₆H₃(2-OMe)— | —SO₂NH— | 4BO/3EO |
| 20 | Cu | 2 | H | 4-OC₆H₃(3-OMe)— | —SO₂NH— | 4PO/3EO |
| 21 | Cu | 3 | tetra-Br | 4-OC₆H₃(3-OMe)— | —SO₂NH— | 9PO/1EO |
| 22 | Cu | 4 | H | 4-OC₆H₃(3-OMe)— | —SO₂NH— | 2PO/7EO |
| 23 | Cu | 1 | tri-Br | -5-OC₆H₂(2,6-di-OMe)— | —SO₂NH— | 3BO/4EO |
| 24 | Cu | 2 | H | -5-OC₆H₂(2,6-di-OMe)— | —SO₂NH— | 10EO |
| 25 | Cu | 1 | di-Cl | -3-OC₆H₃(4-Me)— | —SO₂NH— | 2PO/14EO |
| 26 | Cu | 2 | H | -3-OC₆H₃(4-Me)— | —SO₂NH— | 4PO/3EO |
| 27 | Cu | 3 | H | -3-OC₆H₃(4-Me)— | —SO₂NH— | 2PO/8EO |
| 28 | Cu | 4 | tetra-I | -3-OC₆H₃(4-Me)— | —SO₂NH— | 2PO/7EO |
| 29 | Cu | 2 | H | -3-OC₆H₃(4-Me)— | —SO₂NH— | 2PO/4EO |
| 30 | Cu | 4 | tetra-n-C₄H₉ | -3-OC₆H₃(4-Me)— | —SO₂NH— | 12EO |
| 31 | Cu | 1 | H | -5-OC₆H₃(2-Me)— | —SO₂NH— | 2BO/4EO |
| 32 | Cu | 2 | H | -5-OC₆H₃(2-Me)— | —SO₂NH— | 2BO/6EO |
| 33 | Cu | 3 | tetra-t-C₄H₉ | -5-OC₆H₃(2-Me)— | —SO₂NH— | 2PO/1EO |
| 34 | Cu | 4 | H | -5-OC₆H₃(2-Me)— | —SO₂NH— | 2PO/7EO |
| 35 | Cu | 2 | tetra-Me | -5-OC₆H₃(2-Me)— | —SO₂NH— | 2PO/4EO |
| 36 | Cu | 4 | H | -5-OC₆H₃(2-Me)— | —SO₂NH— | 3BO/3EO |
| 37 | Cu | 1 | di-I | 4-OC₆H₃(3-Me)— | —SO₂NH— | 2PO/6EO |
| 38 | Cu | 2 | H | 4-OC₆H₃(3-Me)— | —SO₂NH— | 2PO/10EO |
| 39 | Cu | 3 | di-Cl | 4-OC₆H₃(3-Me)— | —SO₂NH— | 3PO/4EO |
| 40 | Cu | 4 | tetra-I | 4-OC₆H₃(3-Me)— | —SO₂NH— | 8PO/2EO |
| 41 | Cu | 1 | H | -5-OC₆H₂(2,6-di-Me)— | —SO₂NH— | 3PO/6EO |
| 42 | Cu | 2 | H | -5-OC₆H₂(2,6-di-Me)— | —SO₂NH— | 4PO/3EO |
| 43 | Cu | 1 | tetra-Br | -3-OC₆H₃(4-OEt)— | —SO₂NH— | 3BO/10EO |
| 44 | Cu | 2 | H | -3-OC₆H₃(4-Et)— | —SO₂NH— | 2BO/4EO |
| 45 | Cu | 3 | H | -3-OC₆H₃(4-OEt)— | —SO₂NH— | 8PO/8EO |
| 46 | Cu | 4 | di-Cl | -3-OC₆H₃(4-OEt)— | —SO₂NH— | 2PO/6EO |
| 47 | Cu | 1 | tri-Cl | -5-OC₆H₃(2-OEt)— | —SO₂NH— | 2PO/8EO |
| 48 | Cu | 1 | H | -5-OC₆H₃(2-OEt)— | —SO₂NH— | 4PO/3EO |
| 49 | Cu | 3 | tetra-Et | -5-OC₆H₃(2-OEt)— | —SO₂NH— | 2BO/4EO |
| 50 | Cu | 4 | H | -5-OC₆H₃(2-OEt)— | —SO₂NH— | 2PO/7EO |
| 51 | Cu | 3 | H | -5-OC₆H₃(2-OEt)— | —SO₂NH— | 8PO/8EO |
| 52 | Cu | 4 | H | -5-OC₆H₃(2-OEt)— | —SO₂NH— | 2PO/5EO |
| 53 | Cu | 1 | di-OCOMe | 4-OC₆H₃(3-OEt)— | —SO₂NH— | 2PO/4EO |
| 54 | Cu | 2 | H | 4-OC₆H₃(3-OEt)— | —SO₂NH— | 4PO/3EO |
| 55 | Cu | 3 | H | 4-OC₆H₃(3-OEt)— | —SO₂NH— | 9PO/1EO |
| 56 | Cu | 4 | H | 4-OC₆H₃(3-OEt)— | —SO₂NH— | 5PO/3EO |
| 57 | Cu | 1 | H | -3-OC₆H₃(4-t-Bu)— | —SO₂NH— | 2PO/10EO |
| 58 | Cu | 2 | H | -3-OC₆H₃(4-t-Bu)— | —SO₂NH— | 4PO/3EO |
| 59 | Cu | 3 | tetra-Br | -3-OC₆H₃(4-t-Bu)— | —SO₂NH— | 6PO/6EO |

TABLE 5-continued

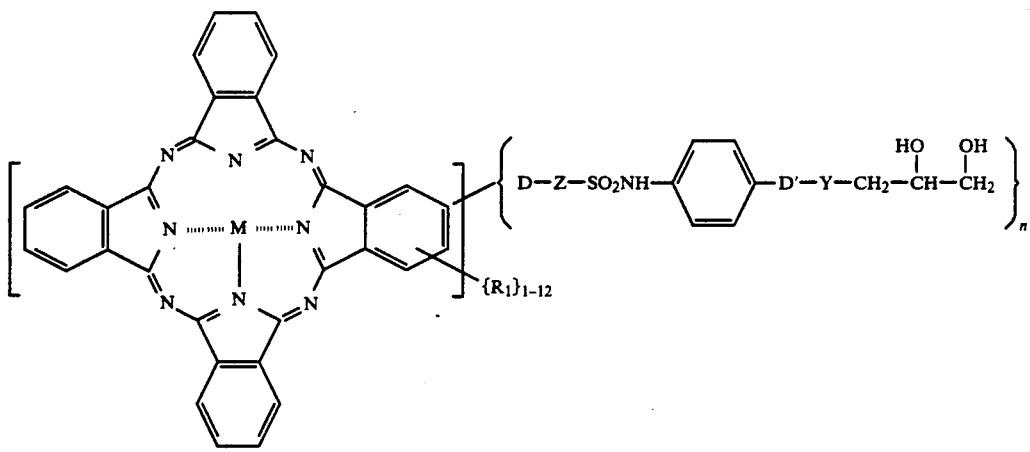

| Example | M | n | (R₁)₁₋₁₂ | —D—Z— | —D'— | Y |
|---|---|---|---|---|---|---|
| 60 | Cu | 4 | H | -3-OC₆H₃(4-t-Bu)— | —SO₂NH— | 2PO/7EO |
| 61 | Cu | 2 | H | -3-OC₆H₃(4-t-Bu)— | —SO₂NH— | 4PO/3EO |
| 62 | Cu | 4 | di-Br | -3-OC₆H₃(4-t-Bu)— | —SO₂NH— | 3PO/5EO |
| 63 | Cu | 1 | tetra-Et | -3-OC₆H₃(4-Cl)— | —SO₂NH— | 2PO/10EO |
| 64 | Cu | 2 | H | -3-OC₆H₃(4-Cl)— | —SO₂NH— | 4PO/3EO |
| 65 | Cu | 3 | H | -3-OC₆H₃(4-Cl)— | —SO₂NH— | 6PO/6EO |
| 66 | Cu | 4 | H | -3-OC₆H₃(4-Cl)— | —SO₂NH— | 2PO/7EO |
| 67 | Cu | 1 | di-OEt | -5-OC₆H₃(2-Cl)— | —SO₂NH— | 4BO/4EO |
| 68 | Cu | 2 | H | -5-OC₆H₃(2-Cl)— | —SO₂NH— | 4PO/3EO |
| 69 | Cu | 3 | H | -5-OC₆H₃(2-Cl)— | —SO₂NH— | 3PO/3EO |
| 70 | Cu | 4 | H | -5-OC₆H₃(2-Cl)— | —SO₂NH— | 2PO/7EO |
| 71 | Cu | 1 | tri-Cl | -3-OC₆H₃(4-Br)— | —SO₂NH— | 2PO/31EO |
| 72 | Cu | 2 | H | -3-OC₆H₃(4-Br)— | —SO₂NH— | 4PO/3EO |
| 73 | Cu | 3 | H | -3-OC₆H₃(4-Br)— | —SO₂NH— | 9PO/1EO |
| 74 | Cu | 4 | H | -3-OC₆H₃(4-Br)— | —SO₂NH— | 2PO/7EO |
| 75 | Cu | 1 | tetra-Br | -4-SC₆H₄— | —SO₂NH— | 6PO/3EO |
| 76 | Cu | 2 | H | -4-SC₆H₄— | —SO₂NH— | 6BO/6EO |
| 77 | Cu | 3 | H | -4-SC₆H₄— | —SO₂NH— | 2PO/10EO |
| 78 | Cu | 4 | tetra-Br | -4-SC₆H₄— | —SO₂NH— | 2BO/3EO |
| 79 | Cu | 2 | H | -4-SC₆H₄— | —SO₂NH— | 2PO/4EO |
| 80 | Cu | 4 | tetra-n-C₄H₉ | -4-SC₆H₄— | —SO₂NH— | 2PO/6EO |
| 81 | Cu | 1 | H | -3-SC₆H₃(4-OMe)— | —SO₂NH— | 8PO/8EO |
| 82 | Cu | 2 | H | -3-SC₆H₃(4-OMe)— | —SO₂NH— | 4PO/3EO |
| 83 | Cu | 3 | H | -3-SC₆H₃(4-OMe)— | —SO₂NH— | 9PO/1EO |
| 84 | Cu | 4 | H | -3-SC₆H₃(4-OMe)— | —SO₂NH— | 2PO/7EO |
| 85 | Cu | 1 | di-I | -3-SC₆H₃(4-Me)— | —SO₂NH— | 5PO/5EO |
| 86 | Cu | 2 | tetra-I | -3-SC₆H₃(4-Me)— | —SO₂NH— | 4PO/3EO |
| 87 | Cu | 3 | H | -3-SC₆H₃(4-Me)— | —SO₂NH— | 3BO/2EO |
| 88 | Cu | 4 | H | -3-SC₆H₃(4-Me)— | —SO₂NH— | 2PO/5EO |
| 89 | Cu | 2 | H | -3-SC₆H₃(4-Me)— | —SO₂NH— | 2BO/4EO |
| 90 | Cu | 4 | H | -3-SC₆H₃(4-Me)— | —SO₂NH— | 3BO/2EO |
| 91 | Cu | 1 | tri-I | -3-SC₆H₃(4-Cl)— | —SO₂NH— | 2PO/16EO |
| 92 | Cu | 2 | H | -3-SC₆H₃(4-Cl)— | —SO₂NH— | 4PO/3EO |
| 93 | Cu | 3 | H | -3-SC₆H₃(4-Cl)— | —SO₂NH— | 4PO/2EO |
| 94 | Cu | 4 | H | -3-SC₆H₃(4-Cl)— | —SO₂NH— | 2PO/7EO |
| 96 | Ni | 2 | di-OEt | -4-OC₆H₄— | —SO₂NH— | 6BO/6EO |
| 97 | Ni | 3 | H | -4-OC₆H₄— | —SO₂NH— | 2PO/10EO |
| 98 | Ni | 4 | H | -4-OC₆H₄— | —SO₂NH— | 2BO/3EO |
| 99 | Ni | 2 | H | -4-OC₆H₄— | —SO₂NH— | 4PO/3EO |
| 100 | Ni | 4 | di-Br | -4-OC₆H₄— | —SO₂NH— | 2BO/4EO |
| 101 | Ni | 1 | H | -3-OC₆H₃(4-OMe)— | —SO₂NH— | 2PO/14EO |
| 102 | Ni | 2 | H | -3-OC₆H₃(4-OMe)— | —SO₂NH— | 4PO/3EO |
| 103 | Ni | 1 | H | -5-OC₆H₃(2-OMe)— | —SO₂NH— | 5PO/3EO |
| 104 | Ni | 2 | H | -5-OC₆H₃(2-OMe)— | —SO₂NH— | 2PO/10EO |
| 105 | Ni | 4 | H | -5-OC₆H₃(2-OMe)— | —SO₂NH— | 2BO/3EO |
| 106 | Ni | 1 | tetra-OMe | -3-OC₆H₃(4-Me)— | —SO₂NH— | 2PO/14EO |
| 107 | Ni | 2 | H | -3-OC₆H₃(4-Me)— | —SO₂NH— | 4PO/3EO |
| 108 | Ni | 4 | H | -3-OC₆H₃(4-Me)— | —SO₂NH— | 2PO/7EO |
| 109 | Ni | 2 | H | -3-OC₆H₃(4-Me)— | —SO₂NH— | 2PO/4EO |
| 110 | Ni | 4 | H | -3-OC₆H₃(4-Me)— | —SO₂NH— | 12EO |
| 111 | Ni | 1 | tetra-I | -5-OC₆H₃(2-Me)— | —SO₂NH— | 2BO/4EO |
| 112 | Ni | 2 | di-OMe | -5-OC₆H₃(2-Me)— | —SO₂NH— | 2BO/6EO |
| 113 | Ni | 2 | H | -5-OC₆H₃(2-Me)— | —SO₂NH— | 2PO/4EO |
| 114 | Ni | 4 | H | -5-OC₆H₃(2-Me)— | —SO₂NH— | 3BO/3EO |
| 115 | Ni | 1 | H | -5-OC₆H₂(2,6-di-Me)— | —SO₂NH— | 3PO/6EO |
| 116 | Ni | 2 | tetra-Me | -5-OC₆H₂(2,6-di-Me)— | —SO₂NH— | 4PO/3EO |
| 117 | Ni | 1 | H | -3-OC₆H₃(4-OEt)— | —SO₂NH— | 3BO/10EO |
| 118 | Ni | 1 | H | -5-OC₆H₃(2-OEt)— | —SO₂NH— | 2PO/8EO |

TABLE 5-continued

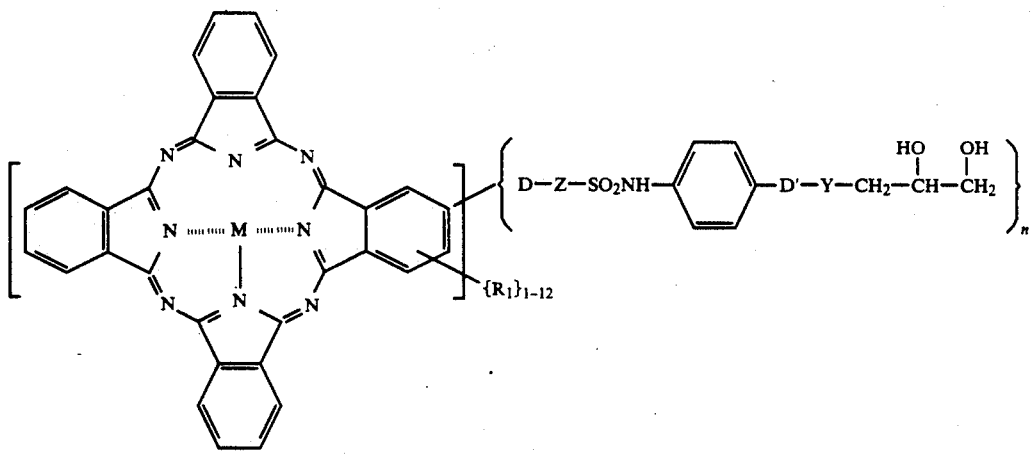

| Example | M | n | (R₁)₁₋₁₂ | —D—Z— | —D'— | Y |
|---|---|---|---|---|---|---|
| 119 | Ni | 2 | H | -5-OC₆H₃(2-OEt)— | —SO₂NH— | 4PO/3EO |
| 120 | Ni | 1 | tetra-OEt | -3-OC₆H₃(4-t-Bu)— | —SO₂NH— | 2PO/10EO |
| 121 | Ni | 2 | H | -3-OC₆H₃(4-t-Bu)— | —SO₂NH— | 4PO/3EO |
| 122 | Ni | 4 | H | -3-OC₆H₃(4-t-Bu)— | —SO₂NH— | 2PO/7EO |
| 123 | Ni | 2 | di-OEt | -3-OC₆H₃(4-t-Bu)— | —SO₂NH— | 4PO/3EO |
| 124 | Ni | 4 | H | -3-OC₆H₃(4-t-Bu)— | —SO₂NH— | 3PO/5EO |
| 125 | Ni | 1 | H | -3-OC₆H₃(4-Cl)— | —SO₂NH— | 2PO/10EO |
| 126 | Ni | 2 | H | -3-OC₆H₃(4-Cl)— | —SO₂NH— | 4PO/3EO |
| 127 | Ni | 4 | H | -3-OC₆H₃(4-Br)— | —SO₂NH— | 2PO/7EO |
| 128 | Ni | 1 | tetra-Cl | -4-SC₆H₄— | —SO₂NH— | 6PO/3EO |
| 129 | Ni | 2 | H | -4-SC₆H₄— | —SO₂NH— | 6BO/6EO |
| 130 | Ni | 3 | H | -4-SC₆H₄— | —SO₂NH— | 2PO/10EO |
| 131 | Ni | 4 | H | -4-SC₆H₄— | —SO₂NH— | 2BO/3EO |
| 132 | Ni | 2 | H | -4-SC₆H₄— | —SO₂NH— | 2PO/4EO |
| 133 | Ni | 4 | di-OEt | -4-SC₆H₄— | —SO₂NH— | 2PO/6EO |
| 134 | Ni | 1 | H | -3-SC₆H₃(4-Me)— | —SO₂NH— | 5PO/5EO |
| 135 | Ni | 2 | H | -3-SC₆H₃(4-Me)— | —SO₂NH— | 4PO/3EO |
| 136 | Ni | 3 | di-Cl | -3-SC₆H₃(4-Me)— | —SO₂NH— | 3BO/2EO |
| 137 | Ni | 4 | H | -3-SC₆H₃(4-Me)— | —SO₂NH— | 2PO/5EO |
| 138 | Ni | 2 | H | -3-SC₆H₃(4-Me)— | —SO₂NH— | 2BO/4EO |
| 139 | Ni | 4 | tetra-Br | -3-SC₆H₃(4-Me)— | —SO₂NH— | 3BO/2EO |
| 140 | Co | 1 | H | -4-OC₆H₄— | —SO₂NH— | 2PO/7EO |
| 142 | Co | 2 | H | -4-OC₆H₄— | —SO₂NH— | 6BO/6EO |
| 143 | Co | 3 | tetra-O-n-C₄H₉ | -4-OC₆H₄— | —SO₂NH— | 2PO/10EO |
| 144 | Co | 4 | H | -4-OC₆H₄— | —SO₂NH— | 2BO/3EO |
| 145 | Co | 2 | di-Br | -4-OC₆H₄— | —SO₂NH— | 4PO/3EO |
| 146 | Co | 4 | tetra-Br | -4-OC₆H₄— | —SO₂NH— | 2BO/4EO |
| 147 | Co | 1 | H | -3-OC₆H₃(4-OMe)— | —SO₂NH— | 2PO/14EO |
| 148 | Co | 2 | H | -3-OC₆H₃(4-OMe)— | —SO₂NH— | 4PO/3EO |
| 149 | Co | 4 | H | -3-OC₆H₃(4-OMe)— | —SO₂NH— | 2BO/6EO |
| 150 | Co | 1 | H | -3-OC₆H₃(2-OMe)— | —SO₂NH— | 5PO/3EO |
| 151 | Co | 2 | H | -5-OC₆H₃(2-OMe)— | —SO₂NH— | 2PO/10EO |
| 152 | Co | 4 | H | -5-OC₆H₃(2-OMe)— | —SO₂NH— | 2BO/3EO |
| 153 | Co | 1 | di-Cl | -3-OC₆H₃(4-Me)— | —SO₂NH— | 2PO/14EO |
| 154 | Co | 2 | H | -3-OC₆H₃(4-Me)— | —SO₂NH— | 4PO/3EO |
| 155 | Co | 3 | H | -3-OC₆H₃(4-Me)— | —SO₂NH— | 2PO/8EO |
| 156 | Co | 4 | H | -3-OC₆H₃(4-Me)— | —SO₂NH— | 2PO/7EO |
| 157 | Co | 2 | di-Et | -3-OC₆H₃(4-Me)— | —SO₂NH— | 2PO/4EO |
| 158 | Co | 4 | H | -3-OC₆H₃(4-Me)— | —SO₂NH— | 12EO |
| 159 | Co | 1 | H | -5-OC₆H₃(2-Me)— | —SO₂NH— | 2BO/4EO |
| 160 | Co | 1 | H | -3-OC₆H₃(4-t-Bu)— | —SO₂NH— | 2PO/10EO |
| 161 | Co | 2 | H | -3-OC₆H₃(4-t-Bu)— | —SO₂NH— | 4PO/3EO |
| 162 | Co | 4 | tetra-Br | -3-OC₆H₃(4-t-Bu)— | —SO₂NH— | 2PO/7EO |
| 163 | Co | 2 | H | -3-OC₆H₃(4-t-Bu)— | —SO₂NH— | 4PO/3EO |
| 164 | Co | 4 | H | -3-OC₆H₃(4-t-Bu)— | —SO₂NH— | 3PO/5EO |
| 165 | Co | 1 | H | -4-SC₆H₄— | —SO₂NH— | 6PO/3EO |
| 166 | Co | 2 | di-OMe | -4-SC₆H₄— | —SO₂NH— | 6BO/6EO |
| 167 | Co | 3 | H | -4-SC₆H₄— | —SO₂NH— | 2PO/10EO |
| 168 | Co | 4 | H | -4-SC₆H₄— | —SO₂NH— | 2BO/3EO |
| 169 | Co | 3 | di-Cl | -4-SC₆H₄— | —SO₂NH— | 2PO/4EO |
| 170 | Co | 1 | H | -3-SC₆H₃(4-OMe)— | —SO₂NH— | 8PO/8EO |
| 171 | Co | 2 | H | -3-S—C₆H₃(4-OMe)— | —SO₂NH— | 4PO/3EO |
| 172 | Co | 4 | H | -3-SC₆H₃(4-OMe)— | —SO₂NH— | 2PO/7EO |
| 173 | Co | 1 | tri-Cl | -3-SC₆H₃(4-Me)— | —SO₂NH— | 5PO/5EO |
| 174 | Co | 2 | H | -3-SC₆H₃(4-Me)— | —SO₂NH— | 4PO/3EO |
| 175 | Co | 4 | H | -3-SC₆H₃(4-Me)— | —SO₂NH— | 2PO/5EO |
| 176 | Co | 2 | di-Br | -3-SC₆H₃(4-Me)— | —SO₂NH— | 2BO/4EO |

TABLE 5-continued

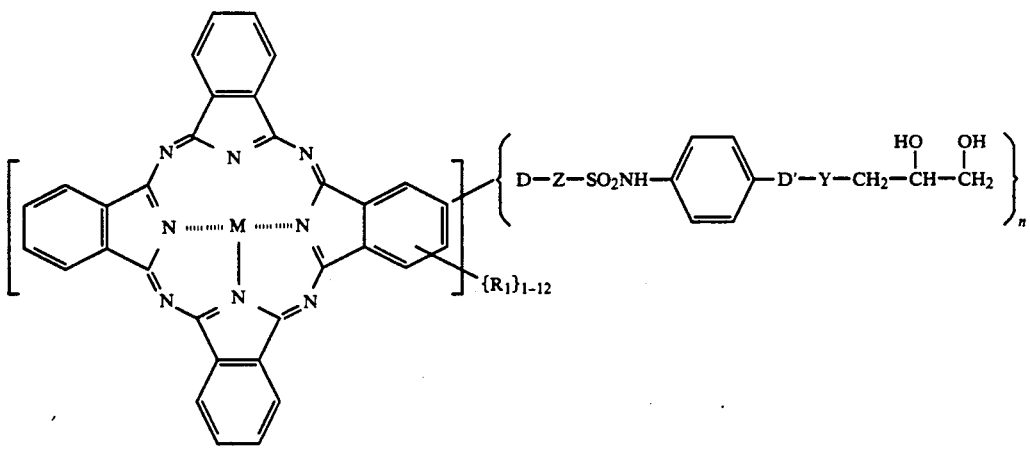

| Example | M | n | $(R_1)_{1-12}$ | —D—Z— | —D'— | Y |
|---|---|---|---|---|---|---|
| 177 | Co | 4 | H | -3-SC$_6$H$_3$(4-Me)— | —SO$_2$NH— | 3BO/2EO |

TABLE 6

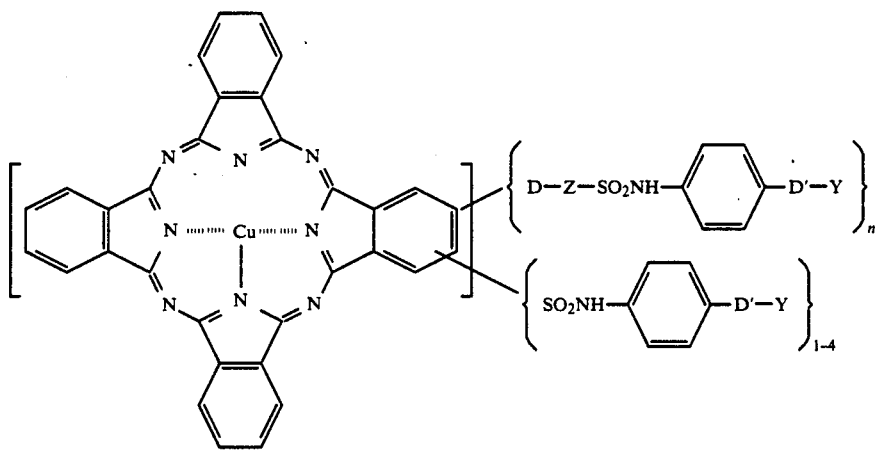

| Exam. | n | —[SO$_2$NH-4-C$_6$H$_4$—D'—Y]$_{1-4}$ | —D—Z— | —D'— | Y |
|---|---|---|---|---|---|
| 1 | 5 | tetra-SO$_2$NH-4-C$_6$H$_4$—SO$_2$NH—4PO/3EO —H | 4-OC$_6$H$_4$— | —SO$_2$NH— | 4PO/3EO—H |
| 2 | 4 | tetra-SO$_2$NH-4-C$_6$H$_4$—SO$_2$NH—2BO/6EO—H | 4-OC$_6$H$_4$— | —SO$_2$NH— | 2BO/6EO—H |
| 3 | 4 | di-SO$_2$NH-4-C$_6$H$_4$—SO$_2$NH—4PO/3EO—H | 4-SC$_6$H$_4$— | —SO$_2$NH— | 2PO/14EO—H |
| 4 | 8 | tetra-SO$_2$NH-4-C$_6$H$_4$—SO$_2$NH—2PO/4EO—H | -3-OC$_6$H$_3$(4-OMe)— | —SO$_2$NH— | 2BO/6EO—H |
| 5 | 8 | mono-SO$_2$NH-4-C$_6$H$_4$—SO$_2$NH—9PO/1EO—H | 4-OC$_6$H$_4$— | —SO$_2$NH— | 4PO/3EO—H |
| 6 | 4 | tetra-SO$_2$—NH-4-C$_6$H$_4$—SO$_2$NH—6PO/6EO—H | 4-OC$_6$H$_4$— | —SO$_2$NH— | 2BO/6EO—H |
| 7 | 4 | di-SO$_2$—NH-4-C$_6$H$_4$—SO$_2$NH—4PO/3EO—H | -5-OC$_6$H$_3$(2-OMe)— | —SO$_2$NH— | 2PO/10EO—H |
| 8 | 4 | tetra-SO$_2$NH-4-C$_6$H$_4$—SO$_2$NH—2PO/4EO—H | -3-OC$_6$H$_3$(4-OMe)— | —SO$_2$NH— | 9PO/1EO—H |
| 9 | 8 | di-SO$_2$—NH-4-C$_6$H$_4$—SO$_2$NH—PO/3EO—H | -3-OC$_6$H$_3$(4-Cl)— | —SO$_2$NH— | 4PO/3EO—H |
| 10 | 4 | tetra-SO$_2$NH-4-C$_6$H$_4$—SO$_2$NH—2BO/6EO—H | 4-OC$_6$H$_4$— | —SO$_2$NH— | 2BO/6EO—H |
| 11 | 4 | tetra-SO$_2$—NH-4-C$_6$H$_4$—SO$_2$NH—4PO/3EO—H | -3-SC$_6$H$_3$(4-OEt)— | —SO$_2$NH— | 4PO/3EO—H |
| 12 | 8 | tetra-SO$_2$—NH-4-C$_6$H$_4$—SO$_2$NH—2BO/3EO—H | -3-C$_6$H$_3$(4-OMe)— | —SO$_2$NH— | 2BO/6EO—H |
| 13 | 8 | di-SO$_2$—NH-4-C$_6$H$_4$—SO$_2$NH—9PO/1EO—H | 4-OC$_6$H$_4$— | —SO$_2$NH— | 5PO—H |
| 14 | 4 | di-SO$_2$—NH-4-C$_6$H$_4$—SO$_2$NH—6PO/8EO—H | 4-OC$_6$H$_4$— | —SO$_2$NH— | 2PO/10EO—H |
| 15 | 8 | di-SO$_2$NH-4-C$_6$H$_4$—SO$_2$NH—4PO/3EO—H | -5-OC$_6$H$_3$(2-OEt)— | —SO$_2$NH— | 2PO/14EO—H |
| 16 | 4 | di-SO$_2$NH-4-C$_6$H$_4$—SO$_2$NH—2PO/4EO—H | -3-OC$_6$H$_3$(4-OMe)— | —SO$_2$NH— | 8PO/2EO—H |

We claim:

1. A colorant having the formula:

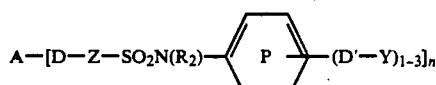

wherein $R_2$ is selected from H, alkyl, cycloalkyl, aryl or Y; A is a nonionic metallophthalocyanine chromophore which can be unsubstituted or substituted with 1-12 substituents selected from halogen, alkyl, alkoxy, alkylthio, or aryloxy; Z is an arylene moiety; each D or D' is selected from a covalent bond or a linking group consisting of or containing at least one of —O—, —S—, N(R$_3$)—, —N(SO$_2$R$_4$)— as the linking moiety, wherein R$_4$ is alkyl, cycloaliphatic or aryl, and R$_3$ is R$_4$ or hydrogen; D in combination with Z can also be a covalent bond; Y is a poly(oxyalkylene) moiety comprised of at least three monomeric units of the formula (—RO—) wherein each R is straight or branched alkylene of 2-4 carbons or mixtures thereof; ring P can be unsubstituted or substituted in addition to the —(D'—Y) moieties with halogen, alkyl or alkoxy; and wherein each aliphatic hydrocarbon portion or moiety of the groups, moieties or substituents recited above contains from 1-20 carbons and wherein n is 1-16, except when —D—Z— is a covalent body then is equal to one to four.

2. A colorant according to claim 1 wherein Y has a molecular weight from 200 to 1500 and at least 50 mole percent of said monomeric units are of the formula (—RO—).

3. A colorant according to claim 2 wherein A is an unsubstituted phthalocyanine of Cu, Ni or Al.

4. A colorant according to claim 3 wherein from 1 to 20 mole percent of said monomer units are connected by a linking group selected from alkyleneoxy, aryleneoxy, alkylenedioxy, alkylenetrioxy, —N($R_2$)—, —N($SO_2$—A)— and —N($R_2$)CON($R_2$)—.

5. A polymeric or resinous material composition containing from about 0.001 to about 10.0 weight of one or a mixture of the colorants of claim 1.

6. The composition of claim 5 wherein the polymeric material is thermoplastic.

7. The composition of claim 5 wherein the polymeric material is polyurethane.

8. A colorant according to claim 4 wherein -D-Z- is selected from —O-arylene-, —S-arylene-, —$SO_2$-arylene-, —N($R_3$)-arylene-, -N($SO_2R_4$)-arylene-, or —O-alkylene-O-arylene-.

9. The process for preparing a colorant of claim 1 comprising reacting at a temperature of from 0° C. to 100° C., a metallophthalocyanine of the formula: A—(-D—Z—$SO_2$X)$_n$; with at least a stoichiometric quantity of an amine of the formula:

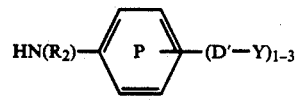

wherein X is selected from Cl, F, Br, I, or alkoxy, and A, D, Z, $R_2$, Y, P and n are as defined in claim 1.

10. The process of claim 9 is carried out in the presence of a reaction medium selected from water, alcohols, and ethers containing an acid acceptor selected from alkali metal carbonates, hydroxides and tertiary amines.

* * * * *